(12) United States Patent
Lewis et al.

(10) Patent No.: US 6,950,177 B2
(45) Date of Patent: Sep. 27, 2005

(54) CONSTRUCTING A WAVEFORM FROM MULTIPLE THRESHOLD SAMPLES

(75) Inventors: Robert Lewis, Cupertino, CA (US); Chad Thompson, Louisville, CO (US); George Varian, Palo Alto, CA (US)

(73) Assignee: Toolz, Ltd., Kowloon (HK)

( * ) Notice: Subject to any disclaimer, the term of this patent is extended or adjusted under 35 U.S.C. 154(b) by 0 days.

(21) Appl. No.: 10/414,450

(22) Filed: Apr. 15, 2003

(65) Prior Publication Data

US 2004/0070746 A1 Apr. 15, 2004

Related U.S. Application Data

(60) Provisional application No. 60/372,992, filed on Apr. 15, 2002.

(51) Int. Cl.[7] ............................. G01C 3/08; G01S 13/00
(52) U.S. Cl. ........................ 356/5.01; 356/401; 342/195
(58) Field of Search ............................... 356/5.01–5.15, 356/4.01; 342/145, 175, 194–196, 159; 702/124–126, 66, 71

(56) References Cited

U.S. PATENT DOCUMENTS

| | | | |
|---|---|---|---|
| 4,745,562 A | | 5/1988 | Prazdny |
| 4,985,844 A | | 1/1991 | Foley et al. |
| 5,298,905 A | * | 3/1994 | Dahl ............................ 342/54 |
| 5,612,779 A | * | 3/1997 | Dunne ........................ 356/5.01 |
| 6,137,566 A | * | 10/2000 | Leonard et al. ............ 356/141.1 |
| 6,331,887 B1 | * | 12/2001 | Shiraishi et al. ............. 356/3.03 |
| 6,418,386 B1 | | 7/2002 | Wong-Lam et al. |
| 6,590,521 B1 | * | 7/2003 | Saka et al. .................... 342/70 |

OTHER PUBLICATIONS

Jian–Hua, A Weak Structural Texture Analysis Technique to Wave Heights for Ocean Waves Image, Jan. 1988, vol. 4, Issue 88, pp. 105–110.

* cited by examiner

*Primary Examiner*—Bernarr E. Gregory
*Assistant Examiner*—Isam Alsomiri
(74) *Attorney, Agent, or Firm*—Vierra Magen Marcus Harmon & DeNiro

(57) ABSTRACT

Technology is disclosed for measuring distances. A measurement device emits a beam that reflects on the surface of an object. The measurement device determines the distance to the object, based on the time of flight of the beam from transmission to capture by the measurement device. The measurement device derives feedback reference pulses from pulses in the emitted beam and injects them into the device's receive path—creating a receive waveform that includes one or more feedback reference pulses and corresponding pulses in the return beam. The device uses the pulses in the waveform to measure time of flight. The measurement device can attenuate the feedback reference pulses to intensities similar or equal to the intensities of the return pulses. The measurement device can include a histogram processor that collects waveform samples at varying comparison thresholds. The device employs the most accurate information at each threshold to create a digitized composite waveform that corresponds to the analog waveform received by the measurement device. In some instances the measurement device can process the digitized waveform—removing noise, scaling reference pulses, and removing distortions caused by pulse trailing edges running into subsequent pulses.

52 Claims, 32 Drawing Sheets

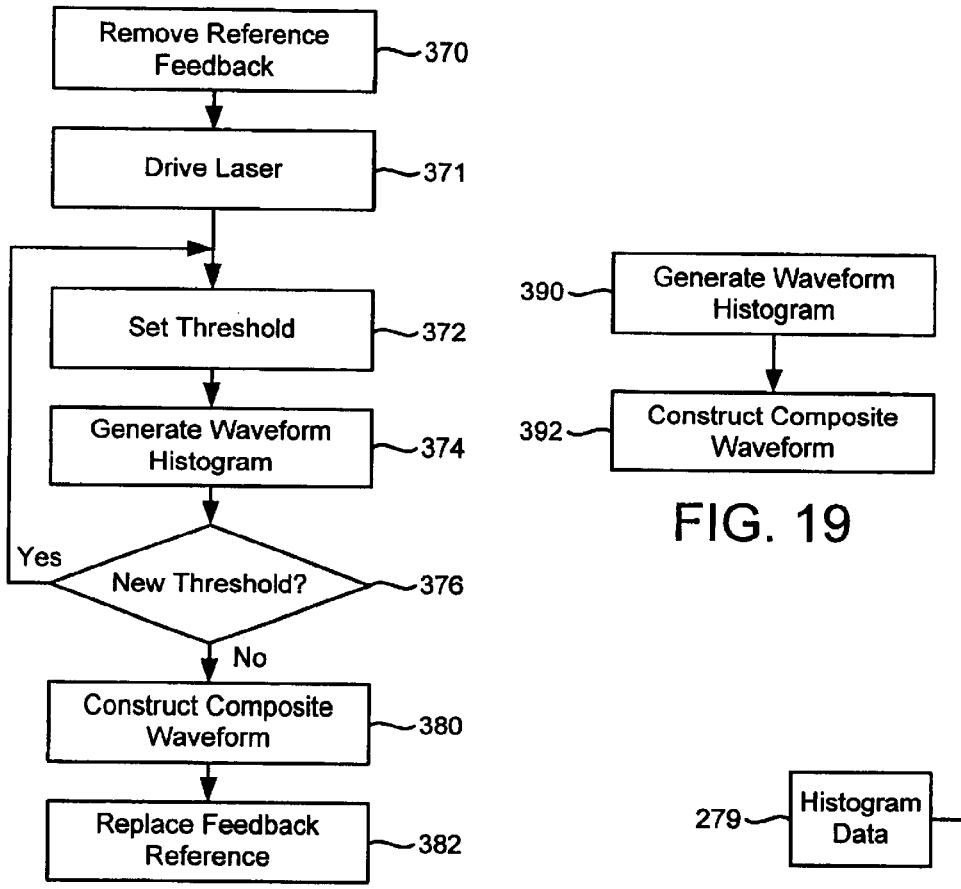
FIG. 18
FIG. 19
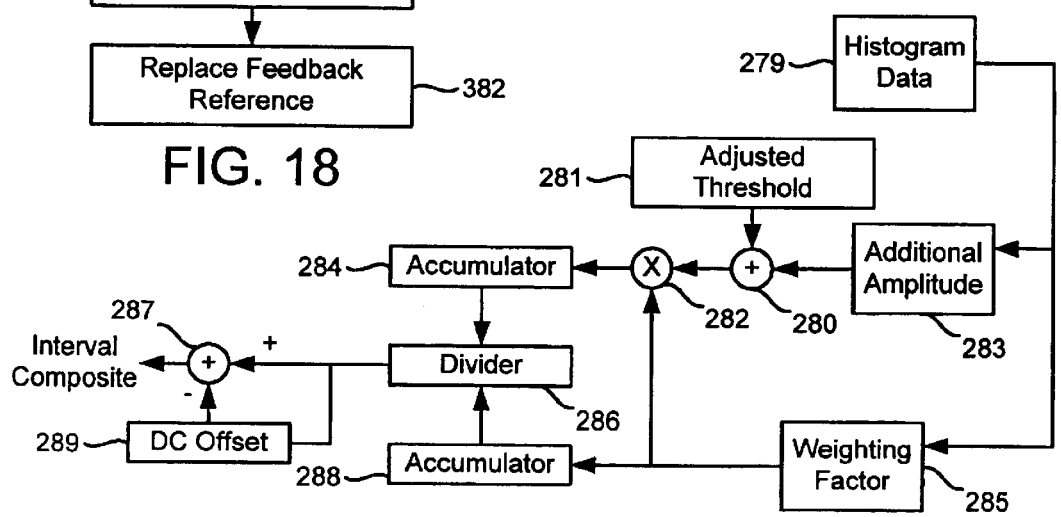
FIG. 15

CONSTRUCTING A WAVEFORM FROM MULTIPLE THRESHOLD SAMPLES

This application claims the benefit of U.S. Provisional Application No. 60/372,992, entitled "Laser Range Finding System," filed on Apr. 15, 2002, which is incorporated herein by reference.

CROSS-REFERENCE TO RELATED APPLICATIONS

This Application is related to the following Applications:

"Distance Measurement Device," by Robert Lewis, Chad Thompson and George Varian, filed the same day as the present application; and "Distance Measurement Device with Short Distance Optics," by Robert Lewis, Chad Thompson and George Varian, filed the same day as the present application.

Each of these related Applications are incorporated herein by reference.

BACKGROUND OF THE INVENTION

1. Field of the Invention

The present invention is directed to distance measurement technology.

2. Description of the Related Art

People undertaking construction and repair projects frequently need to measure distances. Traditional tape measures are inconvenient. They can require the use of two people in many instances. Tape measurements can lack accuracy. A user may align the tape on a slant or bend the tape when making a measurement against a fixed object.

Optical measuring systems exist for making more accurate distance measurements. However, many of these systems have drawbacks that make them undesirable to users. Some systems require the use of expensive precision components that drive the price of the measuring device beyond the purchase point of many consumers. Other systems suffer from inaccuracy due to noise and other extraneous effects.

One traditional type of system is the narrowband ranging system. This system emits one or more modulated optical signals that produce reflections on an incident target. The system captures the reflections and determines the distance to the target based on phase shifts detected in the captured reflections. These systems typically require the use of an expensive high precision receiver, such as an avalanche gain photodiode. The performance of these systems can also erode as the signal to noise ratio falls. This can be a significant drawback, because environmental conditions in the working area can provide substantial signal attenuation.

Another traditional type of system is the wideband pulsed system. This system also emits one or more optical signals that produce reflections on an incident target. The system captures the reflections and measures the round trip signal delay to obtain the distance to the target. The system determines the time difference between the time a signal pulse departs the system and the time that the system receives a reflection of the pulse. Traditional systems identify pulse departure and arrival through threshold detection—comparing the signals to a threshold level. One typical technique is half-maximum detection, which establishes a reference threshold based on the peak intensity of the signal pulses. Unfortunately, this technique does not operate well in low signal to noise ratio environments. The system has difficulty establishing a consistent detection point, because the low signal to noise ratio increases estimation errors in the measurement of signal amplitude. Challenges also arise when trying to measure time delay between signal pulses. When an asynchronous clock is employed to measure the time between pulses, significant inaccuracies can occur unless the system employs measurement intervals with impractically long durations. In order to avoid such measurement intervals, the system can employ expensive high-speed components with substantial power consumption.

SUMMARY OF THE INVENTION

The present invention, roughly described, pertains to technology for measuring distances. A measurement device emits a beam that reflects on the surface of an object. The measurement device captures the return beam and determines the distance to the object, based on the time of flight of the beam from transmission to capture by the measurement device.

One implementation of the measurement device enhances accuracy by deriving feedback reference pulses from pulses in the emitted beam and injecting them into the device's receive path. This creates a receive waveform that includes one or more feedback reference pulses in the emitted beam and corresponding return pulses in the return beam. This enables the measurement device to directly measure time delay between a return pulse and a reference pulse that lead to the generation of the return pulse. In some implementations, the measurement device also attenuates the feedback reference pulses, so that they have intensities similar or equal to the intensities of the return pulses.

One embodiment of the measurement device digitizes the receive waveform and processes it to obtain clean versions of the feedback reference pulses and return pulses. This enables the device to accurately identify corresponding points in a feedback reference pulse and return pulse, so that reliable time of flight measurements can be made. One implementation of the measurement device includes a histogram processor that collects waveform samples at varying comparison thresholds. The device uses the most accurate information at each threshold to create a digitized composite waveform that corresponds to the analog waveform received by the measurement device. This functionality allows accurate waveform reconstruction in environments with low signal to noise ratios. In one embodiment, signal processing within the measurement device also removes noise, scales reference pulses, and removes distortions caused by pulse trailing edges running into subsequent pulses.

In one implementation, the histogram processor generates a waveform histogram at each waveform sampling threshold. The histogram includes intervals, and each interval reflects the results of waveform samples taken in a time window. The histogram processor converts each interval's contents into an additional amplitude offset from the corresponding sampling threshold. The histogram processor adds the additional amplitude to the sampling threshold to obtain an amplitude component for the interval and weights the reliability of the amplitude component. The weighted amplitude components for an interval in each histogram are combined to obtain a composite amplitude component for the interval.

The histogram processor utilizes the characteristics of the waveform noise to accurately determine composite waveform amplitudes. The histogram processor determines the additional amplitude offset and weights reliability based on an inverse error function derived from the crossing statistics of the random noise in the waveform. A histogram interval's additional amplitude decreases and reliability increase as the waveform samples in the interval move closer to being equally distributed above and below the sampling threshold. This condition indicates that the waveform amplitude is close to the sampling threshold and random noise is driving the sampling results to oscillate above and below the sampling threshold.

Aspects of the present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 15 is a block diagram for one embodiment of circuitry for constructing a composite waveform.

FIG. 18 is a flowchart describing one embodiment of a process for identifying laser-related noise.

FIG. 19 is a flowchart describing one embodiment of a process for identifying non-laser-related noise.

DETAILED DESCRIPTION

Figure 1:
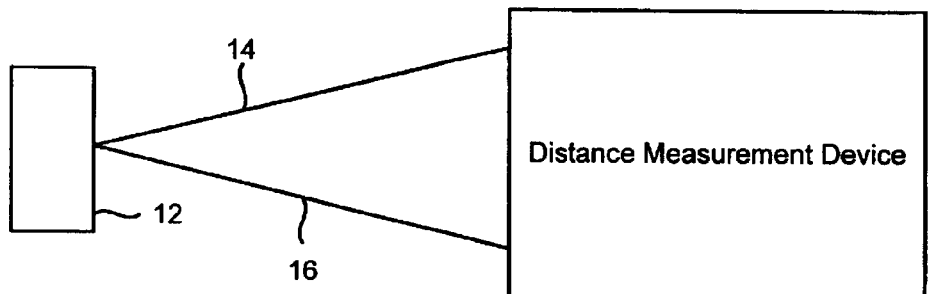
FIG. 1 shows a distance measurement device in accordance with the present invention.

FIG. 1 shows a distance measurement device 10 in accordance with the present invention. Distance measurement device 10 is capable of measuring the distance from device 10 to object 12. In one implementation, measurement device 10 can measure distances from 30 meters to 2 millimeters ("mm"). In alternate implementations, different distance measurement ranges are possible. One version of measurement device 10 measures distances with an accuracy of plus or minus 2 mm. Different versions can have varying levels of accuracy. In one embodiment, device 10 has three dimensional dimensions of 2"×1"×2". Other dimensions can be employed.

Measurement device 10 emits beam 16, which reflects on the surface of object 12. The reflection of beam 16 returns to measurement device 10 as beam 14. Measurement device 10 determines the distance to object 12, based on the time delay between the transmission of beam 16 and reception of beam 14. In alternate embodiments, measurement device 10 provides a common point of exit and entry for beams 16 and 14. This can be particularly useful in making measurements at short distances.

Measurement device 10 achieves high levels of accuracy without requiring the use of expensive high precision components in some embodiments. This results in lower production costs for manufacturing device 10. Measurement device 10 enhances accuracy by employing a reference pulse feedback path—one or more reference pulses from beam 16 are injected into the receive path that captures beam 14. This creates a receive waveform with reference and return pulses. Device 10 uses the waveform to match points on return pulses in beam 14 with points on reference pulses in beam 16 that generated the return pulse points. Device 10 measures the distance between the corresponding points to determine the time of flight for the emitted signal and converts the time of flight into a distance measurement.

In one implementation, device 10 attenuates the reference pulses from beam 16 in the feedback path. This causes the reference pulse rise and fall times to be the same or very similar to the rise and fall times on return pulses in beam 14. This enhances the ability of device 10 to accurately match return pulse points to reference pulse points when determining time of flight.

One embodiment of device 10 employs a histogram processing module to digitize waveforms with reference and return pulses. This histogram processor collects waveform samples at varying comparison thresholds. The processor uses the most accurate information at each threshold to create a digitized composite waveform that corresponds to the analog waveform received by measurement device 10. The histogram processor facilitates the use of device 10 in environments with low signal to noise ratios.

In some embodiments, measurement device 10 also includes a digital signal processing module that processes the digitized composite waveform. The processing enables better matching of points on return pulses with corresponding points on reference pulses, so that accurate time delay can be measured. In one embodiment, the digital signal processing removes noise, scales reference pulses, and removes distortions caused by pulse trailing edges running into subsequent pulses.

Figure 2:
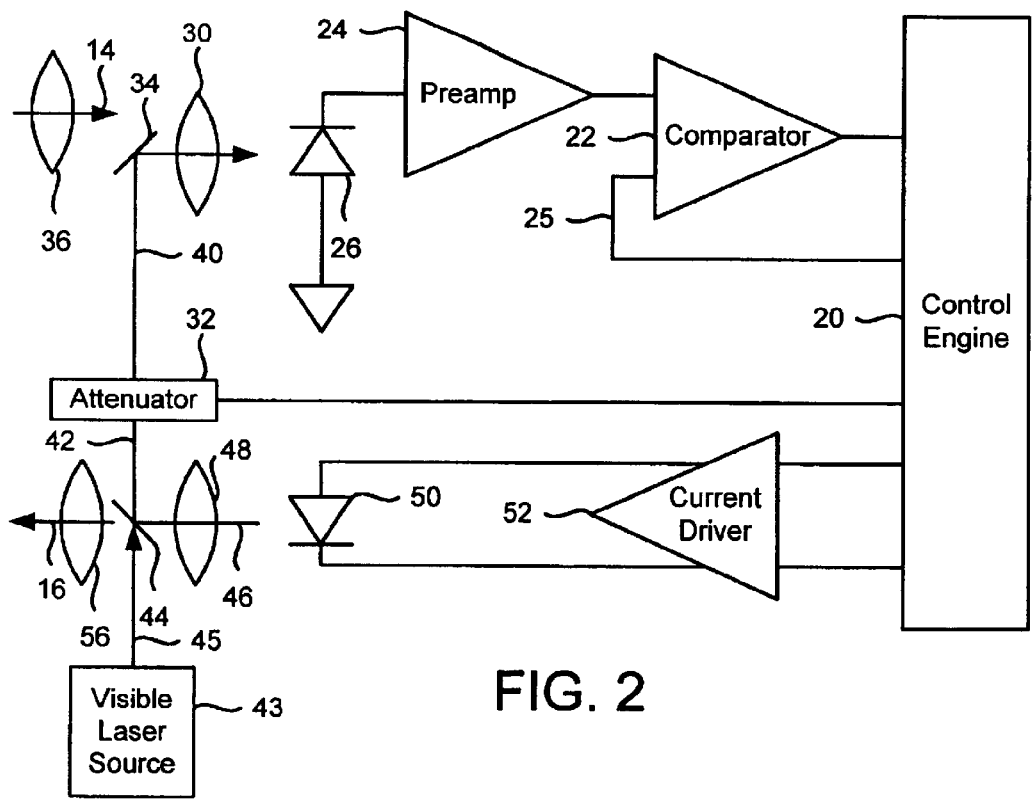
FIG. 2 shows a block diagram of one embodiment of a distance measurement device in accordance with the present invention.

FIG. 2 is a block diagram of one implementation of measurement device 10. Measurement device 10 includes current driver 52 coupled to light source 50. In one implementation, light source 50 is a laser source, such as a laser diode, that provides an invisible infrared signal. In an alternate embodiment, laser source 50 is a VCSEL or different type of laser diode. Light source 50 can also be a light emitting diode for low cost applications in one implementation. Current driver 52 drives laser source 50 to generate laser beam 46. In further embodiments, source 50 can provide light other than invisible laser light. Current driver 52 has ability to provide either a single differential pulse or burst of differential pulses to source 50. In response, source 50 provides either a single pulse or burst of pulses in beam 46.

Collimating lens 48 is aligned with source 50 to capture beam 46 and pass it to beam splitter 44, which has a surface that is partially reflective and partially transmissive. Beam splitter 44 divides beam 46 into outgoing reference beam 16 and internal reference beam 42. Window 56 is aligned with beam splitter 44 to capture beam 16 and direct it out of device 10. In one implementation, device 10 includes laser source 43, which supplies visible laser beam 45. In this implementation, beam splitter 44 is a dichroic mirror that receives beam 45 and reflects beam 45 out of window 16. The outgoing visible beam allows users to align device 10 with target 12. A dichroic mirror passes most of incident infrared beam 46, while reflecting a small portion of infrared beam 46 to generate beam 42. The dichroic mirror also reflects essentially all of visible beam 45. Beam splitter 44 is aligned so that beam 16 and the portion of beam 45 reflected by mirror 44 are co-bore sited.

Attenuator 32 is aligned with beam splitter 44 to receive internal reference beam 42. Attenuator 32 applies an intensity attenuation to beam 42 to generate feedback reference beam 40. Reflector 34 is aligned with attenuator 32 to receive feedback reference beam 40. Feedback reference beam 40 impacts a surface of mirror 34 and is reflected. In one embodiment, reflector 34 is a mirror. Alternatively, reflector 34 can be implemented with other instrumentalities. In other embodiments, attenuator 32 is not employed—internal reference beam 42 is directed onto reflector 34. Collimating lens 30 is aligned with mirror 34 to receive reflected feedback reference beam 40. Return beam 14 enters device 10 through window 36. Return beam 14 bypasses reflector 34 and is captured by lens 30. In one embodiment, device 10 includes a filter (not shown) that captures beam 14 before lens 30 and filters out ambient light. In an alternate embodiment, no filter is employed. In a further embodiment, mirror 34 is a partially transmissive beam splitter that receives beam 14 and passes beam 14 to lens 30.

The feedback reference pulses in beam 40 and return pulses in beam 14 appear in a waveform that is incident on detector 26. In one implementation, detector 26 is a laser diode with an anode coupled to ground and a cathode coupled to an input of preamplifier 24. Laser diode 26 detects incoming signals through lens 30. Preamplifier 24 receives the output of laser diode 26 and amplifies the incoming waveform. The output of preamplifier 24 is coupled to the input of comparator 22, which has input 25 coupled to control engine 20. Control engine 20 places a threshold voltage on comparator input 25. Comparator 22 compares the waveform from preamplifier 24 to the threshold voltage. When the waveform exceeds the threshold on input 25, comparator 22 provides a logic 1 signal output. Otherwise, comparator 22 provides a logic 0 output.

Control engine 20 is coupled to the output of comparator 22, threshold input 25, the input of current driver 52, and a control input of attenuator 32. Control engine 20 controls the operation of current driver 52—setting the amplitude, duration, intensity and number of pulse signals used to generate output pulses on source 50. Control engine 20 sets the amount of attenuation that attenuator 32 provides to reference beam 42. In one implementation, optical attenuator 32 is an electronically controlled attenuator, such as a device including liquid crystal shutter. Attenuator 32 electronically adjusts the attenuation in response to control signals from control engine 20. In alternate embodiments, attenuator 32 mechanically adjusts the attenuation in response to signals from control engine 20. In one implementation, attenuator 32 drives the operation of a mechanical actuator, which sets an opening in a mechanical shutter. In alternate embodiments, different instrumentalities can be employed to perform the operation of attenuator 32.

Control engine 20 sets optical attenuator 32, so that the intensity of the pulses on feedback reference beam 40 are close to or the same as the intensity of pulses on return beam 14. The matched intensity allows the reference pulses and return pulses to have similar or the same rise and fall times on their leading and trailing edges. This enable the reference pulses and return pulses to experience the same propagation delay when passing through preamplifier 24 and comparator 22—allowing corresponding points on the reference and return pulses to be easily matched when assessing time of flight.

Control engine 20 uses the signals from comparator 22 to construct digital versions of the waveforms received by detector 26. In one implementation, control engine 20 employs a histogram processing module. The histogram processor collects multiple samples of a waveform at different intervals within the waveform. The histogram processor collects this data for different threshold values on comparator input 25. For each threshold value, the histogram processor collects samples from multiple waveforms with reference and return pulses.

The histogram processor accumulates the samples of each interval in a waveform at a given threshold. This results in a histogram for each threshold voltage provided on comparator input 25. Each histogram identifies the number of logic 1 determinations made by comparator 22 within each waveform interval at a given threshold. Control engine 20 aggregates the histogram information at each threshold to create a composite waveform that serves as a digital replication of the waveform received at laser diode 26. Control engine 20 employs the digitized waveform to identify reference pulses and their corresponding return pulses to make time of flight measurements. As indicated above, control engine 20 applies digital signal processing to the digitized waveform to more accurately measure time of flight. More details regarding these operations are provided below. In alternate embodiments, different forms of histogram processing can be employed.

Figure 3:
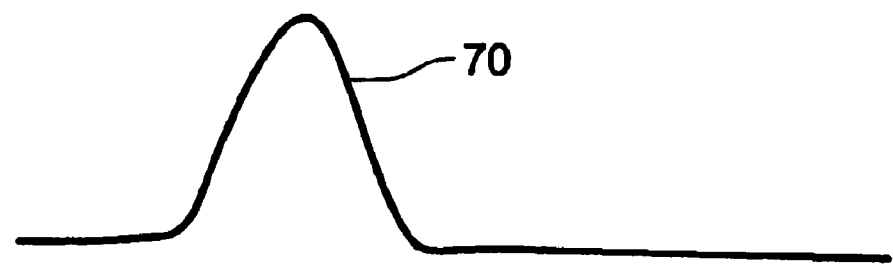
FIG. 3 shows one example of a feedback reference pulse.
Figure 4:
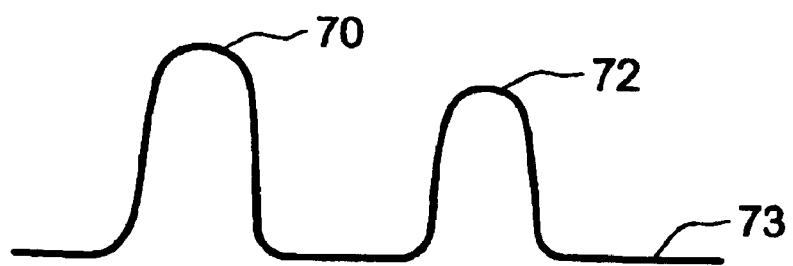
FIG. 4 shows one example of a waveform including a reference pulse and a return pulse.

FIG. 3 illustrates example feedback reference pulse 70 within feedback reference beam 40. FIG. 4 shows waveform 73 received at detector 26 that includes feedback reference pulse 70 followed by return pulse 72 from beam 14. Return pulse 72 is the pulse generated on beam 14 in response to the pulse on beam 46 that lead to the generation of feedback reference pulse 70. Pulses 70 and 72 are idealized representations for purposes of convenience. They do not reflect the effects of noise and other environmental factors on waveform 73. In alternate implementations, waveform 73 includes multiple reference pulses and multiple corresponding return pulses.

Figure 5:
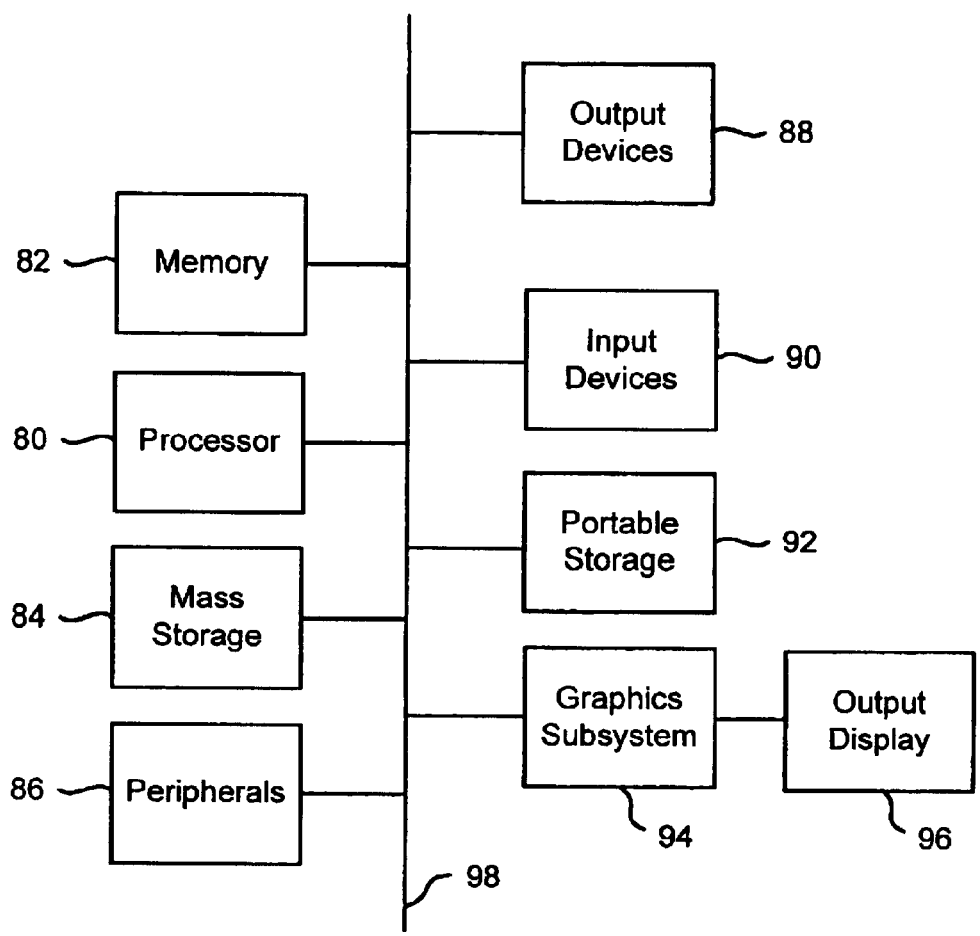
FIG. 5 is a block diagram of one embodiment of a control engine in a distance measurement device.

FIG. 5 illustrates a high level block diagram of one embodiment of a processor controlled system that can be used for control engine 20 in measurement device 10. The system in FIG. 5 includes processor unit 80 and main memory 82. Processor unit 80 may contain a single microprocessor or single microcontroller. Alternatively, processor unit 80 may contain a plurality of microprocessors for configuring the system as a multi-processor system. Main memory 82 stores, in part, instructions and data for execution by processor unit 80. If the system of the present invention is wholly or partially implemented in software, main memory 82 can store the executable code when in operation. Main memory 82 may include banks of dynamic random access memory (DRAM) as well as high speed cache memory.

The system of FIG. 5 further includes mass storage device 84, peripheral device(s) 86, user input device(s) 90, portable storage medium drive(s) 92, graphics subsystem 94, and output display 96. In some implementations, control engine 20 includes a subset of these components. For purposes of simplicity, the components shown in FIG. 5 are depicted as being connected via a single bus 98. However, the components may be connected through one or more data transport means. For example, processor unit 80 and main memory 82 may be connected via a local microprocessor bus, and the mass storage device 84, peripheral device(s) 86, portable storage medium drive(s) 92, and graphics subsystem 94 may be connected via one or more input/output (I/O) buses. Mass storage device 84, which may be implemented with a magnetic disk drive or an optical disk drive, is a non-volatile storage device for storing data and instructions for use by processor unit 80. In one embodiment, mass storage device 84 stores the system software for implementing the present invention for purposes of loading to main memory 82.

Portable storage medium drive 92 operates in conjunction with a portable non-volatile storage medium, such as a floppy disk, to input and output data and code to and from the system of FIG. 5. In one embodiment, the system software for implementing aspects of the present invention is stored on such a portable medium, and is input to the computer system via the portable storage medium drive 92. Peripheral device(s) 96 may include any type of computer support device, such as an input/output (I/O) interface, to add additional functionality to the system. For example, peripheral device(s) 96 may include a network interface for connecting the computer system to a network.

Input device(s) 90 provide a portion of a user interface. User input device(s) 90 may include an alpha-numeric keypad for inputting alpha-numeric and other information, or a pointing device, such as a mouse, a trackball, stylus, or cursor direction keys. Input device(s) 90 may also include a remote control interface for exchanging communication signals, such as radio frequency signals, with a remote control. In a further embodiment, input devices 90 include circuitry for sampling the output of comparator 22.

In order to display textual and graphical information, the system of FIG. 5 includes graphics subsystem 94 and output display 96. Output display 96 may include a cathode ray tube (CRT) display, liquid crystal display (LCD) or other suitable display device. Graphics subsystem 94 receives textual and graphical information, and processes the information for output to display 96. Additionally, the system of FIG. 5 includes output devices 88. Examples of suitable output devices include drivers and ports for interfacing with attenuator 32, current driver 52, and threshold input 25.

The components contained in the system of FIG. 5 are those typically found in processor based systems suitable for use with the present invention, and are intended to represent a broad category of such components that are well known in the art. Thus, the system of FIG. 5 can be a specially designed control system, personal computer, handheld computing device, Internet-enabled telephone, workstation, server, minicomputer, mainframe computer, or any other computing device. The system can also include different bus configurations, networked platforms, multi-processor platforms, etc.

Figure 6:
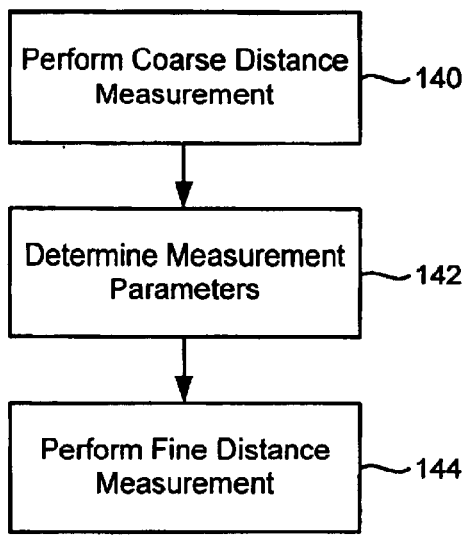
FIG. 6 is a flowchart describing one embodiment of a process for determining distance.

FIG. 6 is a flowchart describing one embodiment of the process for making a distance determination using distance measurement device 10. Device 10 performs a coarse distance measurement (Step 140). The coarse distance measurement provides a rough estimate of the distance between measurement device 10 and object 12. Based on the course distance measurement, device 10 determines measurement parameters to be used in attaining the ultimate measurement of the distance between device 10 and object 12 (Step 142).

In one implementation, device 10 sets the following parameters based on the coarse distance measurement: (1) the number of pulses in beam 16; (2) the number of waveforms sampled by comparator 22 at each threshold; (3) the number of different thresholds applied on comparator input 25; and (4) the spacing between thresholds provided to input 25 of comparator 22. In alternate implementations, different measurement parameters can be employed.

Using the measurement parameters, device 10 performs a fine distance measurement (Step 144). Device 10 obtains a final accurate measurement of a distance between device 10 and object 12. In one implementation, the measurement parameters are affected by the coarse distance measurement as follows: (1) the number of pulses in beam 16 increases as the coarse distance measurement increases; and (2) as the intensity of the return signal during coarse distance measurement increases, control engine 20 employs a larger number of thresholds, greater gaps between thresholds, and less waveforms for sampling at each threshold. The exact parameter values employed vary with system design. In one implementation, control engine 20 maintains a list of parameter values to employ in particular circumstances in the form of a look-up table. In alternative embodiments, a different mechanism is employed for setting parameters in response to the coarse measurement.

Figure 7:
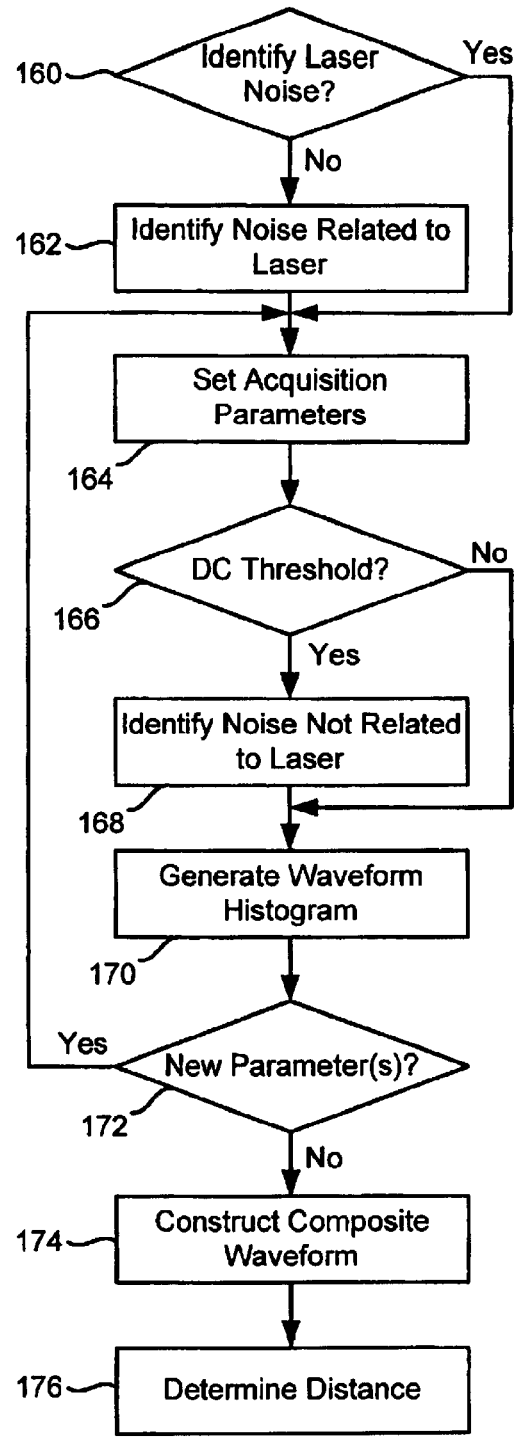
FIG. 7 is a flowchart describing one embodiment of a process for performing distance measurement.

FIG. 7 is a flowchart describing one embodiment of a process for performing coarse distance measurement and fine distance measurement. The process in FIG. 7 can be used for performing step 140 in FIG. 6. The process in FIG. 7 can also be used for performing step 144 in FIG. 6. In one implementation, the steps in FIG. 7 are performed by control engine 20. In alternate embodiments, different mechanisms within device 10 can carry out the operations shown in FIG. 7. During the process in FIG. 7, a waveform reproduction is generated and distance is determined based on the waveform reproduction.

The process shown in FIG. 7 includes steps for identifying noise on the receive waveform presented to detector 26. Device 10 identifies and removes noise in order to accurately measure time between reference pulses and return pulses. Device 10 breaks the noise into two components. These components are noise that is related to the operation of source 50 when driving a pulse signal and noise that is not related to source 50 driving a pulse signal. Device 10 removes the different noise components from different portions of the digitized waveform. The separate noise components are treated individually, because the noise from laser source 50 is substantially larger than a non-laser-related noise in device 10.

Control engine 20 determines whether it is necessary to identify laser-related noise in device 10 (Step 160). Laser-related noise is periodically identified within device 10. In one implementation, control engine 20 sets a predefined calibration period, such as once per hour of operation. At the expiration of the calibration period, control engine 20 determines that it is necessary to identify laser-related noise. The calibration period is set in one embodiment to account for environmental changes in the work area where device 10 is employed. Environmental changes include ambient light changes and other external factors. If it is necessary to identify laser-related noise, control engine 20 proceeds to identify the noise (Step 162).

Once the laser-related noise is identified, or if such a determination is not necessary, control engine 20 sets acquisition parameters (Step 164). In one implementation, the acquisition parameters include the following: (1) the threshold value on input 25 of comparator 22; (2) the number of waveforms comparator 22 will sample at the threshold; (3) the amount of attenuation applied by optical attenuator 32; (4) the number of pulses on beam 16; and (5) the spacing between intervals in the waveform sampled by comparator 22.

In one embodiment, the coarse distance measurement always uses one feedback reference pulse per waveform. In alternate embodiments, different numbers of feedback reference pulses may be employed. In one implementation, control engine 20 initially divides the waveform into 384 intervals and samples 1,000 waveforms for each threshold. In alternate embodiments, the number of waveforms sampled per threshold can vary. Additionally, control engine 20 can change the number of waveforms to be sampled as the threshold value is changed.

The intervals sampled within a waveform do not need to be equally spaced apart. For example, there may be a large delay in time between a feedback reference pulse and return pulse within a waveform. In this event, a portion of the intervals will center around the feedback reference pulse and a portion of the intervals will center around the return pulse—leaving a gap with no intervals between the two portions. The fixed period of time between the sets of intervals can then be factored in when making time of flight determinations.

The amount of attenuation applied by optical attenuator 32 sets the intensity of the feedback reference pulses. Properly setting the attenuation avoids inaccuracies in leading edge behavior that may result from the feedback reference pulses and return pulses having different propagation delays through preamplifier 24 and comparator 22. When performing fine distance measurement (Step 144, FIG. 6), control engine 20 sets the attenuation, so that attenuator 32 outputs feedback reference pulses with a peak amplitude approximately equal to the peak amplitude of the return pulses received during coarse distance measurement (Step 140, FIG. 6). The closeness of amplitude matching between the feedback reference pulses and return pulses depends on the desired accuracy of the measurement. Closer matching provides more accurate distance determinations. In an alternate embodiment, the attenuation is updated every time step 164 is repeated—control engine 20 sets the attenuation, so that attenuator 32 provides a feedback reference pulse with an amplitude that approximately matches the most recently received return pulse. In alternate embodiments, different techniques can be employed for updating the attenuation provided by attenuator 32.

In one embodiment, attenuation is set during coarse distance measurement (Step 140, FIG. 6), so that the feedback reference pulse is very small or non-existent. In this embodiment, time-of-flight measurements are made using only an established time associated with the mid-point of the feedback reference pulse or another point on the feedback reference pulse. In alternate embodiments, control engine 20 sets attenuation during coarse distance measurement, so that an amplitude matching feedback reference pulse is provided.

The difference between threshold settings varies based on the desired accuracy of device 1. In one implementation, control engine 20 transitions the threshold hold level through 10 equally spaced apart levels that span up to the maximum anticipated amplitude of the return pulse. The anticipated maximum return pulse amplitude is the measured amplitude of the return pulse during coarse distance measurement (Step 140, FIG. 6) in one embodiment. In coarse distance measurement, the threshold can be set in a similar way or less accurately. Different threshold settings can be used in various embodiments.

Control engine 20 determines whether the threshold on input 25 is set at the direct current ("DC") level (Step 166). If the threshold is at the DC level, control engine 20 identifies noise not related to driving laser source 50 (Step 168). Otherwise, control engine 20 generates a waveform histogram for the set of acquisition parameters (Step 170). Control engine 20 also performs step 170 after performing step 168.

Once the waveform histogram has been generated, control engine 20 determines whether it is necessary to set a new group of acquisition parameters, including a new threshold (Step 172). In one embodiment, control engine 20 makes this determination by deciding whether further sampling needs to be performed at a new threshold level. Control engine 20 determines whether the samples collected at the current threshold level are sufficiently reliable for making an accurate reconstruction of the waveform received at detector 26. If the samples taken at this point are not sufficiently reliable, then a new threshold level is set (Step 164) and the above-described process is repeated.

In further implementations, other acquisition parameters can also be changed (Step 164). For example, the number of waveforms sampled at the new threshold can be modified—less samples may be needed as the threshold increases. Control engine 20 can decide to only take samples within certain intervals that do not have sufficient reliability. Examples of information used for making a reliability determination will be explained below.

Once control engine 20 determines that further sampling at different parameters is not necessary, control engine 20 constructs a composite waveform (Step 174). A composite waveform is based on the histograms that control engine 20 collected in the iterations of step 170. In one implementation, some of the operations necessary for constructing a composite waveform are performed on an ongoing basis prior to the determination in step 172 of whether new parameters are required. In alternate embodiments, all of the operations required for constructing a composite waveform are performed after control engine 20 determines no more waveform sampling is necessary (Step 172). Interleaving steps from the composite waveform construction (Step 174) into an earlier point in the process of FIG. 7 reduces the amount of data that control engine 20 needs store on an ongoing basis. More details regarding this interleaving will be described below when the composite waveform construction step (Step 174) is described in greater detail.

Control engine 20 determines the distance between device 10 and object 12 based on the constructed composite waveform from step 174. Control engine 20 makes this determination by assessing the time delay between one or more feedback reference pulses and their corresponding return pulses. Control engine 20 converts the time measurement into a distance measurement using well-known physics principles. In one implementation, control engine 20 uses the following equation:

$$D=(T/2)*C*M$$

Wherein:

D is the distance between device 10 and object 12;

T is the time delay between the feedback reference pulses and return pulses;

C is the speed of light; and

M is a coefficient that corresponds to the medium in which the distance measurement is made.

The following is an example of histogram data collected for different signal to noise ratios in one embodiment:

Signal to Noise Ratio in the Range of 0.2:1–0.5:1: (1) 384 sample intervals per histogram; (2) employ one threshold level of 0; and (3) use 32768 sample waveforms per histogram.

Signal to Noise Ratio in the Range of 0.5:1–0.75:1: (1) 384 sample intervals per histogram; (2) employ one threshold level of 0; and (3) use 16384 sample waveforms per histogram.

Signal to Noise Ratio in the Range of 0.75:1–1.5:1: (1) 384 sample intervals per histogram; (2) employ 2 threshold levels starting at 0 and increased by $0.5\sigma$ per level; and (3) use 4096 sample waveforms per histogram.

Signal to Noise Ratio in the Range of 1.5:1–2.5:1: (1) 384 sample intervals per histogram; (2) employ 4 threshold levels starting at 0 and increased by $0.5\sigma$ per level; and (3) use 1024 sample waveforms per histogram.

Signal to Noise Ratio in the Range of 2.5:1–5:1: (1) 384 sample intervals per histogram; (2) employ 4 threshold levels starting at 0 and increased by $1\sigma$ per level; and (3) use 512 sample waveforms per histogram.

Figure 8:
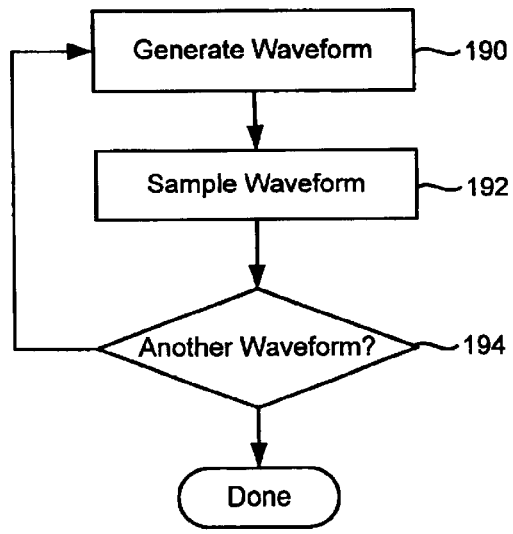
FIG. 8 is a flowchart describing one embodiment of a process for generating a waveform histogram.

FIG. 8 is a flowchart describing one embodiment of a process for generating a waveform histogram (Step 170, FIG. 7). Device 10 generates a waveform, including a feedback reference pulse and a corresponding return pulse as shown in FIG. 4 (Step 190). The waveform is sampled (Step 192). Comparator 22 compares the waveform to the threshold voltage set on input 25. When the waveform signal exceeds the value on threshold input 25, comparator 22 provides a logic 1 to control engine 20. Otherwise, comparator 22 provides a logic 0 to control engine 20. Control engine 20 samples the comparator output in each interval of the waveform. Control engine 20 determines whether it is necessary to sample another waveform (Step 194). The number of necessary waveforms is set as an acquisition parameter in one embodiment (Step 164, FIG. 7). If all of the waveforms called for in step 164 of FIG. 7 have been sampled, then no more waveform generation and sampling is necessary. Otherwise, control engine 20 loops back to step 190 and repeats the above-described process.

Figure 9:
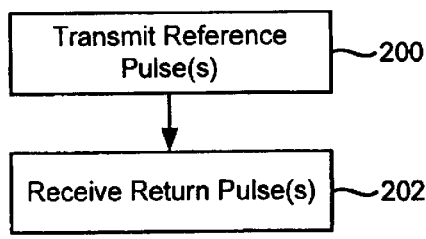
FIG. 9 is a flowchart describing one embodiment of a process for generating a waveform.

FIG. 9 illustrates one embodiment of a process for generating a waveform (Step 190). Control engine 120 causes one or more reference pulses to be transmitted (Step 200). In one implementation, control engine 20 drives current driver 52, which causes laser diode 50 to generate a pulse on beam 46. A portion of the pulse on beam 46 is reflected on mirror 44 to pass through attenuator 32 and become feedback reference pulse 70 in beam 40. Another portion of the pulse on beam 46 passes to object 12 in beam 16. Device 10 also receives a return pulse (Step 202). A return pulse is caused by the reflection of the pulse from beam 16 impacting object 12 and traveling back on beam 14 through lens 30.

Figure 10:
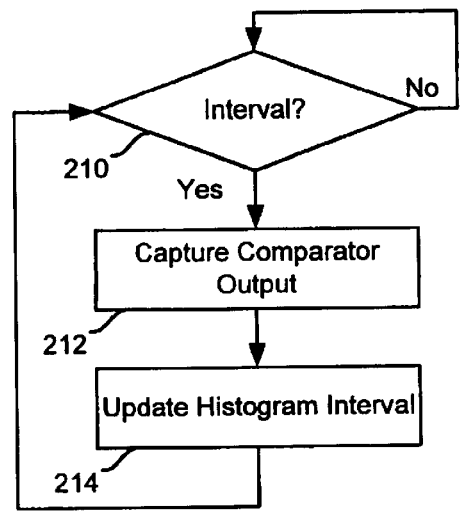
FIG. 10 is a flowchart describing one embodiment of a process for sampling a waveform.

FIG. 10 is a flowchart describing one embodiment of a process for sampling a waveform (Step 192, FIG. 8). Control engine 20 waits for comparator 22 to provide threshold comparisons for the first interval of a waveform (Step 210). Once the interval occurs, control engine 20 captures the output of comparator 22, which reflects a comparison of the incoming waveform to the value on threshold input 25 (Step 212). Control engine 20 updates a histogram interval corresponding to the current interval and threshold (Step 214). Control engine 20 accumulates the value provided by comparator 22 with other waveform samples taken in the same interval for the same threshold value on comparator input 25 (Step 214). Repeated interval value accumulation creates a histogram in control engine 20. The histogram indicates the number of logic 1 samples received from comparator 22 in each interval of a waveform for a given threshold. In carrying out the process shown in FIG. 7, control engine 20 eventually builds a histogram for each threshold level. Once the histogram interval has been updated, control engine 20 waits for comparator 22 to provide comparison data for the next interval in the waveform (Step 210).

As discussed above with reference to step 172 in FIG. 7, control engine 20 needs to make a determination of whether to collect samples at a new threshold. This determination is made based on the histogram data collected at a given threshold. If any interval of the histogram reflects a logic 1 value or logic 0 value for all or close to all samples at the given threshold, then the collected data is not a reliable indication of the magnitude of the waveform in that interval. It is likely that the waveform magnitude is different than the set threshold, but there is no reliable way to determine how much different than the set threshold. In order to determine the value of the waveform's magnitude in this interval, more waveform samples need to be taken at a higher threshold.

Figure 11:
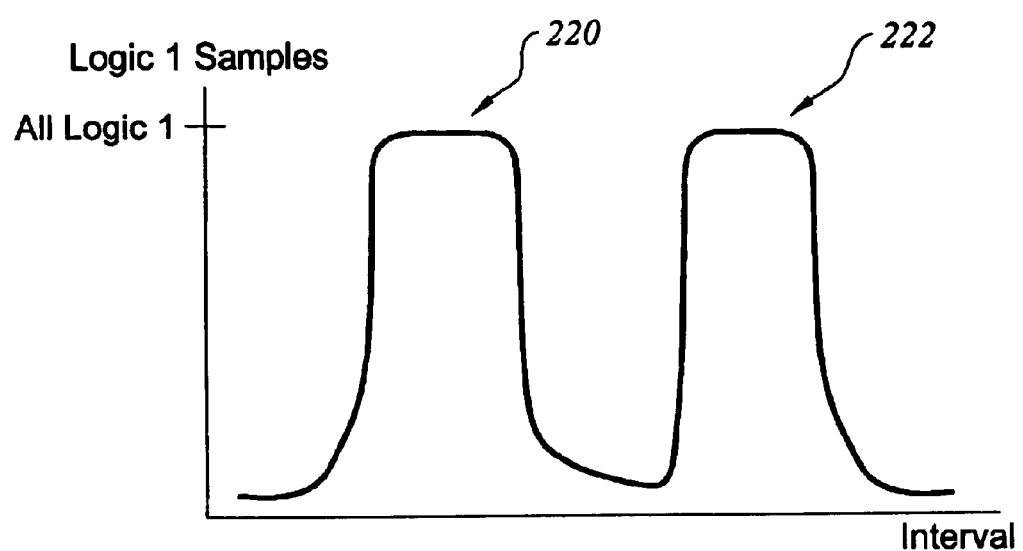
FIG. 11 is an example graph of histogram interval values including intervals that have unreliable data.

FIG. 11 shows a graph of the interval values in a collected histogram with data that is not sufficiently reliable. The graph shows that intervals in region 220 associated with a reference pulse all have almost the maximum number of possible logic 1 samples. The same is true for intervals in region 222 associated with a return pulse. The collected data for these intervals will not lead to an accurate reconstruction of the reference pulse and return pulse as they were seen by detector 26. Without an accurate representation of the reference and return pulses, it will not be possible to match points on the reference pulse to points on the return pulse and measure time delay. When any of the intervals in the histogram have values like those in regions 220 and 222, control engine 20 determines that a new threshold must be employed (Step 172, FIG. 7). In alternate embodiments, control engine 20 requires multiple intervals to have unreliable data before setting a new threshold.

In addition to setting a new threshold, control engine 20 can also modify other acquisition parameters (Step 164, FIG. 7). In one implementation, the acquisition parameters are set so that samples of the waveforms at the new threshold are only made in those intervals where reliability is low. In alternate embodiments, complete sampling of the waveform is done in all intervals.

Figure 12:
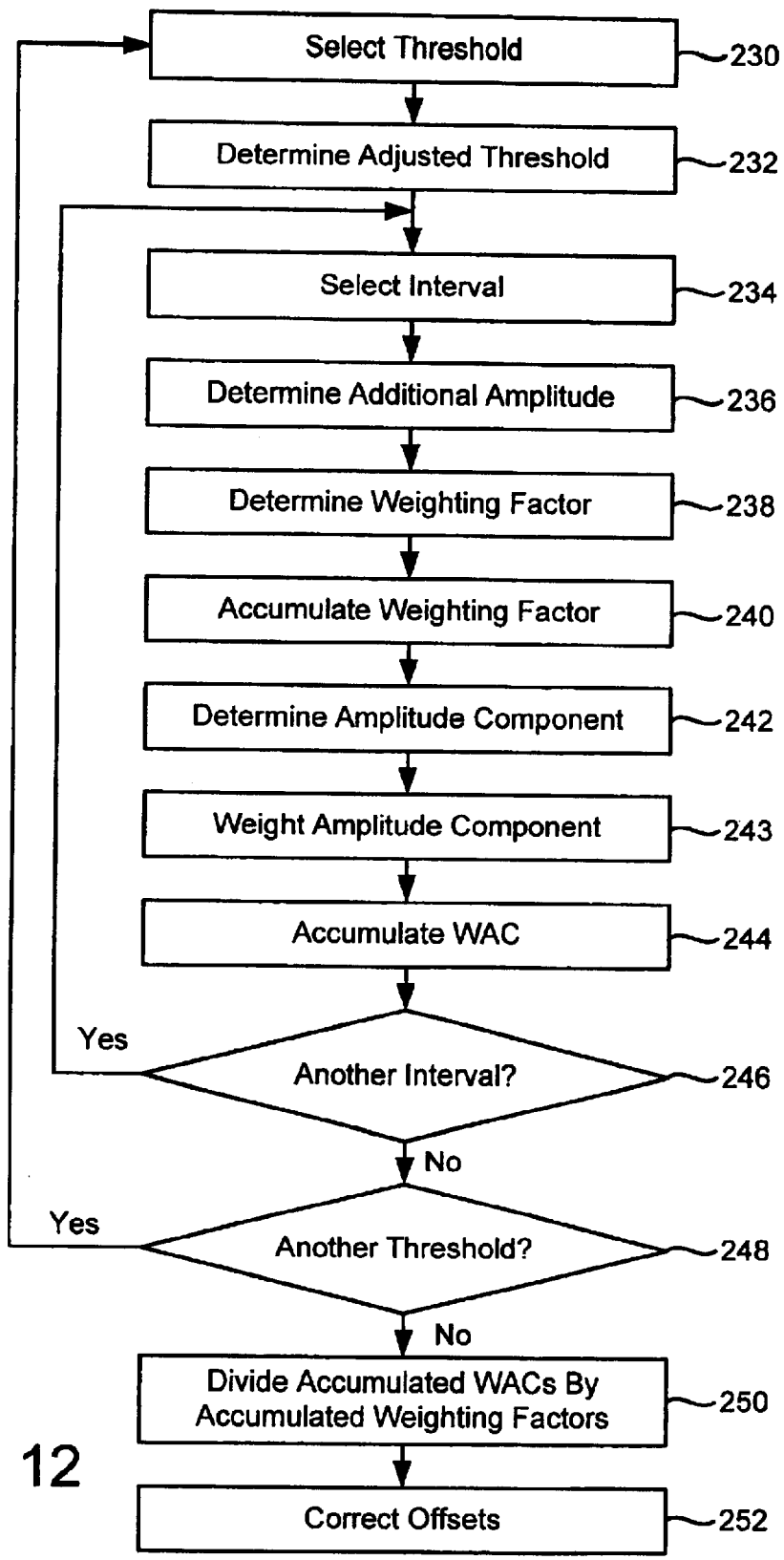
FIG. 12 is a flowchart describing one embodiment of a process for constructing a composite waveform.

FIG. 12 is a flowchart describing one embodiment of a process for constructing a composite waveform (Step 174, FIG. 7). Control engine 20 selects a threshold (Step 230). The selected threshold is one of the thresholds employed to generate a histogram (Step 170, FIG. 7). Control engine 20 determines an adjusted threshold (Step 232). In some instances, control engine 20 may not have an accurate record of the threshold used to generate a histogram. The actual voltage on input 25 to comparator 22 may differ from the voltage that control engine 20 believes to have placed on input 25. More details regarding the determination of the adjusted threshold will be provided below.

Control engine 20 selects an interval in a histogram that corresponds to the selected threshold (Step 234). Control engine 20 determines an additional amplitude value for the selected interval (Step 236). The additional amplitude value serves as an educated guess of the difference between the magnitude of the waveform in the selected interval and the threshold value. In one implementation, control engine 20 applies an inverse error function to determine the additional amplitude. In alternate implementations, different functions can be employed. Note that the additional amplitude can be a value that indicates a magnitude increase or decrease from the threshold.

When using the inverse error function value, control engine 20 generates a sample ratio for each interval. The sample ratio is equal to the following:

$$SR=(ONES-ZEROS)/(ONES+ZEROS)$$

Wherein:

SR is the sample ratio;

ONES is the number of logic 1 values sampled in the interval; and

ZEROS is equal to the number of logic 0 values sampled in the interval.

Figure 13:
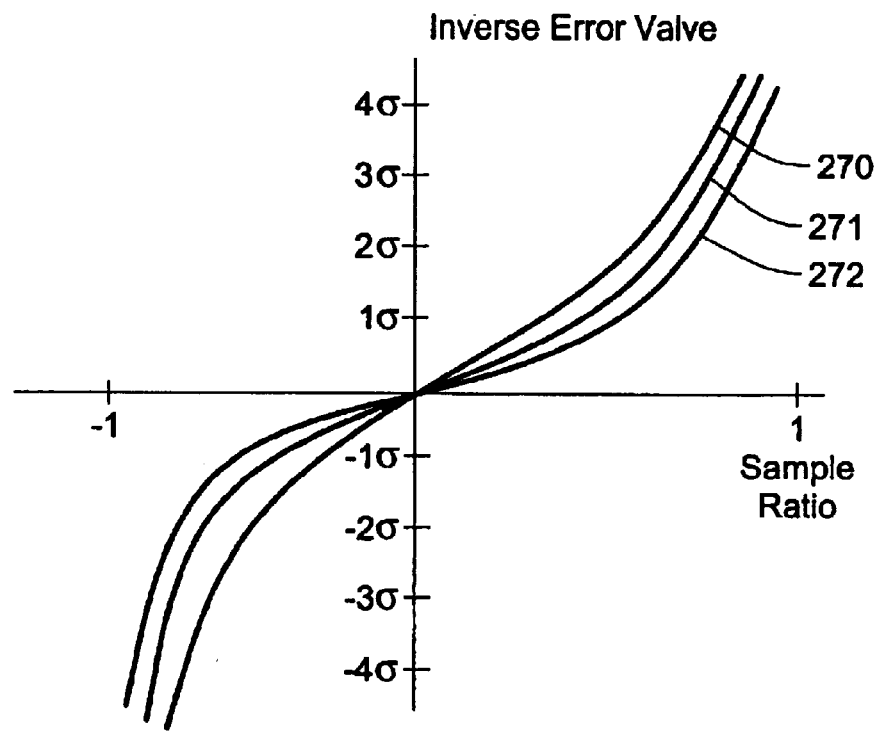
FIG. 13 is one example of an inverse error function.

FIG. 13 provides examples of inverse error functions that can be used to determine an additional amplitude value in various embodiments. One type of inverse error function is based on the Gaussian distribution of noise in the sampled waveform. The inverse error function is plotted on a graph with an 'x' axis corresponding to the sample ratio and a 'y' axis corresponding to additional amplitude values. For the selected interval, control engine 20 identifies the additional amplitude value that corresponds to the interval's sample ratio.

In FIG. 13, the additional values are represented as multiples of $\sigma$, with $\sigma$ representing the standard deviation of the threshold. The additional amplitude values increase in absolute magnitude as the sample ratio values increase in absolute magnitude. When the sample ratio is negative, the additional amplitude is negative. When the sample ratio is positive, the additional amplitude value is positive. In alternate embodiments, the additional amplitude values are represented as fixed values or multiples of an entity other than $\sigma$.

A high sample ratio occurs when there are either a large percentage of logic 1 samples or a large percentage of logic 0 samples in an interval. As discussed above, reliability is low in intervals with this type of characteristic. This means that the additional amplitude value corresponding to the sample ratio is not reliable. When the sample ratio is close to zero, it is likely that the actual additional amplitude is actually close to zero—a zero sample ratio indicates that random noise is most likely causing the sampling to provide even numbers of logic 1 and logic 0 outputs. Under these circumstances it is likely that the waveform has an amplitude equal to the sampling threshold.

The inverse error value can also be employed in determining whether a new threshold needs to be employed for gathering another histogram (Step 172, FIG. 7). For example, the clipped off regions of pulses 220 and 222 in FIG. 11 would have intervals with high inverse error values. In one embodiment, an interval is considered unreliable if the absolute magnitude of the inverse error function is $2\sigma$ or greater—necessitating the setting of a new threshold for generation a new histogram.

FIG. 13 shows 3 different inverse error functions that can be employed in various embodiments. Inverse error function 270 is employed in one embodiment when comparator 22 provides a single level comparison output. Alternatively, comparator 22 can provide multiple level comparison results. Inverse error function 271 corresponds to comparator 22 providing a 3 level comparison output when $1\sigma$ steps are employed between selected threshold levels. Inverse error function 272 corresponds to comparator 22 providing a 3 level comparison output when $2\sigma$ steps are employed between selected threshold levels. In alternate embodiments different functions can be employed to represent additional amplitude. In some embodiments, experimental data can be used in establishing the function for setting the additional amplitude.

Figure 14:
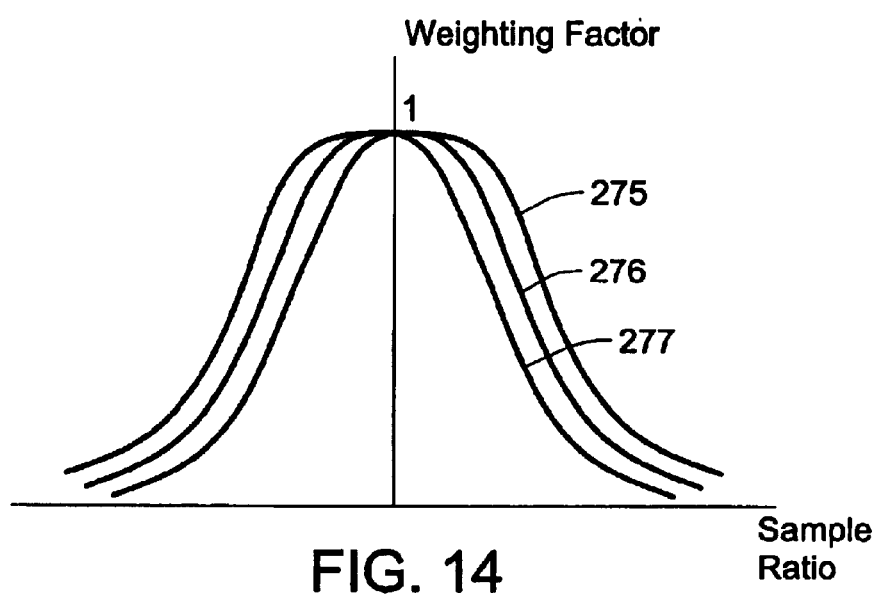
FIG. 14 is one example of a weighting function.

Since different intervals may have different levels of reliability, control engine 20 determines a weighting factor for the selected interval (Step 238, FIG. 12). The weighting factor provides an indicator of reliability for the interval's additional amplitude value. FIG. 14 provides examples of weighting functions that can be employed to determine a weighting factor. In alternate embodiments, different weighting functions can be used. FIG. 14 shows weighting functions with a 'y' axis that corresponds to the weighting factor and an 'x' axis that corresponds to the previously described sample ratio.

In the embodiments shown in FIG. 14, the weighting functions are calculated as an uncertainty coefficient multiplied by the inverse of the slope of the inverse error function. The uncertainty coefficient is a function of the number of waveform samples taken and reflects the change in the weighting factor as the sample ratio changes. Well-known statistical principles are employed to set the uncertainty coefficient to a value that reflects the desired accuracy of device 10. Weighting functions 275, 276, and 277 correspond to histogram intervals that result from 1000, 100, and 10 waveform samples, respectively. In further embodiments, different weighting functions can be employed. FIG. 14 shows weighting functions with a single peak. This results from comparator 22 providing a single level comparison output. In further embodiments, weighting functions with multiple peaks will occur when comparator 22 provides a multiple level comparison output.

As the sample ratio approaches zero, weighting function 270 goes to a maximum value of 1—reflecting the high level of reliability placed on the additional amplitude value that corresponds to such a sample ratio. As the sample ratio approaches positive and negative 1, weighting function 270 becomes very small—reflecting the low level of reliability placed on the additional amplitude value that corresponds to such a sample ratio. In one implementation, control engine 20 performs step 238 to find the weighting factor by using a look-up table. In alternate embodiments, different mechanisms can be employed.

Control engine 20 accumulates the weighting factor for the interval with previously determined weighting factors for the same interval (Step 240)—the previously determined weighting factors within the interval correspond to histograms that were obtained at different thresholds. Control engine 20 determines an amplitude component (Step 242). In one implementation, control engine 20 employs the following equation to determine the amplitude component:

$$AC=AT+AA$$

Wherein:

AC is the amplitude component determined in step 242;

AT is the adjusted threshold determined in step 232; and

AA is the additional amplitude determined in step 236.

In an alternate embodiment, control engine 20 determines the amplitude component with consideration of potential shifts in a clock system in control engine 20 that samples the output of comparator 22. Further details regarding the calculation of this clock shift will be provided below. When considering the clock shift, the amplitude component is determined according to the following equation in one embodiment:

$$AC=R(AT+AA)$$

Wherein:

R( ) is a re-sampling function that is applied to the sum of the adjusted threshold and additional amplitude value, based on shifts in the sampling clock system.

In another embodiment, the re-sampling function is applied to the additional amplitude, and the re-sampled additional amplitude is added to the adjusted threshold. In alternate implementations, different equations can be employed for determining the amplitude component. For example, in an alternate embodiment the threshold is not adjusted—the selected threshold in step 230 replaces the adjusted threshold in the above equations.

Control engine 20 weights the amplitude component (Step 243), based on the reliability of the samples in the interval. In one embodiment, control engine 20 applies the following equation to weight the amplitude component:

$$WAC=AC*WF$$

WAC is the weighted amplitude component; and

TWF is the weighting factor determined in Step 238.

Control engine 20 accumulates the weighted amplitude component for the interval with previously determined amplitude components for the same interval at different thresholds (Step 244). If there is a remaining interval in the waveform (Step 246), control engine 20 selects that interval (Step 230) and repeats the above-described process. If no further intervals exist within the waveform (Step 248), control engine 20 determines whether to select a new threshold (Step 248). If a threshold remains unselected, control engine 20 selects a new threshold (Step 230) and repeats the above-described process.

If no threshold values remain unselected, control engine 20 divides the accumulated weighted amplitude component for each interval by the accumulated weighting factor for the interval (Step 250). For each interval, control engine 20 divides the interval's accumulated weighted amplitude component by the interval's accumulated weighting factor. The accumulated weighted amplitude component for an interval is the sum of all weighted amplitude components for the interval. The accumulated weighting factor for an interval is the sum of all weighting factors for the interval.

In some instances, the accumulated weighting factor can be zero. This can occur when each threshold only yields sample ratios of zero. This can happen when the threshold starts at levels that yield all logic 1 samples and jumps to levels that yield all logic 0 values. When this occurs, control engine 20 employs a substitute value for the division of the accumulated weighted amplitude component by the accumulated weighting factor in step 250. This avoids control engine 20 generating an undefined result for the waveform amplitude. In one implementation, the substitute value is the last threshold level that yields all logic 1 values plus half of the voltage step between this level and the first threshold level that yields all logic 0 samples. In various embodiments, the substitute value can be different.

For each interval, control engine 20 makes any necessary DC offset corrections to the quotient from step 250 to obtain an amplitude value for the interval (Step 252). A DC offset correction is necessary if there is a DC offset or bias within device 10 on the waveform. Once the offset correction is made for each interval, control engine 20 has a digital reconstruction of the waveform received by detector 26. In alternate embodiments, the offset correction is avoided and the digitized waveform maintains a DC component.

As discussed above, steps in the process shown in FIG. 12 can be performed throughout the process shown in FIG. 7. For example, steps 232, 234, 236, 238, 240, 242, 243, 244, and 246 can be performed between steps 170 and 172 in FIG. 7. In this implementation, steps 250 and 252 are performed in step 174 of FIG. 7. In alternate embodiments, different techniques can be used for interleaving portions of the process shown in FIG. 12 into earlier stages of the process shown in FIG. 7.

In one embodiment, the process shown in FIG. 12 is modified to ensure that the magnitude of the accumulated weighted amplitude component doesn't become too large. This can prevent overflow errors in the control engine. Step 242 is modified, so that the amplitude component is an offset from a base amplitude value, and the base amplitude value is added to the result of step 250 to obtain the interval amplitude before DC offset corrections. In this embodiment, an interval's amplitude component is calculated as set forth in the equations above, except that the value for AT is set as follows:

When the interval's sample ratio is logic 1, AT equals zero; and

When the interval's sample ratio is not logic 1, AT equals the difference between the adjusted threshold value calculated in step 232 for the current threshold and the adjusted threshold value calculated in step 232 for the last threshold that resulted in the interval having a sample ratio of logic 1.

The base amplitude value added after step 250 is equal to the adjusted threshold value calculated in step 232 for the last threshold that resulted in the interval having a sample ratio of logic 1. Other offset techniques can be employed in different embodiments.

FIG. 15 illustrates one circuit implementation of the process steps shown in FIG. 12. Processing modules 283 and 285 determine the additional amplitude and weighting factor, respectively, based on histogram data 279. Processing module 281 determines the adjusted threshold. Adder 280 receives the adjusted threshold and additional amplitude. The resulting sum is input to multiplier 282, which also receives the weighting factor. The output of multiplier 282 is the weighted amplitude component, which is accumulated in accumulator 284. The weighting factor values for an interval are accumulated in accumulator 288. The output values from accumulator 284 and accumulator 288 are provided to divider 286, which divides the contents of accumulator 284 by the contents of accumulator 288. The output of divider 286 is combined with DC offset 289 by adder 287 to obtain a composite value for one interval within a waveform.

Figures 16A, 16C:
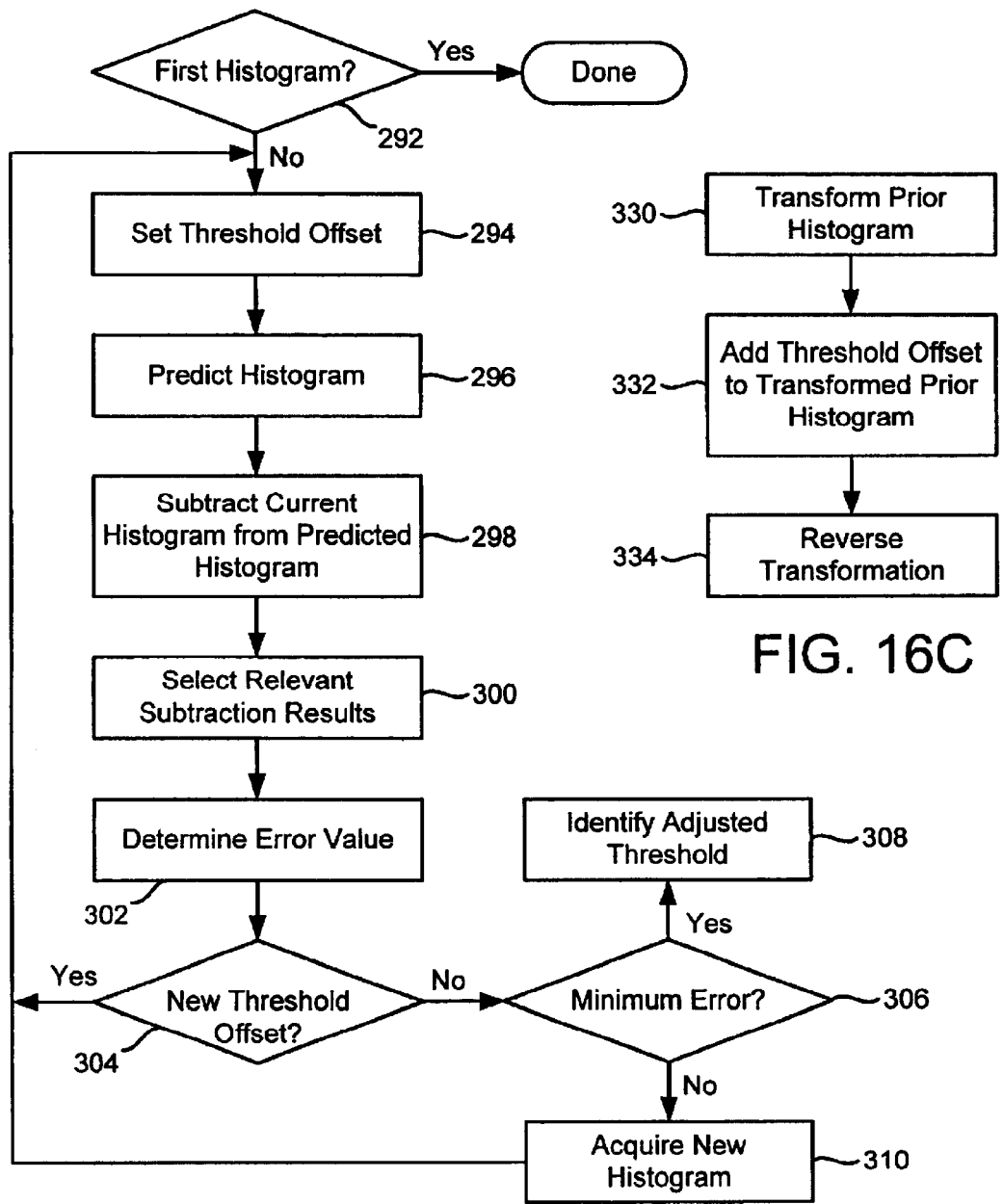
FIG. 16A is a flowchart describing one embodiment of a process for determining an adjusted threshold.
FIG. 16C is a flowchart describing one embodiment of a process for predicting a histogram.

The circuit shown in FIG. 15 is employed separately for each interval within the waveform to obtain composite a interval value. FIG. 15 is only one implementation of the process shown in FIG. 12 in hardware. Many other alternate embodiments are possible within the scope of the present invention. For example, circuitry can be added to account for re-sampling of the additional amplitude, using a substitute value for a zero accumulated weighting factor, or using an adjusted threshold with an amplitude base offset FIG. 16A is a flowchart describing one embodiment of a process for determining an adjusted threshold (Step 232, FIG. 12). Control engine 20 determines whether a histogram corresponding to the threshold selected in Step 230 (FIG. 12) is the first histogram obtained by device 10 in doing a measurement (Step 292). If so, no threshold adjustment is performed. Otherwise, control engine 20 sets a threshold offset (Step 294).

Control engine 20 predicts a histogram based on the threshold offset (Step 296). The predicted histogram is the expected histogram that would result when the threshold level used to capture the previous histogram is increased by the threshold offset. Control engine 20 subtracts the current histogram corresponding to the threshold selected in step 230 (FIG. 12) from the predicted histogram (Step 298). Control engine 20 subtracts each interval in the current histogram from a corresponding interval in the predicted histogram. Control engine 20 selects the relevant intervals within the subtraction results (Step 300). The selected intervals are the intervals where data in the current histogram is found to be reliable. In one implementation, an interval is reliable if the amplitude component falls below $2\sigma$. In alternate embodiments, different criteria can be employed for determining relevant histogram intervals.

The selected intervals are used to determine an error value (Step 302). In one implementation, control engine 20 obtains the error value by squaring the difference in each selected interval and adding the sum of the squared values. Control engine 20 determines whether to set a new threshold offset (Step 304). If so, control engine 20 sets a new threshold offset in step 294 and repeats the above-described process. In one implementation, control engine 120 determines that new threshold offsets are needed, until the threshold offset reaches a predetermined value. In one example, the first threshold offset is $0.4\sigma$, and threshold offsets are incremented by $0.05\sigma$ each time step 294 is performed. In one implementation, control engine 20 decides to set a new threshold as long as the current threshold offset is below $0.6\sigma$.

When control engine 20 decides not to set another threshold offset (Step 304), control engine 20 determines whether a minimum error has been identified (Step 306). Control engine 20 finds that a minimum error exists when a plot of the error values calculated in step 302 versus threshold offsets from step 294 has a clear minimum and that minimum is below a predetermined threshold.

Figure 16B:
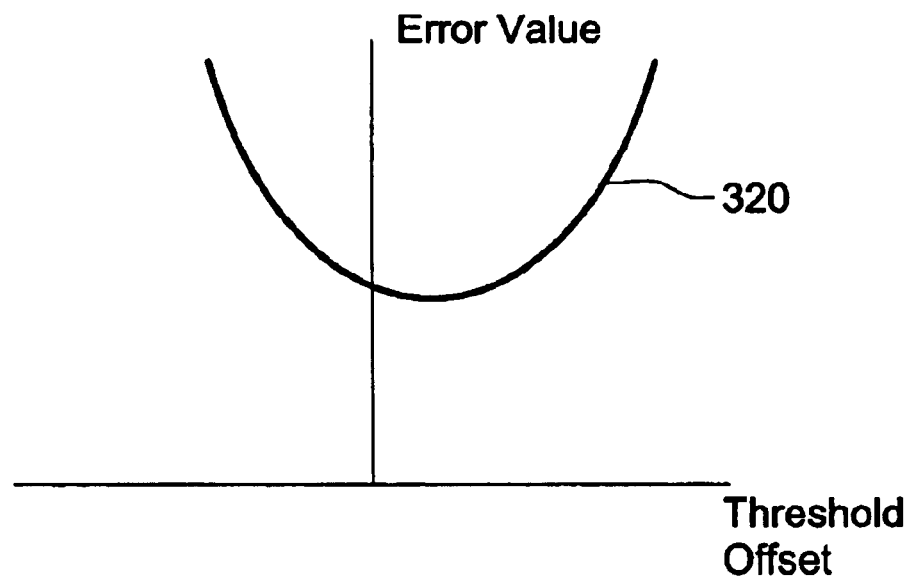
FIG. 16B is one example of an error value graph.

FIG. 16B illustrates error function 320 in one embodiment. Error function 320 is plotted out in a graph with the 'y' axis containing error values determined in step 302 and the 'x' axis containing threshold offsets determined in step 294. When a minimum point can be identified on error function 320 and that minimum point is below a predetermined threshold, a minimum error is detected (Step 306). In various embodiments, the predetermined threshold varies with the desired level of accuracy.

If there is no minimum error (Step 306, FIG. 16A), control engine 320 causes a new histogram to be acquired at the selected threshold (Step 310). The absence of a minimum error is an indicator that there may be a problem with the sampling that occurred to generate the histogram. In order to avoid errors associated with bad sampling, a new histogram is obtained. When a minimum error is identified (Step 306), control engine 20 identifies the adjusted threshold (Step 308). The adjusted threshold is equal to the threshold value selected in step 230 (FIG. 12) plus the threshold offset at which the minimum is detected.

FIG. 16C is a flowchart describing one embodiment of a process for predicting a histogram (Step 296, FIG. 16A). Control engine 20 transforms each interval of the prior histogram. Control engine 20 performs the transformation using the inverse error function in the same manner as described above to obtain additional amplitude values. Control engine 20 adds the threshold offset to the inverse error value for each interval in the histogram transformation (Step 332). Control engine 20 reverses the transformation of the function obtained in Step 332 to obtain the predicted histogram. The reverse transformation is achieved by applying the inverse of the inverse error function. For example, if the interval value is equal to 2σ, then the reverse transformed value for that interval is equal to the 'x' component in the inverse error function that is associated with a 'y' value of 2σ.

Figure 17:
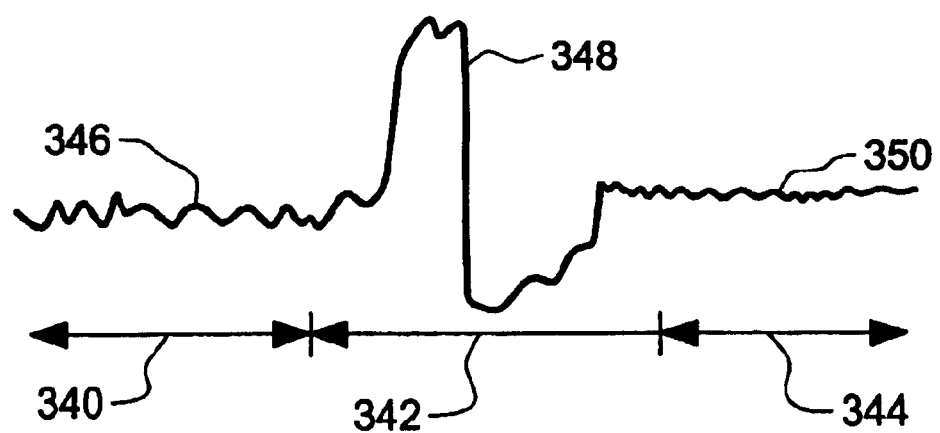
FIG. 17 is one example of laser-related noise and non-laser-related noise.

As discussed above, device 10 needs to identify the noise in a waveform, so that it can be removed when a distance determination is made. The noise associated with the waveforms in device 10 is broken down into laser-related noise and non-laser-related noise, as described above. FIG. 17 shows a graph of noise in device 10 over time. Time segment 342 corresponds to the time when source 50 is driven. Driving source 50 results in noise pattern 348. Time segments 340 and 344 occur before and after time period 342, respectively. Time segments 340 and 344 correspond to times when source 50 is not being driven. Noise patterns 346 and 350 correspond to time periods 340 and 344, respectively. Laser-related noise pattern 348 is substantially larger than the non-laser-related noise associated with components in device 10 when source 50 is not driven.

FIG. 18 is a flowchart describing one implementation of a process for identifying laser-related noise (Step 162, FIG. 7). Control engine 20 removes feedback reference beam 40 from the receive path (Step 370). In one implementation, control engine 20 sets optical attenuator 32 to eliminate reference feedback beam 40. Control engine 20 causes current driver 52 to drive laser source 50 (Step 371). Control engine 20 sets a threshold value (Step 372) and generates a waveform histogram for that threshold (Step 374). Steps 372 and 374 are performed in the same manner as described above for steps 164 and 170 (FIG. 7), respectively.

Control engine 20 determines whether a new threshold needs to be used for obtaining another histogram (Step 376). Step 376 is performed in the same manner as described above for step 172 in FIG. 7. In one implementation, only a single threshold is used—making step 376 unnecessary. In one embodiment, this single threshold value is equal to DC 0 volts. When no more thresholds need to be set for obtaining histograms, control engine 20 constructs a composite waveform using the obtained histograms (Step 380). Step 380 can be performed in the same manner as described above for step 174 in FIG. 7. The relevant portion of the reconstructed waveform is the section with intervals that correspond to time segment 342 in FIG. 17. Control engine 20 sets attenuator 32 to replace feedback reference beam 40.

FIG. 19 is a flowchart describing one embodiment of a process for identifying non-laser-related noise in a waveform (Step 168, FIG. 7). Control engine 20 does not allow laser source 50 to be driven during the process shown in FIG. 19. Control engine 20 generates a waveform histogram based on the noise captured by detector 26 (Step 390). In one implementation, the threshold is set to DC 0 volts and a single feedback reference pulse is employed in beam 40. The waveform histogram generated in step 390 is generated in the same manner as described in step 170 in FIG. 7. Control engine 20 constructs a composite waveform from the histogram (Step 392) in the same manner as described above for Step 174 in FIG. 7. The resulting waveform has relevant portions in the intervals falling in time periods 340 and 344 (FIG. 17).

Figure 20:
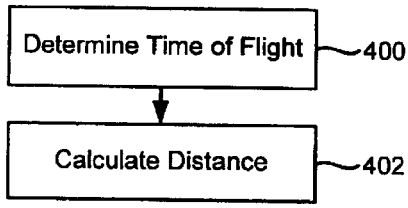
FIG. 20 is a flowchart describing one embodiment of a process for determining distance.

FIG. 20 is a flowchart describing one embodiment of a process for determining distance (Step 176, FIG. 7). Control engine 20 determines the time of flight for one or more pulses in a waveform emitted in beam 16 (Step 400). The time of flight measures the time difference between device 10 emitting a pulse on beam 16 and device 10 receiving a pulse on beam 14 that arises out of the beam 16 pulse being reflected on object 12. Control engine 20 determines the distance between device 10 and object 12 based on the time of flight information from Step 400 (Step 402). In one implementation, the distance is calculated using the above-identified equation for distance calculation.

Figure 21:
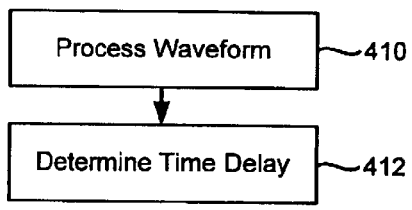
FIG. 21 is a flowchart describing one embodiment of a process for determining time of flight.

FIG. 21 is a flowchart describing one embodiment of a process for determining time of flight (Step 400, FIG. 20). Control engine 20 processes a waveform received by detector 26 (Step 410). The waveform includes one or more feedback reference pulses followed by one or more return pulses. Each return pulse in the waveform is generated from the reflection of a respective emitted pulse in beam 16 that corresponds to one of the feedback reference pulses in the waveform. Control engine 20 processes the waveform so that each point on each feedback reference pulse can be matched to a corresponding point on a return pulse. In order for this to happen, the return pulses and feedback reference pulses must have similar or equal intensities. Each leading and trailing edge in each feedback reference pulse needs to have similar or the same slopes as the feedback reference pulse's corresponding return pulse. Control engine 20 also needs to remove the noise from the waveform. Control engine 20 determines time delay using the processed waveform (Step 412).

Figure 22:
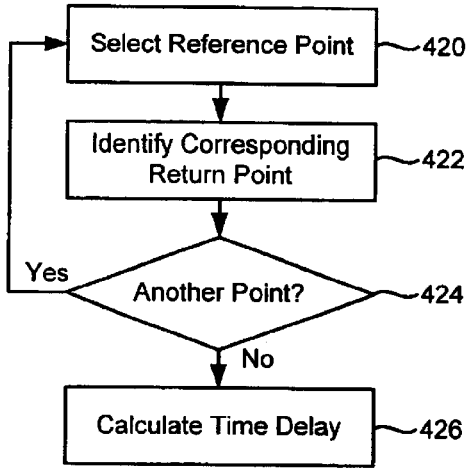
FIG. 22 is a flowchart describing one embodiment of a process for determining time delay.

FIG. 22 is a flowchart describing one embodiment of a process for determining time delay (Step 412). The process shown in FIG. 22 will be described with reference to the waveform shown in FIG. 23, which represents a digitized version of the waveform originally shown in FIG. 4. Reconstructed feedback reference pulse 440 corresponds to feedback reference pulse 70 in FIG. 4, and reconstructed return pulse 442 corresponds to return pulse 72 in FIG. 4.

Figure 23:
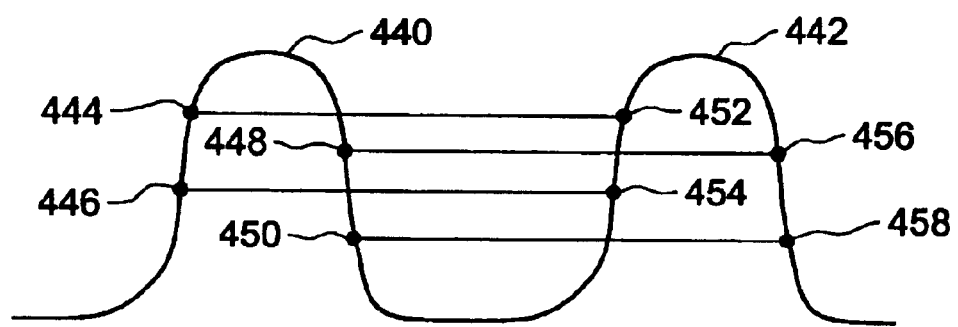
FIG. 23 shows matched reference points and corresponding return points in one example of a waveform.

Control engine 20 selects a reference point on one of the feedback reference pulses in the waveform (Step 420). In the example shown in FIG. 23, there is a single feedback reference pulse 440 and a single return pulse 442. In one example, control engine 20 selects reference point 444 on feedback reference pulse 440. Control engine 20 identifies a corresponding return point for the selected reference point (Step 422). Control engine 20 identifies a point on a return pulse that was generated from the reflection of a pulse point corresponding to the selected feedback reference point. In FIG. 23, the corresponding return point for reference point 444 is 452. Control engine 20 determines whether to select another reference point (Step 424). In one implementation, control engine 20 selects a reference point that corresponds to each interval in the waveform. If another reference point is to be selected, control engine 120 loops back and selects the reference point (Step 420) and repeats the above-described process. Otherwise, control engine 20 calculates a time delay (Step 426).

In the example shown in FIG. 23, corresponding return points are identified for reference points 444, 446, 448, and 450. The corresponding return points are 452, 454, 456, and 458, respectively. In one implementation, all of the selected reference points fall below 90% of the peak amplitude of the feedback reference pulse and above 10% of the peak amplitude of the feedback reference pulse. This avoids extraneous effects that can result from imperfect definition of the base and peak of the feedback reference pulse.

In one implementation, control engine 20 calculates the time delay (Step 426, FIG. 22) by taking the statistical mean of each delay from a reference point to a corresponding return point. In alternate embodiments, the time delay can be calculated in other ways, such as taking the average of each time delay between a reference point and corresponding return point. In a further embodiment, control engine 20 weights different time delay measurements. Measures at steeply sloped portions of the pulses are more reliable, so they are given a higher weight. In one example, the weighting factor is a coefficient equal to the slope of the pulses at the selected point. The delay is calculated as the accumulation of weighted time delays divided by an accumulation of all weighting coefficients.

FIG. 22 has been described with respect to FIG. 23 showing only a single feedback reference pulse and a single return pulse. Those skilled in the art will recognize that the process in FIG. 22 can be applied to the waveform with any number of feedback reference pulses and any number of return pulses.

Figure 24:
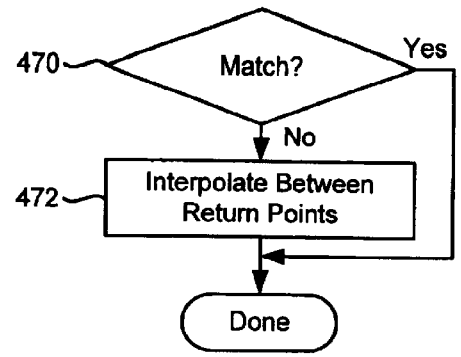
FIG. 24 is a flowchart describing one embodiment of a process for identifying corresponding return points.

FIG. 24 is a flowchart describing one embodiment of a process for identifying a corresponding return point (Step 422, FIG. 22). Control engine 20 determines whether a value is stored for the location on the return pulse that corresponds to the selected reference point on the feedback reference pulse (Step 470). In some implementations, the reconstructed waveform is a digital representation of the waveform. The return and reference pulses are maintained as a set of discrete digital values with each value corresponding to a point in time. This can result in the reference point not having a stored value at a time that exactly corresponds to the selected reference point. In this case, control engine 20 determines there is no match (Step 470). Otherwise, a match is found and the process in FIG. 24 is complete.

When no match is found, control engine 20 interpolates to determine the time location of a corresponding return point (Step 472). In one implementation, control engine 20 interpolates using the time values associated with the stored return pulse points that are closest to the desired corresponding return point. Control engine 20 uses these two stored points to interpolate a value for the corresponding return point. In one implementation, control engine 20 employs finite impulse response filter interpolation to determine the corresponding return point. This type of interpolation is well-known in the art. In one embodiment, a 20 to 1 interpolation is employed and results in sampling steps of 50 picoseconds. The use of multiple points along an edge improves the resolution.

Figure 25:
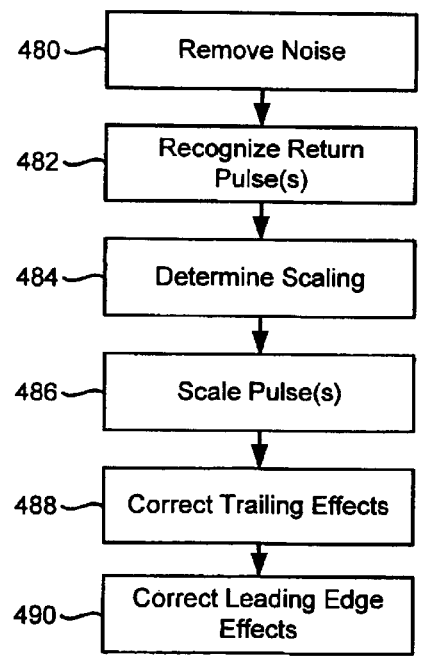
FIG. 25 is a flowchart describing one embodiment of a process for processing a waveform.

FIG. 25 is a flowchart describing one embodiment of a process for processing an incoming waveform (Step 410, FIG. 21). Control engine 20 removes noise from the waveform (Step 480). As described above, there are two noise components—the laser-related noise and non-laser-related noise. These two components are shown in FIG. 17. FIGS. 18 and 19 describe processes for obtaining a digital reconstruction of the laser-related and non-laser-related noise, respectively. The reconstructed noise for the non-laser-related noise in time periods 340 and 344 (FIG. 17) is subtracted from the reconstructed waveform in time periods 340 and 344. The reconstructed laser-related noise (period 342 in FIG. 17) is subtracted from the reconstructed waveform in time period 342. Note that reference to time periods 340 and 344 refers to all times at which laser source 50 is not being driven. The reference to time period 342 refers to all time periods when the laser 50 is driven. In alternate embodiments, multiple non-laser-related noise reconstructions can be used to form a composite representation of non-laser-related noise for use in step 480.

Control engine 20 recognizes the one or more return pulses in the newly received waveform (Step 482). In the case of fine distance measurement (Step 144, FIG. 6), the return pulse that corresponds to a feedback reference pulse are recognized by locating the pulse that is most closely offset from the reference pulse by a time measurement found during the performance of coarse distance measurement (Step 140, FIG. 6). This is done for each return pulse to correlate it to a feedback reference pulse.

Control engine 20 determines the appropriate scaling to employ on the one or more feedback reference pulses in the new waveform (Step 484). Control engine 20 scales the feedback reference pulses, so that the feedback reference pulses have an intensity that is the same or very close to the return pulses (Step 486). In one implementation, the intensity of the feedback reference pulses is within one percent of the intensity of the return pulses. Scaling is important, because it brings the rising and falling edge times on the feedback reference pulses closer to the rising and falling edge times on the return pulses. As discussed above, the similarity between the transition edges on feedback reference pulses and return pulse is important. Matching edges causes the feedback reference and return pulses to experience the same propagation delay when flowing through preamplifier 24 and comparator 22.

Figure 26:
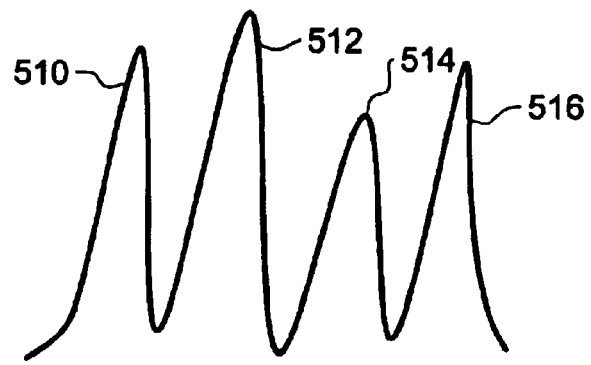
FIG. 26 is an example waveform prior to waveform processing being performed.
Figure 27:
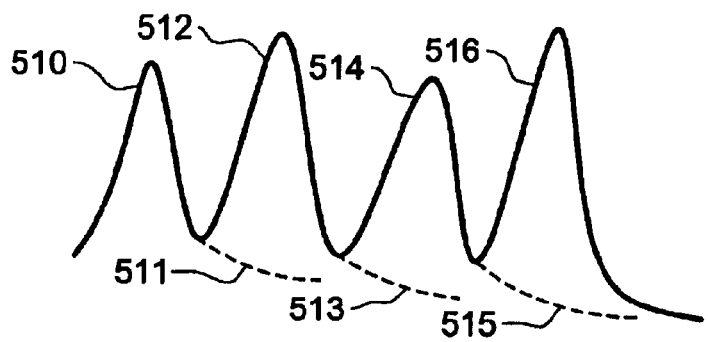
FIG. 27 is an example waveform after scaling.

FIG. 26 shows a waveform including two reference pulses and two return pulses prior to scaling. Pulses in beam 16 correspond to feedback reference pulses 510 and 512 lead to the generation of return pulses 514 and 516, respectively. Feedback reference pulses 510 and 512 have larger intensities than return pulses 514 and 516 and need to be scaled down. In one implementation, scaling is performed on each feedback reference pulse-return pulse pair. The scaling uses the ratio of the area under the return pulse to the area under the feedback reference pulse. Control engine 20 multiplies the intensity of the feedback reference pulse by the ratio—reducing the intensity of the feedback reference pulse to the intensity of the return pulse. FIG. 27 shows the effect of scaling on feedback reference pulses 510 and 512. After scaling, feedback references pulses 510 and 512 have the same intensity as return pulses 514 and 516. In an alternate embodiment, different scaling can be employed, such as scaling up return pulses 514 and 516.

Control engine 20 corrects trailing edge effects in bursts of reference pulses and bursts of return pulses (Step 488, FIG. 25). The trailing edge effects are shown in FIG. 27. The trailing edges of pulses 510, 512, 514, and 516 trail off with a resistive capacitive time dependency that results form the circuit path these pulses travel. This time dependency can cause the slope of the trailing edges to decrease, so that the trailing edge runs into the rising edge of the next pulse in the burst. The trailing edge effects of pulses 510, 512, and 514 are shown as segments 511, 513, and 515, respectively. As can be seen in the relationships between pulse 510 and pulse 512, the initiation of pulse 512 is merged with the trailing edge of pulse 510—giving the pulse 512 an upward offset. The same effect is seen in the pair of pulses with pulse 514 and pulse 516.

Figure 28:
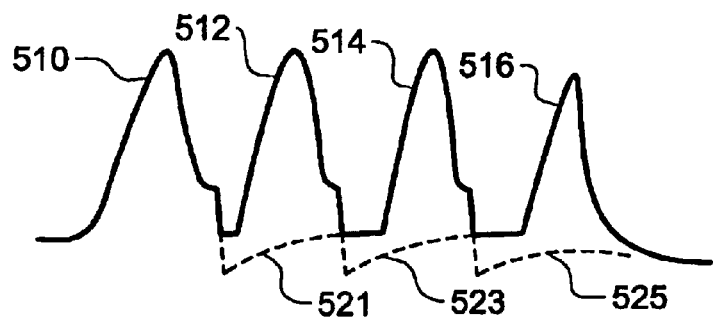
FIG. 28 is an example waveform after correcting trailing edge effects.

These trailing edges have a residual effect that distorts the following pulse's leading edge. This is particularly problematic when the trailing edge of a feedback reference pulse effects the leading edge of a return pulse, as shown in FIG. 27. Obscuring the definition of the trailing and rising pulse edges will prevent accurate identification of corresponding points on feedback reference and return pulses. Identifying the points is required in order to determine time of flight. Control engine 20 processes each pulse to remove the trailing edge effects of the prior pulse. As will be explained in greater detail below, control engine 20 achieves this in one embodiment by subtracting trailing edge components 511, 513, and 515 from the following one or more pulses in the burst. FIG. 28 shows the result of this trailing edge processing. Pulses 510, 512, 514, and 516 now all have leading edges that are well matched within the region that corresponding points are identified for time delay determinations. FIG. 28 shows offset corrections 521, 523, and 525 that are applied to trailing edge components 511, 513, and 515, respectively.

Figure 29:
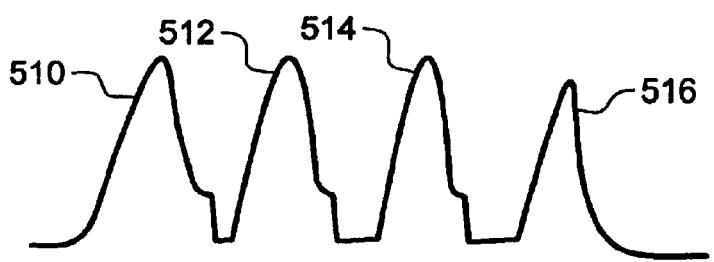
FIG. 29 is an example waveform after correcting leading edge effects.

Control engine 20 also corrects leading edge effects in the waveform pulses (Step 490, FIG. 25). In some instances, a corresponding pair of a return pulse and reference pulse can have leading edges without matching rise times. This can occur due to scaling errors in setting the attenuation of attenuator 32. Control engine 20 processes the feedback reference pulses so that their rising time on the leading edges becomes much closer to or the same as the rising time on the leading edge of a corresponding return pulse. In one implementation, control engine 20 provides further scaling adjustments to the reference pulses in order to adjust the rise times of their leading edges. FIG. 29 shows the effects of the leading edge processing from Step 490. The leading edges of feedback reference pulses 510 and 512 have slopes that are the same as the leading edges for return pulses 514 and 516, respectively.

In an alternate implementation, control engine 20 combines the steps of scaling pulses and correcting leading edge effects. In this implementation, the scaling performed to remove leading edge effects is the only scaling that is performed. In further embodiments, control engine 20 also eliminates outlying measurements that appear to be much different than other reference or return pulses. In further embodiments, different and additional operations can be employed to perform waveform processing.

Figure 30:
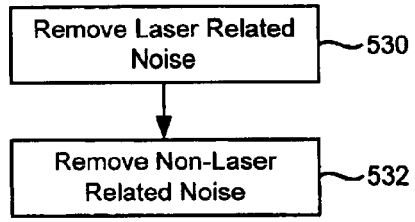
FIG. 30 is a flowchart describing one embodiment of a process for removing noise.

FIG. 30 is a flowchart describing one embodiment of a process for removing laser-related noise and non-laser-related noise form the waveform. Control engine 20 subtracts laser related noise from the waveform (Step 530) and non-laser-related noise from the waveform (Step 532), as described above.

Figure 31:
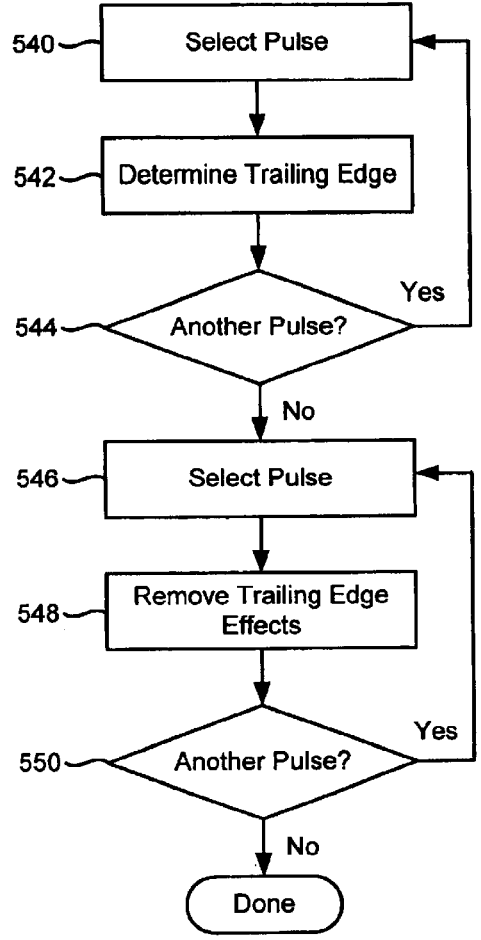
FIG. 31 is a flowchart describing one embodiment of a process for correcting trailing edge effects.

FIG. 31 is flowchart describing one implementation of a process for correcting trailing edge effects (Step 488, FIG. 25). Control engine 20 selects a pulse in the waveform (Step 540). Control engine 20 determines the equation coefficients for the trailing edge of the selected pulse (Step 542). In one implementation, the falling edge has the following equation:

$$Y = A * e^{-\alpha t}$$

Wherein:

Y is a trailing edge magnitude value;

A is a constant;

$\alpha$ is a constant; and t is time.

Any well known technique can be used to determine the equation for the trailing edge. In one implementation, a log is taken of the values of the trailing edge to convert the values into a line. The line has a 'y' axis offset and a slope. The offset is used to determine the 'A' constant and the slope is used to determine the $\alpha$ constant.

If any pulses remain (Step 544), control engine 20 selects another pulse. Otherwise, control engine 20 selects a pulse in the waveform other than the waveform's first pulse, such as pulse 510 in FIG. 29 (Step 546). Control engine 20 removes the trailing edge effects from the pulse preceding the selected pulse (Step 548).

In one implementation, control engine 20 determines the trailing edge effect of the prior pulse using the equation that was determined for this trailing edge in step 542. Control engine 20 subtracts the effect of the trailing edge from the selected pulse. In an alternate embodiment, control engine 20 subtracts the trailing edge effects of all pulses preceding the selected pulse. This may not be necessary in some applications, because the effects can be negligible after the time duration of a single pulse. If any pulses remain unselected except for the first pulse in the waveform (Step 550), control engine 20 selects another pulse (Step 546) and repeats step 548. Otherwise, the trailing effect process is complete.

Figure 32:
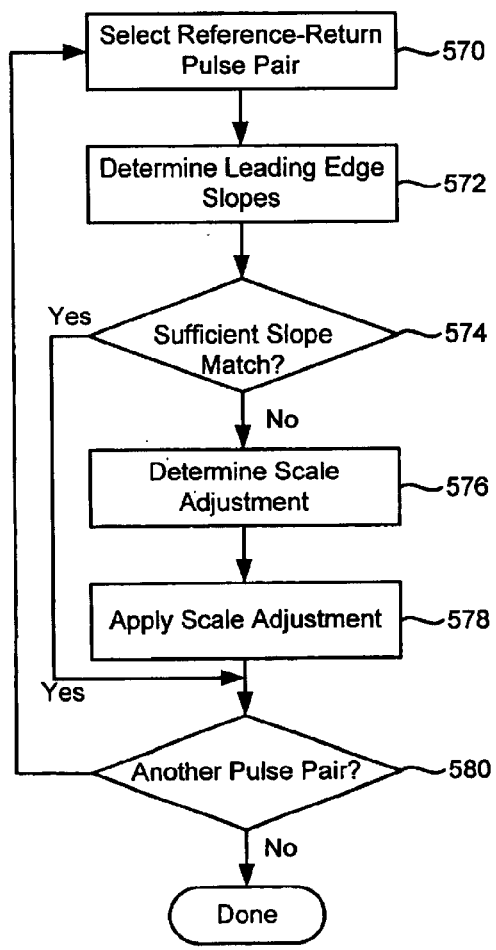
FIG. 32 is a flowchart describing one embodiment of a process for correcting leading edge effects.

FIG. 32 is a flowchart describing one embodiment of a process for correcting leading edge effects (Step 490, FIG. 25). Control engine 20 selects a reference—return pulse pair (Step 570). Control engine 20 selects a feedback reference pulse and the corresponding return pulse that was generated from the reference pulse to form the pair. Control engine 20 determines the leading edge slopes for the selected feedback reference pulse and return pulse (Step 572). Control engine 20 determines whether the slopes of the reference and return pulse are sufficiently matched (Step 574). In one implementation, the slopes are sufficiently matched if the ratio of the return pulse leading edge slope to the feedback reference pulse leading edge slope is within the range of one percent or less.

If the match is sufficient, control engine 20 determines whether to select another reference—return pair. If a reference—return pair remains unselected, control engine 20 selects another pair in step 570 and repeats the above-described process. Otherwise, control engine 20 determines a scale adjustment to apply to the feedback reference pulse (Step 576). In one embodiment, the scale adjustment is equal to the ratio of the area under the return pulse divided by the area under the feedback reference pulse. In alternate embodiments, different scaling adjustments can be determined. Control engine 20 applies the scaling adjustment (Step 578). In one implementation, a scaling adjustment is applied by multiplying the reference pulse by the ratio of the return pulse to the feedback reference pulse.

Control engine 20 determines whether another return reference—return pulse pair remains to be selected (Step 580). If so, another reference—return pulse pair is selected (Step 570), and the above process is repeated. Otherwise, the leading edge correction is done. In alternate embodiment, scaling adjustments are maintained in a calibration table in control engine 20. In a further embodiment, an adjustment is only performed if the average of the difference in feedback reference and return slopes of all the pulses exceeds a certain matching criteria.

Figure 33A:
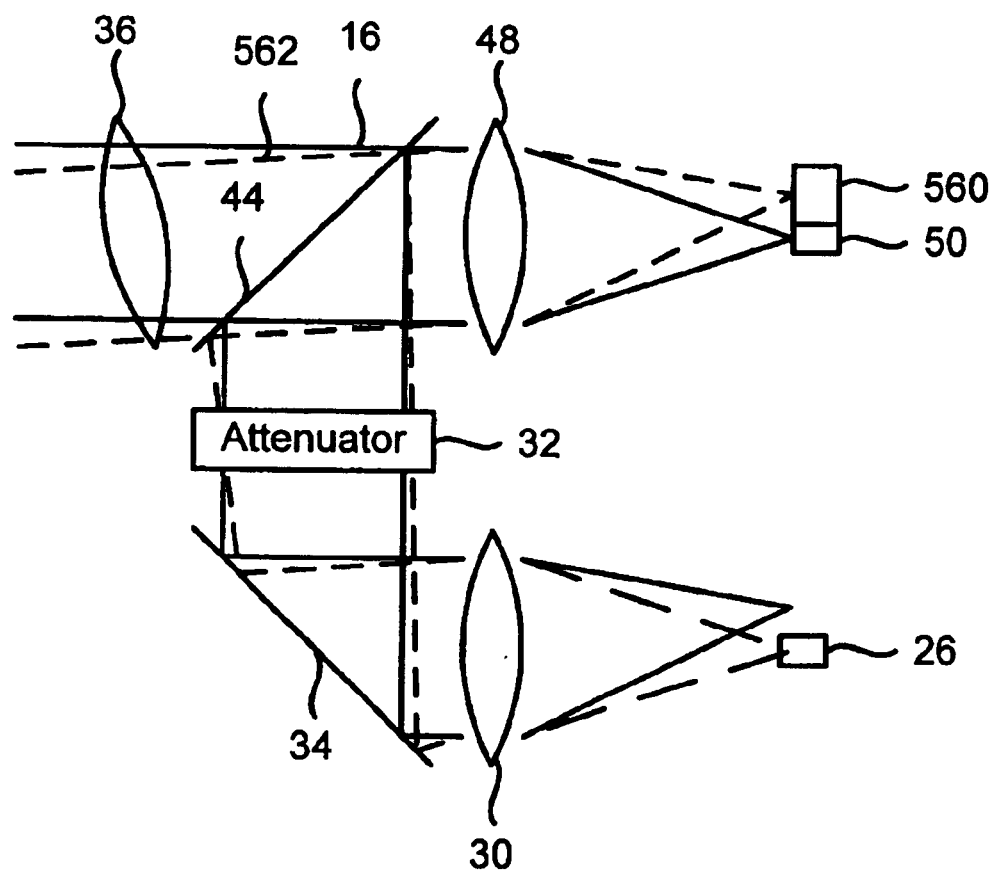
FIG. 33A is a block diagram of one embodiment of scrambling optics for a distance measurement device.

FIG. 33A shows one embodiment of the optics in device 10. In one implementation, laser source 50 is a mixed mode laser diode. Collecting a portion of the laser's output beam at mirror 44 may not collect all of the laser beam's modes. This makes it difficult to obtain feedback reference pulses that will match the return pulses, which have fully scrambled modes from traveling through the entire reflection path. The optics shown in FIG. 33A provides for scrambling modes in feedback reference beam 40, so that better matching feedback reference pulses can be obtained.

Scrambling is achieved by an angular offset in window 36. Window 36 is offset from being normal to beam 16 by 2–3 degrees in one implementation. In alternate implementations, different angular offsets can be employed. The offset results in reflection beam 562. Reflection beam 562 travels back into lens 48 through partially transmissive beam splitter 44. Reflection beam 562 passes through lens 48 to impact on diffuse reflector 560. In one implementation, diffuse reflector 560 is a piece of white paper residing adjacent to laser diode 50.

Beam 562 reflects off of diffuse reflector 560 and is offset from the angle of projection for beam 16. The reflections from mirror 36 and diffuse reflector 560 cause beam 562 to be scrambled with mixed modes. Beam 562 continues from reflector 560 through lens 48 and onto beam splitter 44. Beam splitter 44 reflects and transmits the scrambled output. The reflected portion of the scrambled output travels to attenuator 32 and becomes incident on mirror 34 as feedback reference beam 40. Mirror 34 reflects the scrambled feedback reference beam through lens 30 and onto detector 26. Ideally, the reflections of beam 16 traveling through attenuator 32 and onto mirror 34 do not impact on detector 26.

Separating the reflections of beams 16 and 562 is important to ensure that the portion of beam 16 reflected off mirror 34 does impact detector 26. Otherwise, the feedback reference pulses carried by reflections of beam 562 will not accurately match the mixed mode pulses of the return beam (not shown) that impact detector 26. The intensity of the non-mixed pulses in beam 16 is much greater than reflections of beam 562 within device 10, due to the additional optics path traversed by beam 562. As a result, feedback pulses from beam 16 would overwhelm the effects of reflections from beam 562 if both beams impact detector 26. In some cases the intensity of pulses in reflections from beam 16 are 100 times greater than reflections of beam 562 that reach detector 26. When time delay is measured using the system shown in FIG. 33A, time must be added to the measured delay between feedback reference pulses and return pulses. This is done to offset the additional delay that pulses in beam 562 undergo, as compared to pulses in beam 16.

Figure 33B:
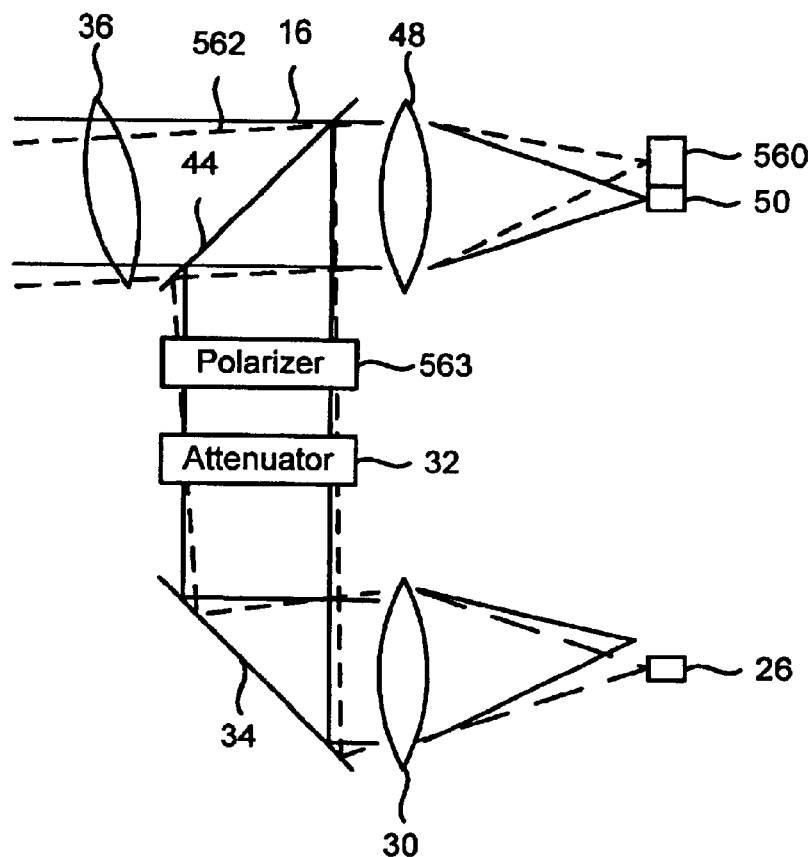
FIG. 33B is a block diagram of an alternate embodiment of scrambling optics for a distance measurement device.
Figure 33C:
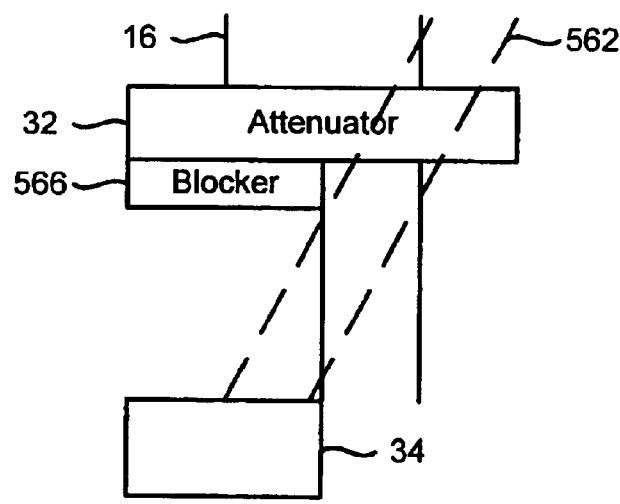
FIG. 33C is a block diagram of another embodiment of scrambling optics for a distance measurement device.
Figure 33D:
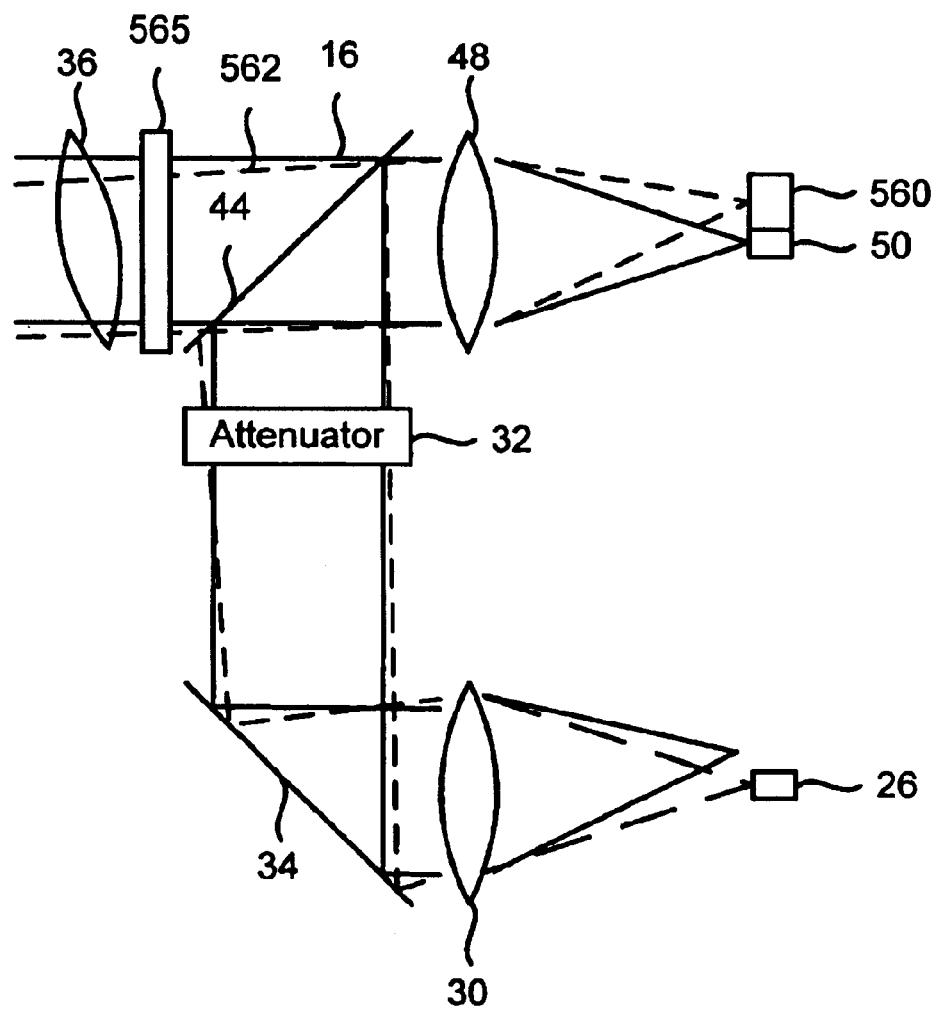
FIG. 33D is a block diagram of yet another embodiment of scrambling optics for a distance measurement device.

In some instances, angling beam splitter 44 and mirror 34 does not sufficiently separate feedback reference pulses in beam 16 reflections from feedback reference pulses in beam 562 reflections. FIGS. 33B–33D illustrate additional techniques that can be employed to inhibit feedback reference pulses in reflections of beam from reaching detector 26.

FIG. 33B shows the addition of polarizer 563 between beam splitter 44 and attenuator 32. Approximately 50% of the intensity of reflection from beam 562 passes through polarizer 563, while only 2% of reflections of beam 16 pass through polarizer 563. This greatly reduces the effects that reflections of beam 16 will have if they reach detector 26. The mixed mode characteristics of beam 562 allow its reflections to pass through polarizer 563 at higher levels than reflections of beam 16. This result occurs because beam 16 has predominantly one polarization state, while beam 562 has random polarization.

FIG. 33C shows the optics assembly from FIG. 33A rotated counter-clockwise by 90° about an axis running from the top of the page to the bottom of the page. The device shown in FIG. 33C includes blocker 566 between attenuator 32 and mirror 34. Blocker 566 blocks reflections of beam 16 from reaching reflector 34—making it impossible for these reflections to reach detector 26. Only reflections from beam 562 reach reflector 34 to be directed onto detector 26.

FIG. 33D shows another embodiment of the optics from FIG. 33A that includes shutter 565. Shutter 565 is initially closed to prevent the generation of beam 562. This allows control engine 562 to take a baseline measure of the reflections of beam 16 that reach detector 26. During measurements, shutter 565 is opened to enable beam 562, as explained above with reference to FIG. 33A. When control engine 20 processes a composite waveform representation of the feedback reference pulse, control engine 20 subtracts the effects of the baseline measure to eliminate the effects of beam 16 reflections reaching detector 26. This operation can be performed in the same manner as described above for removing noise from a composite waveform.

In alternate embodiments, different mechanisms can be used for implementing scrambling. Additionally, different angular offsets can be used for window 36 or other components in the optical design to achieve the desired scrambling.

Figure 34:
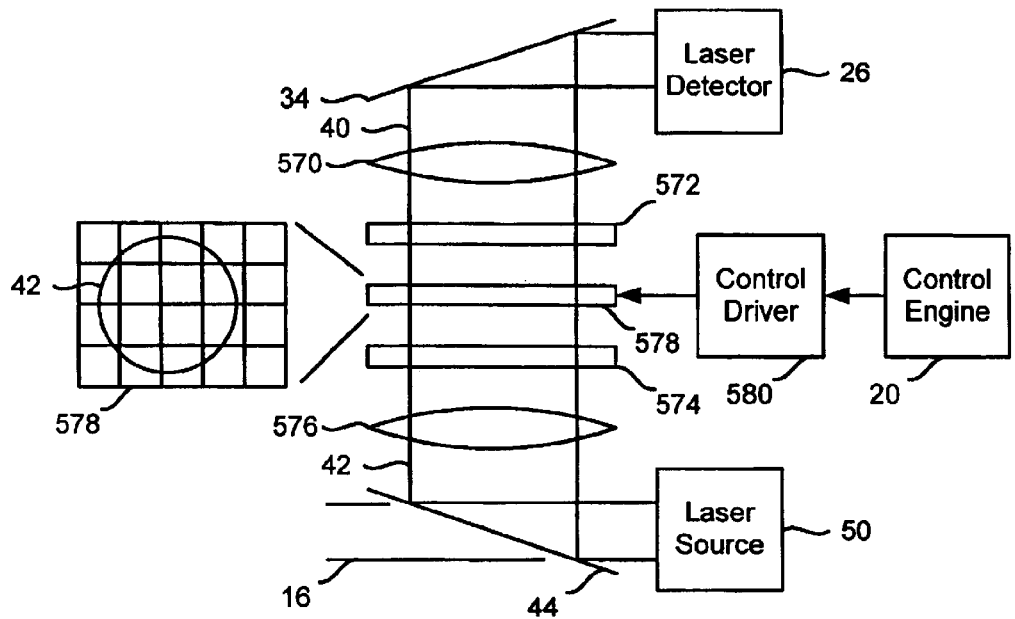
FIG. 34 is a block diagram of one embodiment of an optical attenuator.

FIG. 34 shows an embodiment of optical attenuator 32 that electronically adjusts the amplitude of beam 42. Collimating lenses 576 and 570, linear polarizers 574 and 572, and liquid crystal shutter 578 combine to form optical attenuator 32. Collimating lens 576 is aligned to receive beam 42. Linear polarizer 574 is aligned with lens 576 to receive collimated beam 42 from lens 576. Polarizer 574 polarizes beam 42 and passes beam 42 to liquid crystal shutter 578. Liquid crystal shutter 578 can be controlled to provide different levels of attenuation to different potions of the incoming beam. Shutter 578 has a grid of cells, and the attenuation provided within each cell is controlled separately.

Shutter 578 is coupled to control driver 580, which sets the attenuation provided by each cell in shutter 578. Control driver 580 is coupled to control engine 20 to receive signals that indicate the desired level of attenuation from attenuator 32. In one implementation, control driver 580 sets all of the cells within shutter 578 to provide the same attenuation. In alternate embodiments, control driver 580 sets different attenuation levels for different portions of the beam. Linear polarizer 572 is aligned to receive and polarize the output beam of shutter 578. Collimating lens 570 is aligned to receive the polarized beam from polarizer 572 and provide feedback reference beam 40.

As discussed above, laser source 50 can be a VCSEL in one embodiment and a laser diode in another embodiment. When laser diode 50 is employed, linear polarizers 572 and 574 are not employed. When laser source 50 is a VCSEL, it is necessary to employ linear polarizers 572 and 574.

Figure 35:
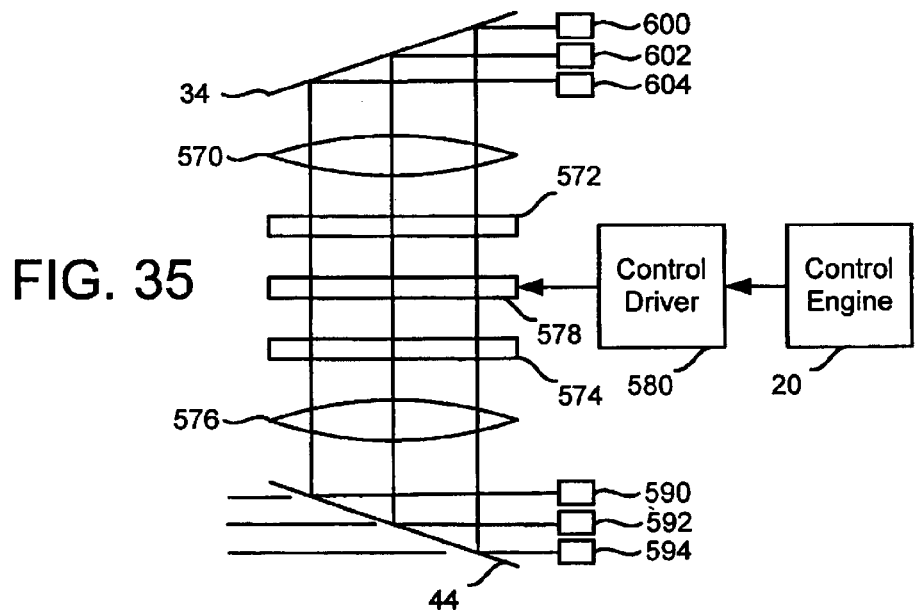
FIG. 35 is a block diagram of one embodiment of an optical attenuator in a multi-beam distance measuring device.

FIG. 35 shows the use of optical attenuator 32 from FIG. 34 in a multi-beam measuring device. Attenuator 32 attenuates multiple transmit beams. In the system shown in FIG. 35, device 10 includes multiple laser sources 590, 592 and 594. In one implementation, these laser sources can be integrated into the same VCSEL device. Alternatively, laser sources 590, 592 and 594 can be separate laser diodes or other laser sources.

Figure 36:
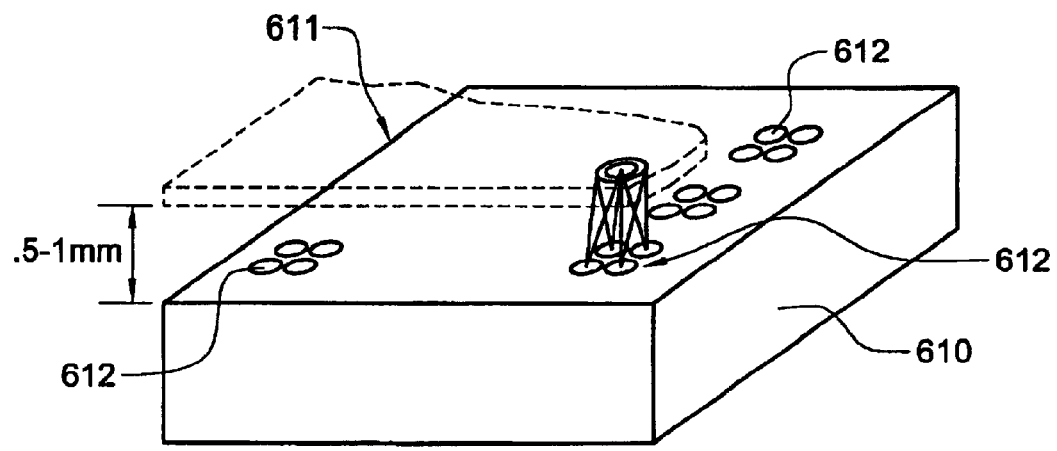
FIG. 36 shows one example of a Vertical Cavity Surface Emitting Laser ("VCSEL") array.

FIG. 36 shows example VCSEL 610. Different segments of VCSEL 610 can be programmed to provide separate beams. VCSEL 610 includes many emitting instances 612 with each emitting instance generating a laser output. VCSEL 610 also include diffuse layer 611, which merges lasers emitted from neighboring instances. When used to generate a single laser beam, control engine 20 drives clusters of emitting instances so that the emissions merge together into a single beam. In a multiple output beam implementation, control engine 20 drives multiple clusters of emitting instances. Each cluster includes a set of instances that have outputs merging together to form a separate beam—allowing VCSEL 610 to emanate multiple beams.

In FIG. 35, each of the beams from laser sources 590, 592 and 594 impact on beam splitter 44. A portion of each beam passes out of device 10 to a respective object, and a portion of each beam reflects off of mirror 44 into optical attenuator 32. Lens 576 receives the individual beams and provides them to linear polarize 574—focusing each beam onto a separate cluster of cells in shutter 578. Control engine 20 sets the cells in shutter 578, so that the desired level of attenuation is provided to each beam. This allows the above-described distance measurement methods to be employed individually for each reference beam.

The reference beams emanating from shutter 578 pass through polarizer 572 and lens 570 to impact on mirror 34. The reflected beams from mirror 34 each impact a respective one of laser detectors 600, 602 and 604. In one embodiment, a current driver is associated with each of laser sources 590, 592 and 594 when these sources are formed by laser diodes. Similarly, each of laser detectors 600, 602 and 604 is associated with a separate combination of a preamplifier and comparator that is coupled to control engine 20. Control engine 20 receives the output of each comparator and separately performs the above-described distance determination process for each individual beam.

Figure 37:
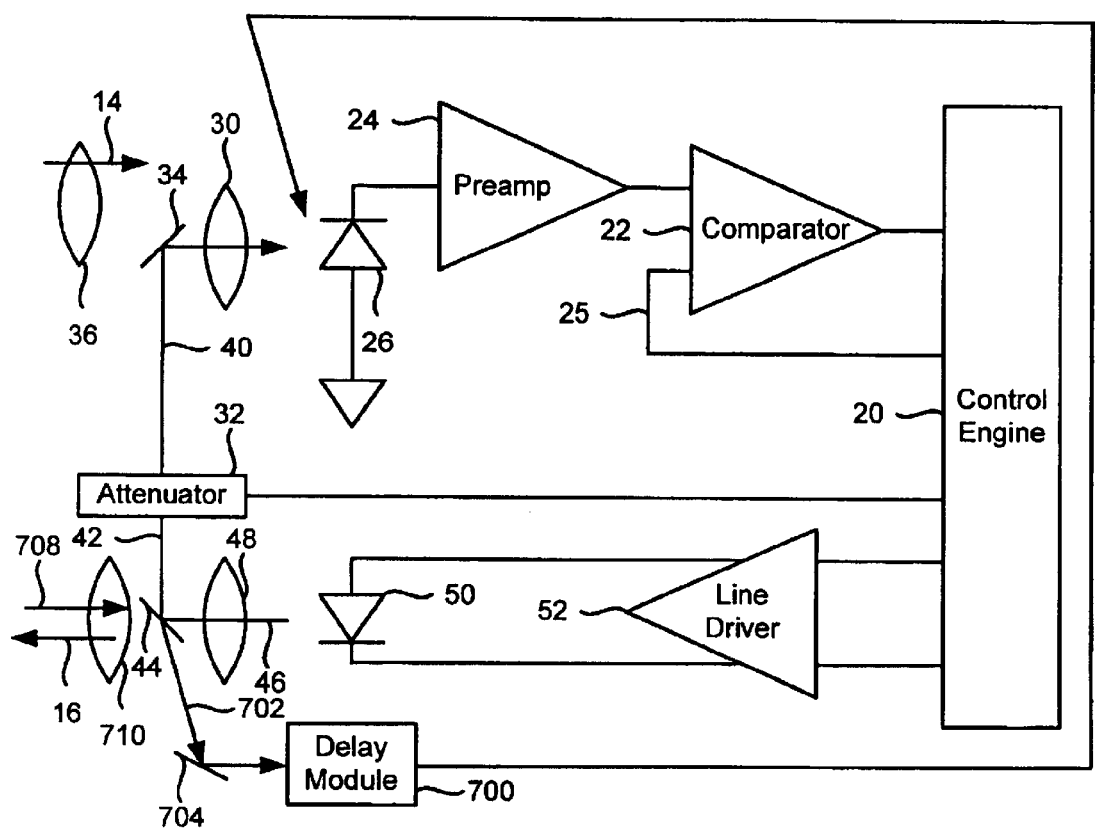
FIG. 37 is a block diagram of one embodiment of a device that measures short distances.

FIG. 37 is a block diagram of one embodiment of distance measurement device 10 that enables measurement down to nose-to-nose alignment with object 12. The components in FIG. 37 that have the same numbers as those shown in FIG. 2 operate the same as the components shown in FIG. 2, unless they are described to operate differently below. Visible laser source 43 is not shown in FIG. 37 for convenience of illustration. Some embodiments of device 10, as shown in FIG. 37, can include visible laser source 43. These facts are also true for the embodiments of device 10 shown in FIGS. 38 and 39.

When distance measurement device 10 moves closer to object 12, the angle of reflection between output beam 16 and return beam 14 increases. When measurement device 10 gets within 2 to 3 meters of object 12, return beam 14 translates away from detector 26 as device 10 gets closer to object 12. Eventually, detector 26 can no longer detect return beam 14. This prevents device 10, as shown in FIG. 2, from measuring the distance between device 10 and object 12 based on beam 14. The embodiment of device 10 shown in FIG. 37 provides for distance measurement at short distances.

Device 10 transmits beam 16, as described above, with the following enhancements. Beam 46 emanating from laser source 50 exhibits primarily one polarization state. Beam 46 passes through collimating lens 48 and onto incline beam splitter 44. In one embodiment, beam splitter 44 is positioned as close to the Brewster angle as possible to minimize transmission loss of beam 46. The portion of beam 46 that passes through lens 48 passes through wave plate 710. Wave plate 710 circularly polarizes the incoming beam to create output beam 16. In one implementation, wave plate 710 is one-quarter inch thick. In alternate implementations, different thicknesses can be employed.

Wave plate 710 also receives return beam 708, which is a reflection of beam 16 from object 12. Beam 708 has a polarity opposite from beam 16. Beam 708 passes through wave plate 710 and onto beam splitter 44. Beam splitter 44 reflects beam 708 onto reflector 704. Reflector 704 is aligned to receive reflected beam 708 and reflect beam 708 onto an input of delay module 700. Delay module 700 delays the pulses on beam 708 and provides the delayed pulses on an output that directs the pulses of beam 708 onto detector 26. If the target is a diffuse reflector, the returning beam will be randomly polarized, resulting in a lower portion of the return beam being focused into the delay module.

As shown in FIG. 37, return beam 14 translates away from the center of window 36 at close ranges and misses detector 26. Device 10 employs the pulses from beam 708 to perform the above-described distance measurement. Although beam 708 and beam 14 are described as separate beams, they are actually just different portions of the reflection that results from beam 16 impacting object 12.

In one implementation, delay module 700 includes a holographic or other conventional lens in series with a fiber optic cable. The lens receives beam 708 and focuses the energy of beam 708 into a large core diameter plastic fiber. In one implementation, the plastic fiber has a diameter of 500 micrometers or greater. In one implementation, the fiber has transmission losses of 2 decibels ("dB")/meter, resulting in 10 dB loss for a 5 meter coil of the fiber. Different fiber characteristics can be employed in various embodiments.

The delay provided by module 700 ensures that the pulses on beam 708 do not overlap with the pulses in reference beam 40—enabling the use of above-described distance measurement technique using reference and return pulses. The delay provided by module 700 is known by device 10 and subtracted from time delay determinations made in the above-described distance determination process. In further implementations, delay module 700 ensures that the beam pulses on beam 708 fall after the feedback reference pulses on beam 40 and any pulses detected from beam 14. This prevents distortion from an overlap of beam 14 and the output of delay module 700 when device 10 is separated from object 12 by distances on the verge of being too short to use the distance measuring optics depicted in FIG. 2. In one embodiment, device 10 selects pulses from beam 708 or beam 14, based on the distance to be measured.

Figure 38:
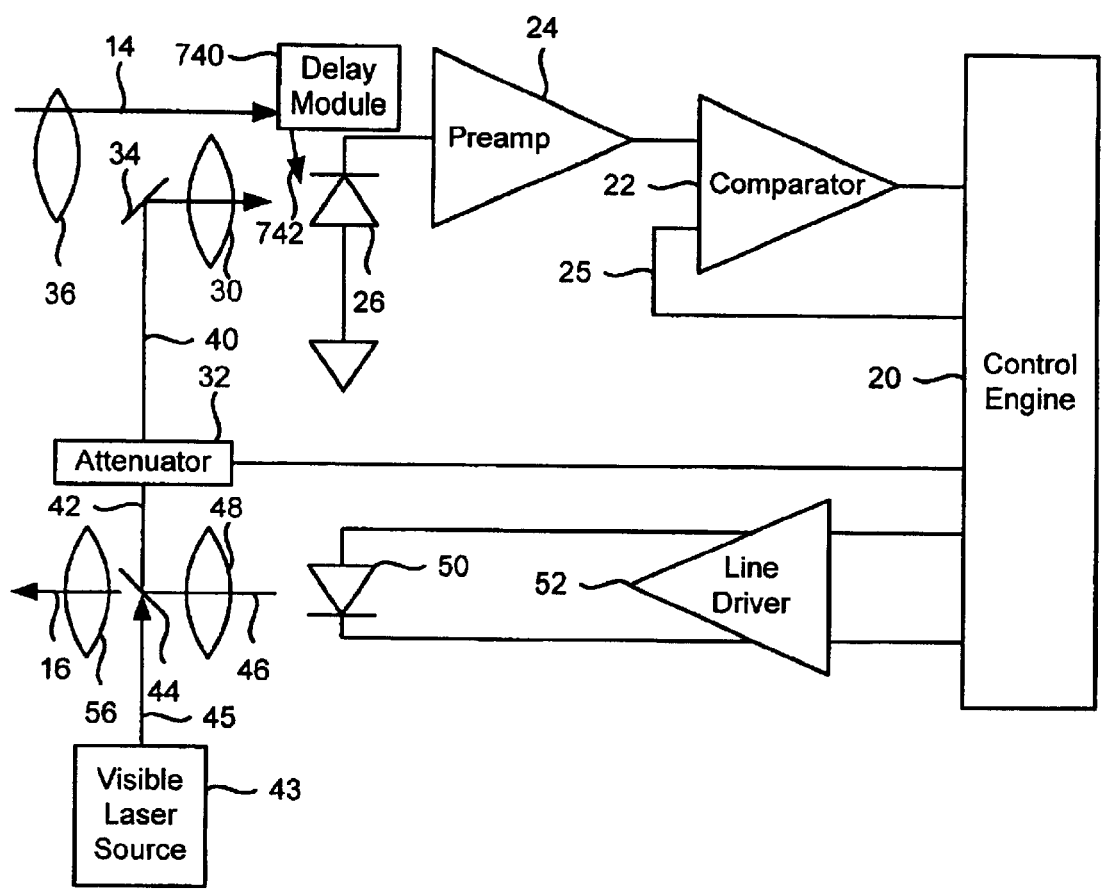
FIG. 38 is a block diagram of an alternate embodiment of a device that measures short distances.

FIG. 38 shows an alternate embodiment of device 10, including components for facilitating distance measurements down to nose-to-node measurements between device 10 and object 12. Device 10 includes delay module 740. Delay module 740 is aligned in device 10 to receive return beam 14 when return beam 14 is translated out of the detection range of detector 26. This translation occurs at short distances between device 10 and object 12 below 2 to 3 meters in one embodiment.

One implementation of delay module 740 has an input with a holographic or other conventional lens that captures return beam 14 and focuses beam 14 into a fiber delay line within delay module 740. Delay module 740 provides delayed return beam 742 on an output, so that detector 26 can detect the pulses on beam 14. In one implementation, the fiber delay line has the same characteristics as described above for delay module 700. In various implementations, different fiber delay line characteristics are employed.

Device 10 selects pulses from beam 742 or beam 14, based on the distance to be measured. When detector 26 cannot detect the pulses on return beam 14, device 10 employs the pulses on feedback reference beam 40 and delayed return beam 742 to make distance determination measurements, as described above. Delay module 740 provides sufficient delay to avoid overlap between the pulses in beam 742 and the pulses in feedback reference beam 40 and return beam 14.

Figure 39:
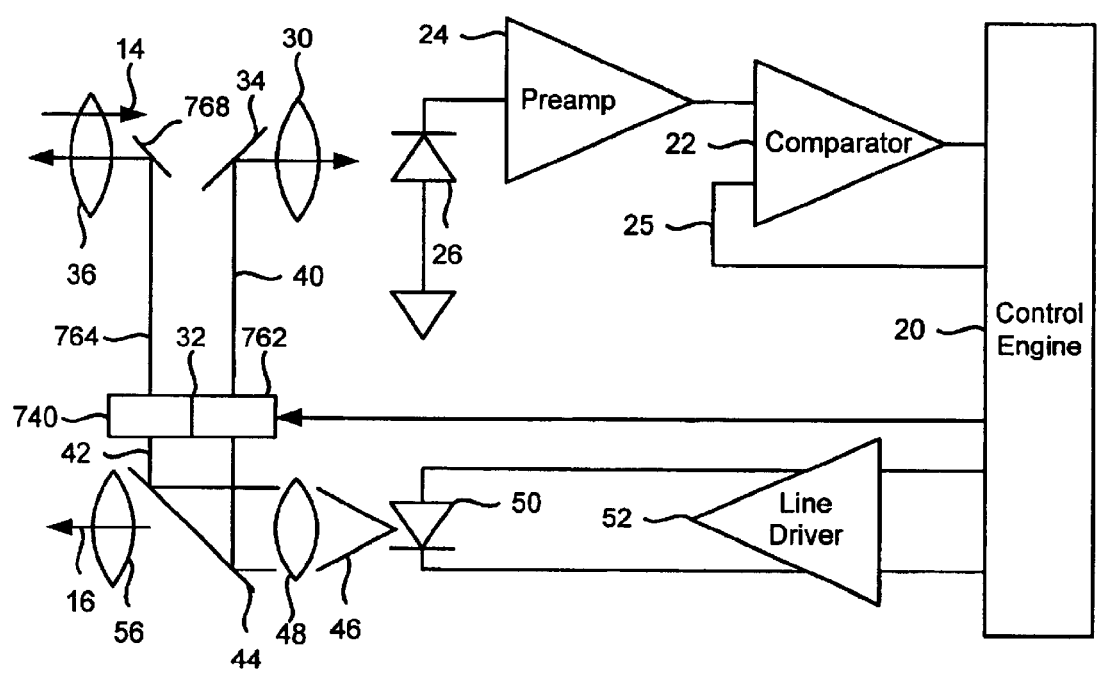
FIG. 39 is a block diagram of another embodiment of a device that measures short distances.

FIG. 39 is another embodiment of device 10 that provides for measurement of short and long distances. Device 10 provides for short distance measurements without the use of a delay module. At short distances, device 10 injects output beam 764 outward from the receive optics path. Output beam 764 impacts on object 12 to create a reflection with return beam 14. The use of output beam 764 enables beam 14 to have sufficient alignment with detector 26 to facilitate the detection of pulses on beam 14 by detector 26.

Laser source 50 provides output beam 46, which passes through collimating lens 48. The output of collimating lens 48 is reflected off mirror 44 through attenuator 32. As described previously, reflector 34 is aligned with attenuator 32 to receive beam 40. In the embodiment shown in FIG. 39, attenuator 32 has two separately controlled regions, namely regions 762 and 740. Attenuation region 762 is controlled, as described above in FIG. 2, to produce output beam 40. Attenuation region 740 is controlled to produce output beam 764. Control engine 20 separately controls regions 762 and 740 of attenuator 32. When short distance is not employed, control engine 20 programs attenuator 32 to have no beam emanate from region 740. When short distance measurement is desired, control engine 20 programs attenuator 32 to provide output beam 764 from region 740.

Reflector 768 is positioned with respect to attenuator 32 to receive beam 764 and reflect beam 764 through window 36 on an axis going through the center of lens 30. Alternatively, beam 766 can be located in a different position with respect to lens 30. Reflector 768 is aligned to allow return beam 14 to pass through to collimating lens 30 without impacting on mirror 768.

Figure 40:
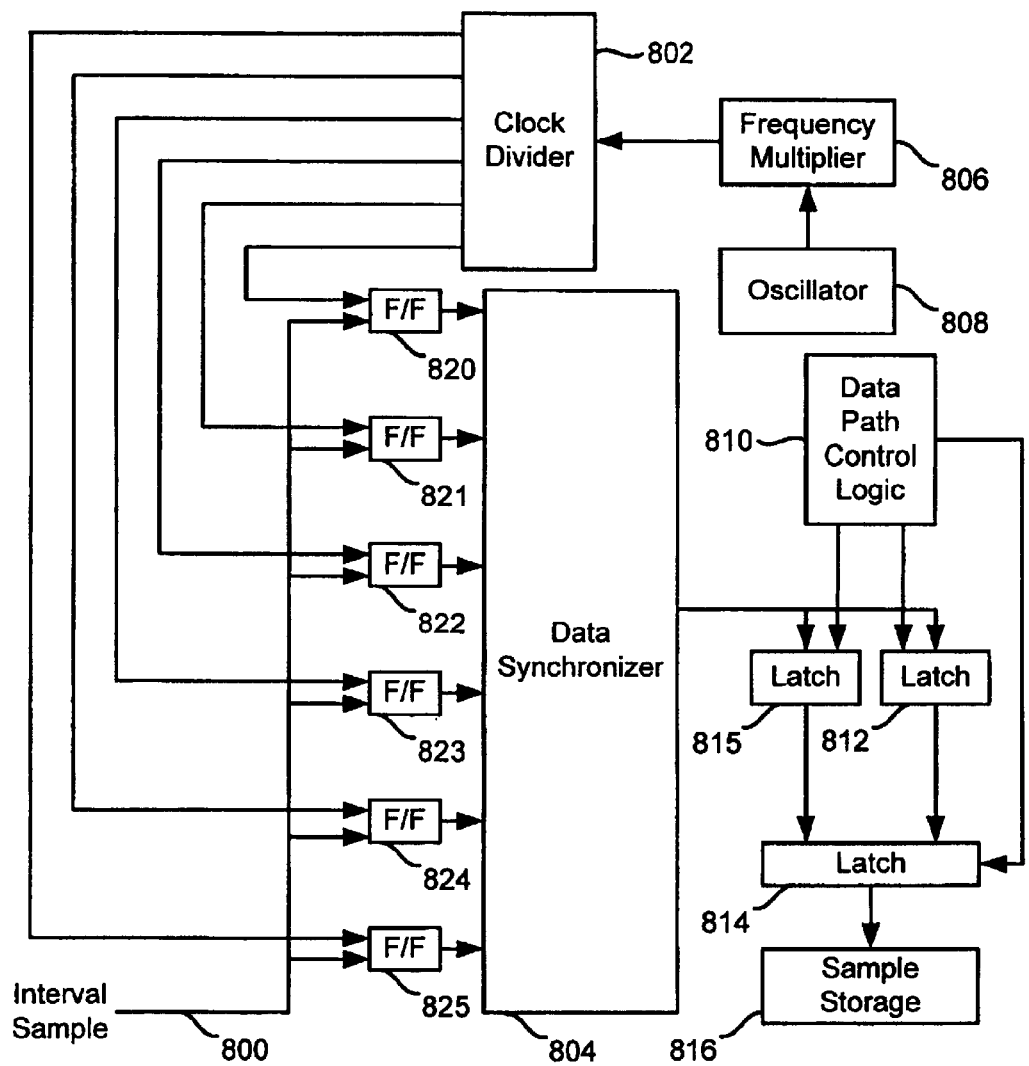
FIG. 40 is a block diagram of one embodiment of digital sampling circuitry.

FIG. 40 shows one implementation of sampling circuitry used in control engine 20 to collect samples at the output of comparator 22. The output of comparator 22 is received on input 800. Input 800 is coupled to the data inputs of registers 820–825. In one embodiment, registers 820–825 are each DQ flip-flops. In alternate implementations, registers 820–825 can be implemented using any type of digital memory or register.

Registers 820–825 each have a clock input coupled to a different output of clock divider 802. Clock divider 802 provides six output clocks, each separated by approximately 60°. In one implementation, oscillator 808 is coupled to frequency multiplier 806 to provide a clock. Frequency multiplier 806 multiplies the frequency of the clock from oscillator 808. Frequency multiplier 806 is coupled to clock divider 802 to provide the clock with multiplied frequency, which clock divider 802 transforms into 6 output clocks.

In one implementation, oscillator 808 provides a 20 megahertz ("MHz") output clock that frequency multiplier 806 multiples up to 160 MHz. Frequency multiplier 806 provides the 160 MHz clock to clock divider 802. Clock divider 802 provides six 160 MHz clocks separated by 60°. In alternate embodiments, different frequencies can be employed and the number of registers and clock outputs from clock divider 802 can be increased or decreased.

The outputs of registers 820–825 combine to provide six consecutive samples of the waveform presented to detector 26 and compared by comparator 22. The outputs of registers 820–825 are each coupled to data synchronizer 804, which aligns all of the 6-bits from the registers onto a common clock edge. This facilitates the storage of the bits in a word format in memory.

The output of data synchronizer 804 provides a 6-bit output coupled to latches 812 and 815. Latches 812 and 815 are coupled to the input of latch 814. Latch 814 collects a 12-bit quantity from latches 812 and 815. Latch 814 is coupled to sample storage 816 to provide a 12-bit quantity. In alternate embodiments, the above-described data path can have different widths.

Data path control logic 810 provides control signals for directing the operation of latches 812, 815, and 814. Data path control logic 810 controls latches 812 and 815, so that latch 812 always contains an even numbered 6-bit sample word and latch 815 always contains an odd numbered 6-bit sample word. In one embodiment, a zero phase shift version of the 160 MHz clock from divider 802 is coupled to the latching inputs of latches 812 and 815. Logic 810 controls enable signals on latches 812 and 815 to ensure the above-described sample word alignment. In this embodiment, the latching input of latch 814 is an 80 MHz clock aligned with the zero shift 160 MHz clock.

In one implementation, sample storage 816 is maintained in memory 82 within control engine 20. In alternate embodiments, sample storage 816 is spread across various memories. Sample storage 816 maintains the data for use by the above-described distance determination processes. In one implementation, sample storage 816 maintains the data in a histogram format—accumulating each register bit with a corresponding histogram interval.

Figure 41:
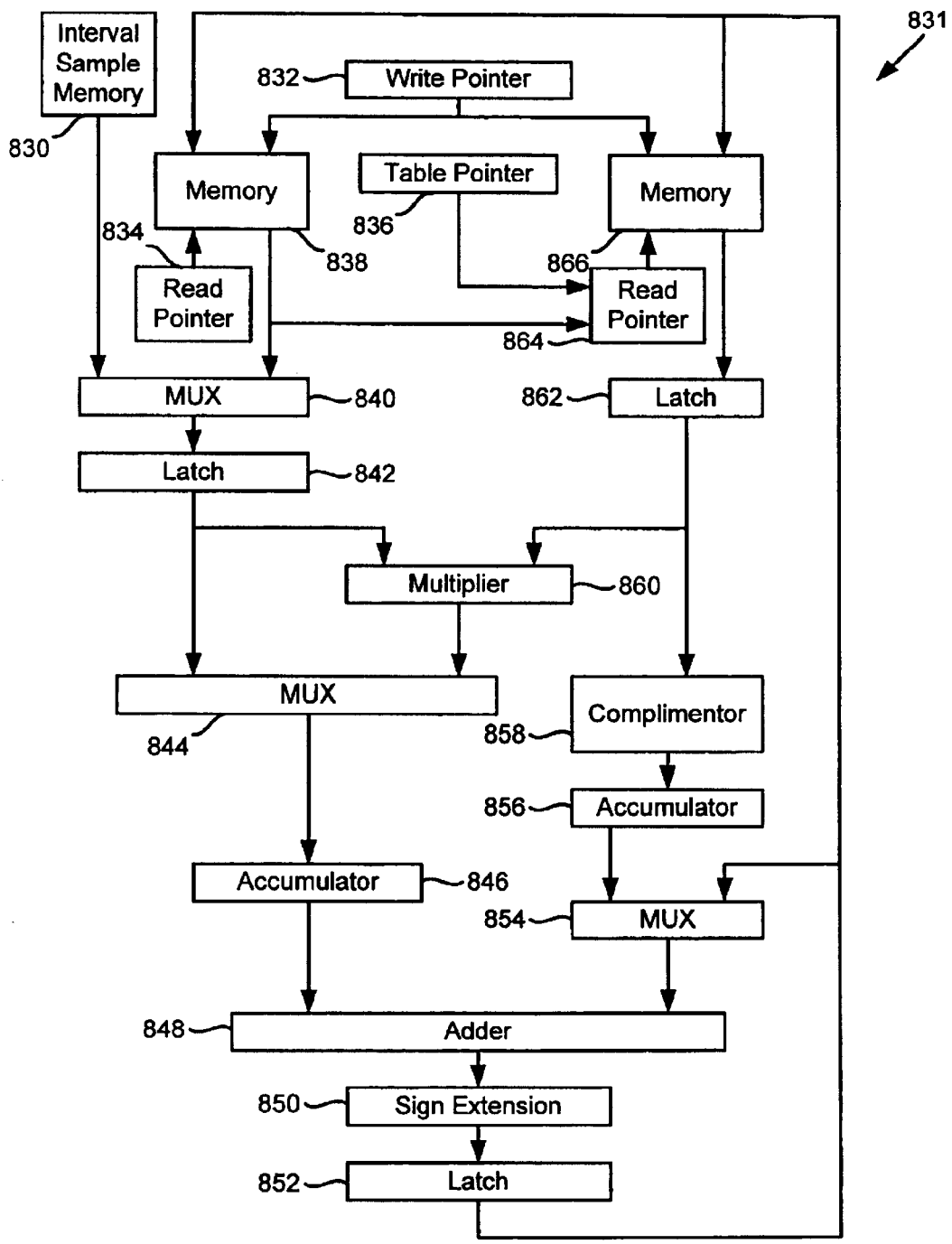
FIG. 41 is a block diagram of one embodiment of a digital signal processing engine.

FIG. 41 shows one implementation of a digital signal processing ("DSP") engine for use in processor unit 80 (FIG. 5). In one embodiment, processor unit 80 includes a microcontroller or other control device coupled to DSP engine 831. The microcontroller provides DSP engine 831 with instructions. In response to the instructions, DSP engine performs operations. This offloads the microcontroller from carrying out these operations. In some embodiments, DSP engine 831 is designed to maximize the speed at which operations can be performed—enabling the operations to be performed faster than if done by the microcontroller. In alternate embodiments, processor unit 80 does not include DSP engine 831.

DSP engine 831 includes memory 838 and memory 866. In one implementation, memories 838 and 866 are dual port memories. Write pointer 832 is coupled to memories 838 and 866 to address memory locations for write operations. In one implementation, microcontroller instructions load addresses into write pointer 832 that serve as destinations for processing results computed by DSP engine 831.

Read pointers 834 and 864 are coupled to memories 838 and 866, respectively. Read pointers 834 and 864 provide addresses to their respective memories for read operations. In one implementation, read pointers 834 and 864 operate as counters to successively address contiguous locations in memories 838 and 866, respectively. Table pointer 836 is coupled to read pointer 864 to provide memory addresses that point to the initial locations in look-up tables. Examples of above-described data that can be stored in memory 866 in look-up tables include the weighting function, inverse error function, and histograms. Microcontroller instructions load addresses into table pointer 836. Read pointer 864 increments repeatedly to address successive entries in a table pointed to by the address in table pointer 836.

A data output of memory 838 is coupled to provide data to multiplexer 840 and read pointer 864. In one embodiment, memory 838 provides read pointer 864 with index addresses into a table that starts at the address identified by table pointer 836. In one example, device 10 determines additional amplitude values using the inverse error function. Additional amplitude values corresponding to different sample ratios are stored in a tabular format in memory 866. Table pointer 836 identifies the first address in the inverse error function table. DSP engine 831 performs an operation to calculate a sample ratio associated with a particular histogram interval. DSP engine 831 stores a value in memory 838 that corresponds to the sample ratio. Memory 838 provides read pointer 864 with the stored value to serve as an address offset from the table pointer address. Read pointer 864 provides memory 866 with an address that corresponds to the location identified by table pointer 836 and data received from memory 838. In response, memory 866 outputs an additional amplitude value corresponding to the sample ratio.

Interval sample memory 830 has a data output coupled to a data input of multiplexer 840. Multiplexer 840 has a data output coupled to a data input of latch 842. Latch 842 has a data output coupled to a data input of multiplier 860 and a data input of multiplexer 844. Multiplexer 844 has a data output coupled to a data input of accumulator 846. Accumulator 846 has a data output coupled to a data input of adder 848. A data output of adder 848 is coupled to a data input of sign extension module 850, which has a data output coupled to a data input of latch 852. A data output of latch 852 is coupled to a data input of memories 866 and 838.

Memory 866 has a data output coupled to a data input of latch 862. Latch 862 has a data output coupled to data inputs of multiplier 860 and complimentor 858. Complimentor 858 is able to provide different complement operations, including ones complement, twos complement, bit zero complement and pass-through in various embodiments. A data output of complimentor 858 is coupled to a data input of accumulator 856. A data output of accumulator 856 is coupled to a data input of multiplexer 854. Another data input on multiplexer 854 is coupled to the data output of latch 852. A data output of multiplexer 854 is coupled to a data input of adder 848. Instructions from the microcontroller coupled to DSP engine 831 load pointers in engine 831 and set control inputs for the above-identified components in engine 831.

In one implementation, interval sample memory 830 and dual port memory 866 combine to form sample storage 816 (FIG. 40). Latch 814 (FIG. 40) is coupled to interval sample memory 830. In one embodiment, interval sample memory 830 is a single-bit wide memory with a number of locations equal to the number of intervals used for sampling a waveform. In one example, interval sample memory 830 has 384 single-bit entries. Each entry receives a single-bit sample value for a different histogram interval. When interval sample memory 830 is completely full, it provides a control signal that is detected by the microcontroller coupled to DSP engine 831.

The microcontroller programs table pointer 836 to point to the address in memory 866 that corresponds to the first interval in a histogram corresponding to the data stored in interval sample memory 830. The microcontroller also controls multiplexer 840 to pass the data from interval sample memory 830 onto the output of multiplexer 840. Read pointer 864 successively addresses locations in memory 866, beginning with the first interval in the histogram identified by table pointer 836. The interval values for the histogram stored in memory 866 flow through latch 862, complimentor 858, accumulator 856, and multiplexer 854 into adder 848. The bit values from interval sample memory 830 flow through multiplexer 840, latch 852, multiplexer 844, and accumulator 846, into adder 848. Adder 848 combines the bit sample value from interval sample memory 830 with the corresponding interval accumulation maintained in memory 866.

The addition result passes to sign extension module 850, which provides an output to latch 852. The result from latch 852 is written back into memory 866. The appropriate location in memory 866 is identified by the address in write pointer 832, which continuously increments for each write operation in one of the histogram intervals. In response to a single control instruction from the microcontroller, DSP engine 831 is able to successively add each new single-bit histogram interval sample to the previously accumulated values in 384 successive clock cycles.

DSP engine 831 can be used to carry out many of the above-described operations used in performing coarse distance measurement (Step 140, FIG. 6), determining measurement parameters (Step 142, FIG. 6), and performing fine distance measurement (Step 144, FIG. 6).

Figure 42:
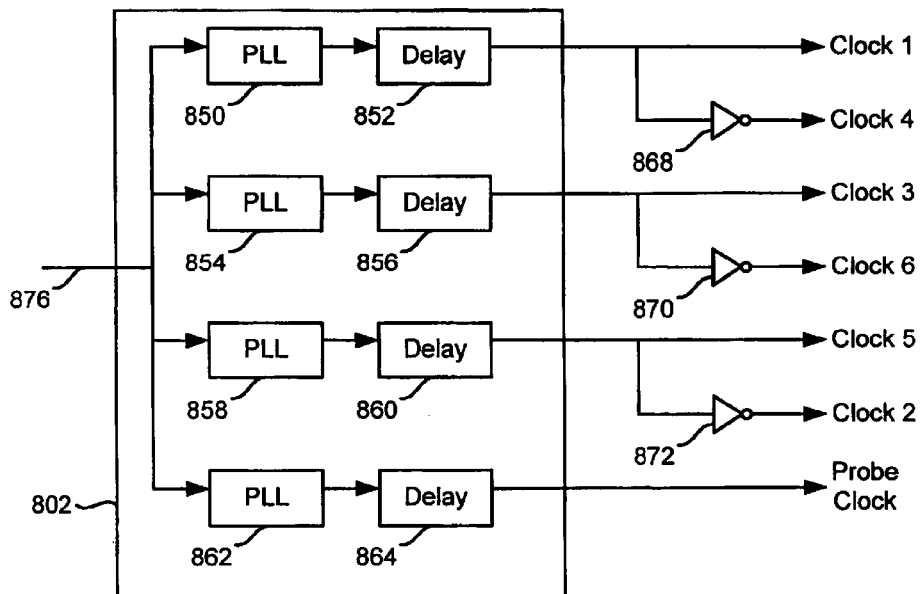
FIG. 42 is a block diagram of one embodiment of a clock divider.

FIG. 42 shows one embodiment of clock divider 802. Clock divider 802 includes input 876 coupled to receive the output of frequency multiplier 806. The signal on 876 is coupled to multiple phase-locked loops ("PLLs"). Phase-locked loop 850 receives input 876 and is coupled to provide an output to delay module 852. Phase-locked loop 850 provides an output clock that is locked to the frequency of the clock signal received on input 876. Delay module 852 injects a programmable amount of delay into the clock signal provided by phase-locked loop 850. The output of delay module 852 is clock 1, which is coupled to the clock input of register 820. The output of delay 852 is also coupled to inverter 868, which inverts clock 1 to create clock 4. Clock 4 is coupled to the clock input of register 823.

Phase-locked loops 854, 858 and 862 are also coupled to receive the signal on input 876 and operate the same as described above for phase-locked loop 850. Delay modules 856, 860 and 864 are coupled to receive the outputs of phase-locked loops 854, 858 and 862, respectively. Delay modules 856, 860 and 864 operate as described above for delay module 852. Delay modules 852, 856, 860 and 864 are all programmed with delay values. In one implementation, the delay values programmed into modules 852, 856 and 860 result in their output clocks being separated by 120°.

Delay module 856 provides output clock 3, which is coupled to the clock input of register 822. The output of delay module 856 is also coupled to inverter 870, which generates clock 6. Clock 6 is coupled to the clock input of register 825. The output of delay module 860 generates clock 5, which is coupled to the clock input of register 824. The output of delay module 860 is also coupled to the input of inverter 872, which generates clock 2. Clock 2 is coupled to the clock input of register 821.

Figure 43:
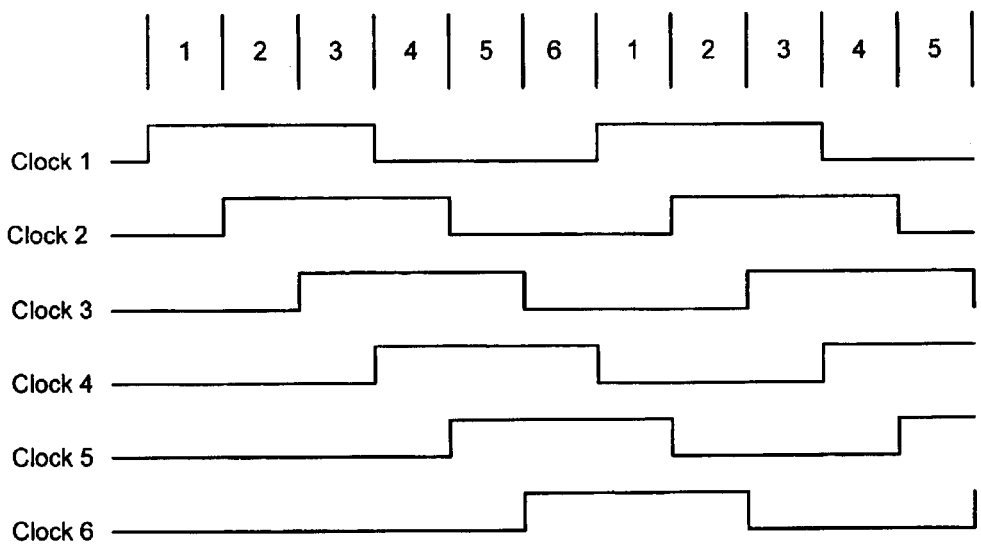
FIG. 43 shows one example clocks provided by the clock divider in FIG. 43.

As shown in FIG. 43, clocks 1–6 constitute a series of clocks with each clock being separated from the previous clock by 60°. This enables registers 820–825 to capture six consecutive samples of a waveform that are separate by 60°. The output of delay module 864 is referred to as the probe clock. The probe clock is used to determine the above-mentioned re-sampling function that is used to provide correction to the amplitude component determined in step 242 of FIG. 12 in one implementation.

In alternate implementations, different clock divider devices can be employed. Alternatively, six phase locked high-speed separate clock sources can be used to generate clocks 1–6. In a further embodiment, inverters 868, 870 and 872 are removed and the corresponding registers for clock 2, 4 and 6 utilize falling edge clock inputs.

Figure 44:
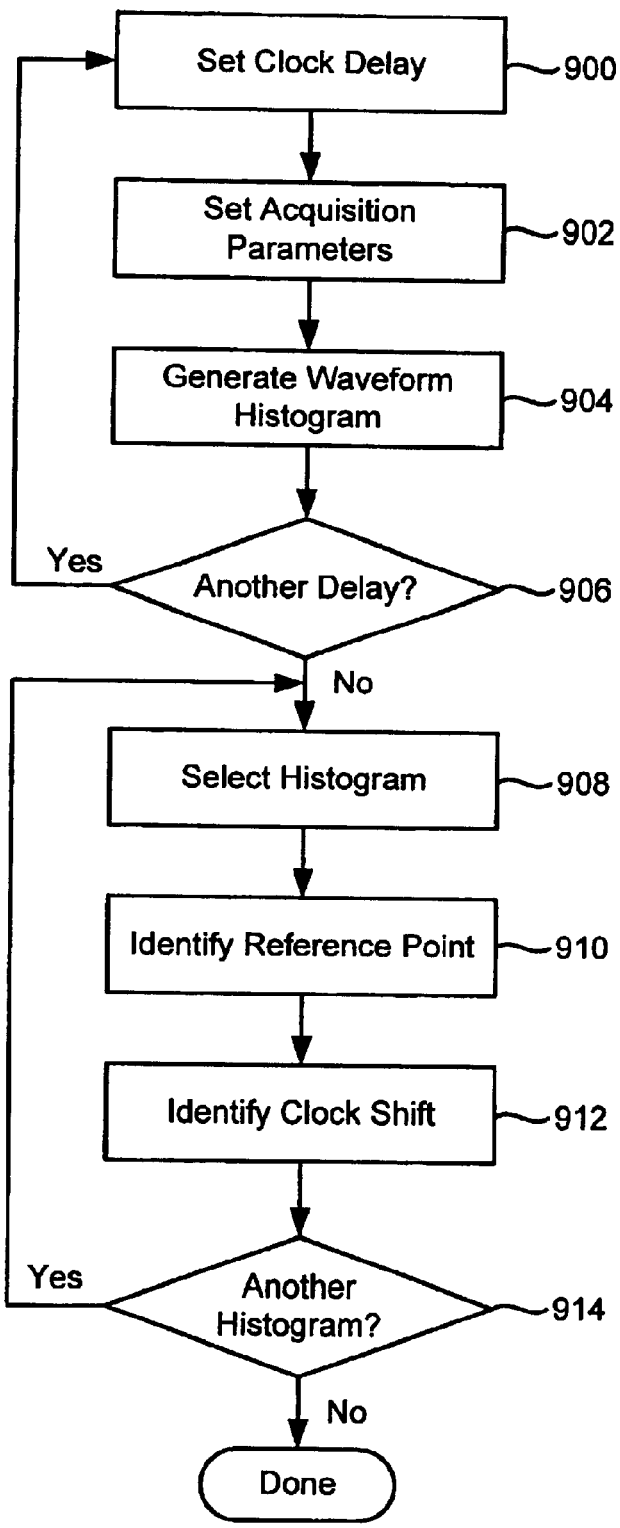
FIG. 44 is a flowchart describing one embodiment of the process for determining a clock shift.

FIG. 44 is a flow chart describing one embodiment of a process for identifying shifts in the clocks provided by clock divider 802. Device 10 samples the probe clock from clock divider 802 through a sweep of 360° to identify the clock shifts. In this embodiment, the probe clock is coupled to the data inputs of registers 820–825 through a multiplexer (not shown) that is also coupled to pass waveform interval samples to registers 820–825. Device 10 uses the identified clock shifts to implement the above-described re-sampling of addition amplitude values.

Control engine 20 sets a clock delay value (Step 900) in delay module 864 in clock divider 802 (FIG. 42). As described above, the output of delay module 864 forms the probe clock. In one embodiment, the delay is initially set to 0, so that the probe clock ideally aligns with clock 1 from clock divider 802.

Control engine 20 sets acquisition parameters (Step 902). In one implementation, the acquisition parameters include the following: (1) a threshold value on comparator input 25, (2) a number of intervals of the probe clock that will be sampled, (3) the location of the sampled intervals of the probe clock waveform, and (4) the number of probe clock waveforms to be sampled. In alternate embodiments, different acquisition parameters can be employed.

In one implementation, the acquisition parameters are set as follows: (1) the threshold is set to the anticipated voltage at the middle of a rising edge on the probe clock, (2) the number of intervals is set to five, (3) the 5 sampled intervals of the probe clock waveform fall within plus or minus 2 intervals of an anticipated middle of a rising edge of the probe clock, and (4) the number of probe clock waveforms sampled is 64. In alternate embodiments, different acquisition parameter values can be employed.

Control engine 20 generates a waveform histogram for the probe clock (Step 904), based on the acquisition parameters set in step 902. Step 902 is performed in the same manner as described above for step 170 in FIG. 7. Control engine 20 determines whether to generate another waveform histogram from another delayed version of the probe clock (Step 906). In one implementation, control engine 20 generates waveform histograms for probe clock delays of 0°, 60°, 120°, 180°, 240°, and 300°. If a waveform histogram has not yet been collected for one of these delays, control engine 20 determines that another delay is needed (Step 906), sets another delay (Step 900), and repeats the above-described process steps.

When another clock delay does not need to be set (Step 906), control engine 20 selects one of the histograms generated in step 904 (Step 908). Control engine 20 identifies a reference point in the histogram (Step 910). In one embodiment, the reference point is a point in time where the middle of a rising edge on the probe clock occurs. Ideally, the reference point is located in the histogram interval that has a sample ratio of zero—50% of the samples in the interval are logic 1 values and 50% of the samples in the interval are logic 0 values. In some instances, no interval has a zero sample ratio. In these cases, control engine 20 interpolates between the histogram intervals to identify the location of the probe clock's rising edge mid-point. The identified location serves as the reference point.

Control engine 20 identifies clock shift for the delay set in step 900 (Step 912). Control engine 20 can identify clock shift by determining the offset of the reference point from the known time at which the mid-point of the probe clock rising edge is expected to occur. The identified clock shift is the amount of clock shift present in a clock provided by clock divider 802 from a delay module with the delay set is step 900. For example, the clock shift for a set probe clock delay of 0° corresponds to the amount of shift that exists in clock 1 from its ideal location of 0°. The identified clock shift for a set probe clock delay of 60° corresponds to the amount of shift that exists in clock 2 from its ideal location of 60°.

Control engine 20 determines whether another histogram needs to be selected (Step 914). If all of the histograms have been selected, then the process is done. Otherwise, control engine selects another histogram (Step 908) and repeats the above-identified process. Once the process shown in FIG. 44 is complete, the clock shift associated with delays of 0°, 60°, 120°, 180°, 240°, and 300° are known. Control engine 20 employs these known shifts to generate the above-described re-sampling function that is applied to additional amplitude values in one embodiment.

In one embodiment, the re-sampling function applies the following operation to an operand, such as the additional amplitude or sum of the additional amplitude and adjusted threshold:

$$R(O_x) = (A_x * O_{x-1}) + (B_x * O_x) + (C_x * O_{x+1})$$

Wherein:

$$A_x = (e_x * (1 + e_{x+1})) / ((-1 + e_{x-1} - e_x) * (-2 + e_{x-1} - e_{x+1})).$$

$$B_x = ((-1 + e_{x-1}) * (1 + e_{x+1})) / ((-1 + e_{x-1} - e_x) * (-1 + e_x - e_{x+1})).$$

$$C_x = (e_x * (-1 + e_{x-1})) / ((-2 + e_{x-1} - e_{x+1}) * (-1 + e_x - e_{x+1})).$$

$O_x$ is an operand associated with clock x, such as an additional amplitude derived from a set of values in a histogram interval sampled by clock 1.

$O_{x+1}$ is a value equivalent to $O_x$ but associated with clock x+1, such as an additional amplitude derived from a set of values in a histogram interval sampled by clock 2.

$O_{x-1}$ is a value equivalent to $O_x$ but associated with clock x-1, such as an additional amplitude derived from a set of values in a histogram interval sampled by clock 6.

Wherein:

$$e_x = CS_x / (1/(6*F)).$$

$$e_{x+1} = CS_{x+1} / (1/(6*F)).$$

$$e_{x-1} = CS_{x-1} / (1/(6*F)).$$

Wherein:

$CS_x$ is the clock shift determined for clock x, such as clock 1.

$CS_{x+1}$ is the clock shift determined for clock x+1, such as clock 2.

$CS_{x-1}$ is the clock shift determined for clock x-1, such as clock 6.

F is the frequency of clocks x, x+1, and x-1, such as 160 MHz.

In various embodiments different re-sampling techniques can be employed.

Figure 45:
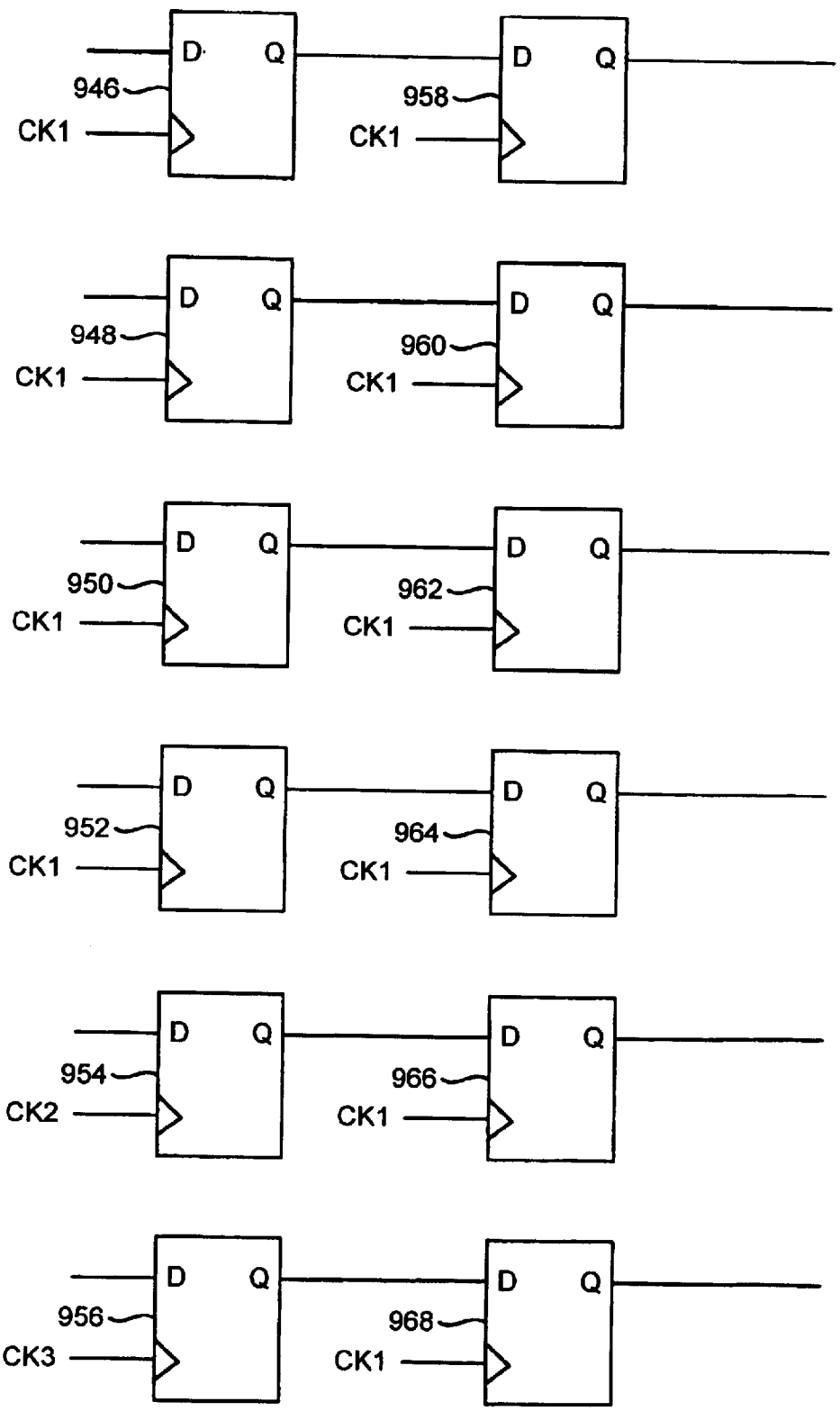
FIG. 45 is a block diagram of one embodiment of a data synchronizer.

FIG. 45 shows one embodiment of circuitry for data synchronizer 804. Data synchronizer 804 includes a set of registers, which are shown as DQ flip-flops in FIG. 45. In alternate embodiments, different register elements or memory can be employed. Register 946 has a data input coupled to the data output of register 820. The clock input of register 946 is coupled to clock 1. The data output of register 946 is coupled to the data input of register 958, which has a clock input coupled to clock 1. The output of register 958 is the first bit in the 6-bit output provided by data synchronizer 804.

Register 948 has a data input coupled to the data output of register 821. Register 948 has a clock input coupled to clock 1. The data output of register 948 is coupled to the data input of register 960, which has a clock input coupled to clock 1. The data output of register 960 is the second bit in the 6-bit data output of data synchronizer 804.

Register 950 has a data input coupled to the data output of register 822. Register 950 has a clock input coupled to clock 1. Register 950 has a data output coupled to the data input of register 962, which has a clock input coupled to clock 1. The data output of register 962 forms the third bit in the 6-bit output of data synchronizer 804.

Register 952 has a data input coupled to the data output of register 823. Register 952 has a clock input coupled to clock 1. Register 952 has a data output coupled to the data input of register 964, which has a clock input coupled to clock 1. The data output of register 964 forms the fourth bit in the 6-bit output of data synchronizer 804.

Register 954 has a data input coupled to receive the data output of register 824. Register 954 has a clock coupled to clock 2. Register 954 has a data output coupled to the data input of register 966, which has a clock input coupled to clock 1. The data output of register 966 forms the fifth bit in the 6-bit output of data synchronizer 804.

Register 956 has a data input coupled to the data output of register 825. Register 956 has a clock input coupled to clock 3. Register 956 has a data output coupled to the data input of register 968, which has a clock input coupled to clock 1. The data output of register 968 forms the sixth bit in the 6-bit output of data synchronizer 804.

Figure 46:
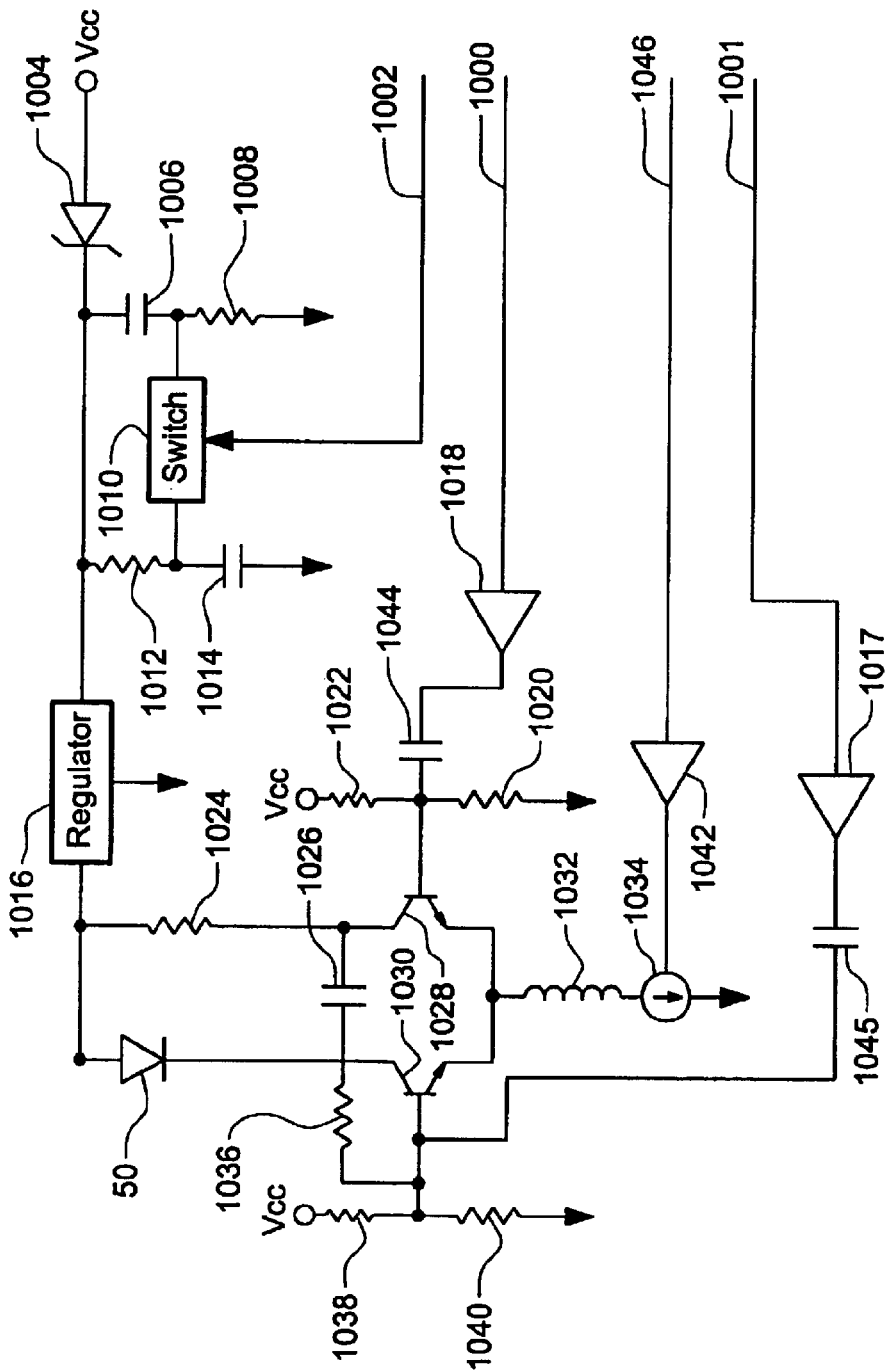
FIG. 46 shows one embodiment of a current driver.

FIG. 46 shows one embodiment of current driver 52 (FIG. 2). The embodiment shown in FIG. 46 has the ability to provide high-speed switching that allows bursts of reference pulses to be generated with rising and falling edges on the order of 1 nanosecond ("ns"). In one implementation, the laser driver provides for operation of laser source 50 at wavelengths between 800 and 900 nanometers. This is useful for maintaining good detector sensitivity with high-speed operation. In one implementation, current driver 52 provides for laser source 50 to supply a laser beam with a current of 2 amps.

Current driver 52 includes isolation diode 1004 having an anode coupled to Vcc. The cathode of isolation diode 1004 is coupled to the terminals of capacitor 1006 and resistor 1012 and the input to regulator 1016. Capacitor 1006 has another terminal coupled to the input of switch 1010 and resistor 1008. Resistor 1008 is coupled between capacitor 1006 and ground. Switch 1010 has digital input 1002 that controls the opening and closing of switch 1010. Input 1002 is driven by control engine 20. The output of switch 1010 is coupled to resistor 1012 and capacitor 1014. Capacitor 1014 couples resistor 1012 to ground.

The output of regulator 1016 is coupled to resistor 1024 and the anode of laser diode 50. Resistor 1024 has another terminal coupled to the drain of transistor 1028. Transistor 1028 has a source coupled to inductor 1032. Another terminal of inductor 1032 is coupled to current source 1034. Current driver 1042 has input 1046 coupled to control engine 20 and an output coupled to current source 1034. Laser diode 50 has a cathode coupled to the drain of transistor 1030, which has a source coupled to inductor 1032. The drain of transistor 1028 is coupled to the gate of transistor 1030 through capacitor 1026 in series with resistor 1036. Resistor 1038 is coupled between the gate of transistor 1030 and Vcc. Resistor 1040 is coupled between the gate of transistor 1030 and ground.

Current drivers 1017 and 1018 have inputs 1001 and 1000, respectively, coupled to control engine 20. Current driver 1018 receives pulse signals from control engine 20 on input 1000. Current driver 1017 receives pulse signals from control engine 20 on input 1001. Current driver 52 uses these pulse signals to drive laser diode 50 to create reference pulses in beam 16. The output of current driver 1018 is coupled to the gate of transistor 1028 through capacitor 1044. The output of current driver 1017 is coupled to the gate of transistor 1030 through capacitor 1045. Resistor 1022 is coupled between the gate of transistor 1028 and Vcc. Resistor 1020 is coupled between the gate of transistor 1028 and ground.

In one embodiment, the above-described circuit elements have the following values:

Capacitor 1006 is 1 micro-farad ("mf").
Resistor 1008 is 100Ω.
Resistor 1012 is 100Ω.
Capacitor 1014 is 1 mf.
Resistor 1024 is 0.5Ω.
Resistor 1022 is 1000Ω.
Resistor 1020 is 4300Ω.
Capacitor 1044 is 0.1 mf.
Capacitor 1045 is 0.1 mf.
Inductor 1032 is 32 nano-henries.
Resistor 1036 is 3Ω.
Resistor 1038 is 1000Ω.
Resistor 1040 is 3300Ω.

In alternate embodiments, different values can be employed to achieve the desired functionality of current driver 52. The above values are merely one example of suitable values that can be used in current driver 52.

Figure 47:
FIG. 47 is a timing diagram for the current driver shown in FIG. 46.

FIG. 47 shows one implementation of a timing diagram for the operation of the current driver shown in FIG. 46. Control engine 20 provides the laser switch signal to input 1001 on current driver 1017 and the shunt switch signal to input 1000 on current driver 1018. Initially control engine 20 enables the doubling of the Vcc coupled to isolation diode 1044 by closing switch 1010 through control input 1002. This causes the network including capacitor 1006 and resistor 1008 to be coupled to the network including resistor 1012 and capacitor 1014—forming a voltage doubler. Closing switch 1010 results in the voltage at the input to regulator 1016 being double the Vcc voltage. Current driver 52 requires approximately 20 microseconds ("μs") for the voltage at the input of regulator 1016 to climb from Vcc to double Vcc once switch 1010 is closed.

Regulator 1016 regulates the double Vcc voltage and provides a voltage on the anode of laser diode 50 that is greater than Vcc. In one implementation, Vcc is approximately 4.5 volts and the output of regulator 1016 is 6 volts when switch 1010 is closed. The rising voltage at the output of regulator 1016 causes the voltage to rise on the drain of transistor 1028. In one implementation, this switching bias voltage at the drain of transistor 1028 rises to a level of 6 volts.

Once the switching bias voltage has reached a desired level, control engine 20 begins driving current driver 1042. After approximately 100 nanoseconds, current source 1034 ramps up to a desired level for the operation of current driver 52 to drive laser diode 50. In one implementation, this current level is approximately 2 amps. Once the current reaches a desired value, control engine 20 begins driving reference pulse bursts onto input 1000 of current driver 1018 and input 1001 of current driver 1017. This result in reference pulses at the output of laser diode 50.

Differential transistors 1028 and 1030 operate in a push/pull fashion. The push/pull operation of these transistors facilitates fast switching times on the reference pulses provided from laser diode 50. The circuit shown in FIG. 46 operates with a low inductance in the current path passing through the differential transistors. The low inductance results in the ability of transistors 1030 and 1028 to have very fast current switching times. In one implementation, this facilitates 1 ns rising and falling edge times on pulses from laser diode 50. In one implementation, current driver 52 is capable of providing up to 12 reference pulses with periods of approximately 12 ns—6 ns of high time and 6 ns of low time. Different embodiments can employ different pulse characteristics.

Once control engine 20 determines that no more reference pulses are required, control engine 20 stops driving the inputs to current driver 1042 and current driver 1018. Control engine 20 also opens switch 1010. This results in current driver 52 ceasing to drive laser diode 50.

Figure 48:
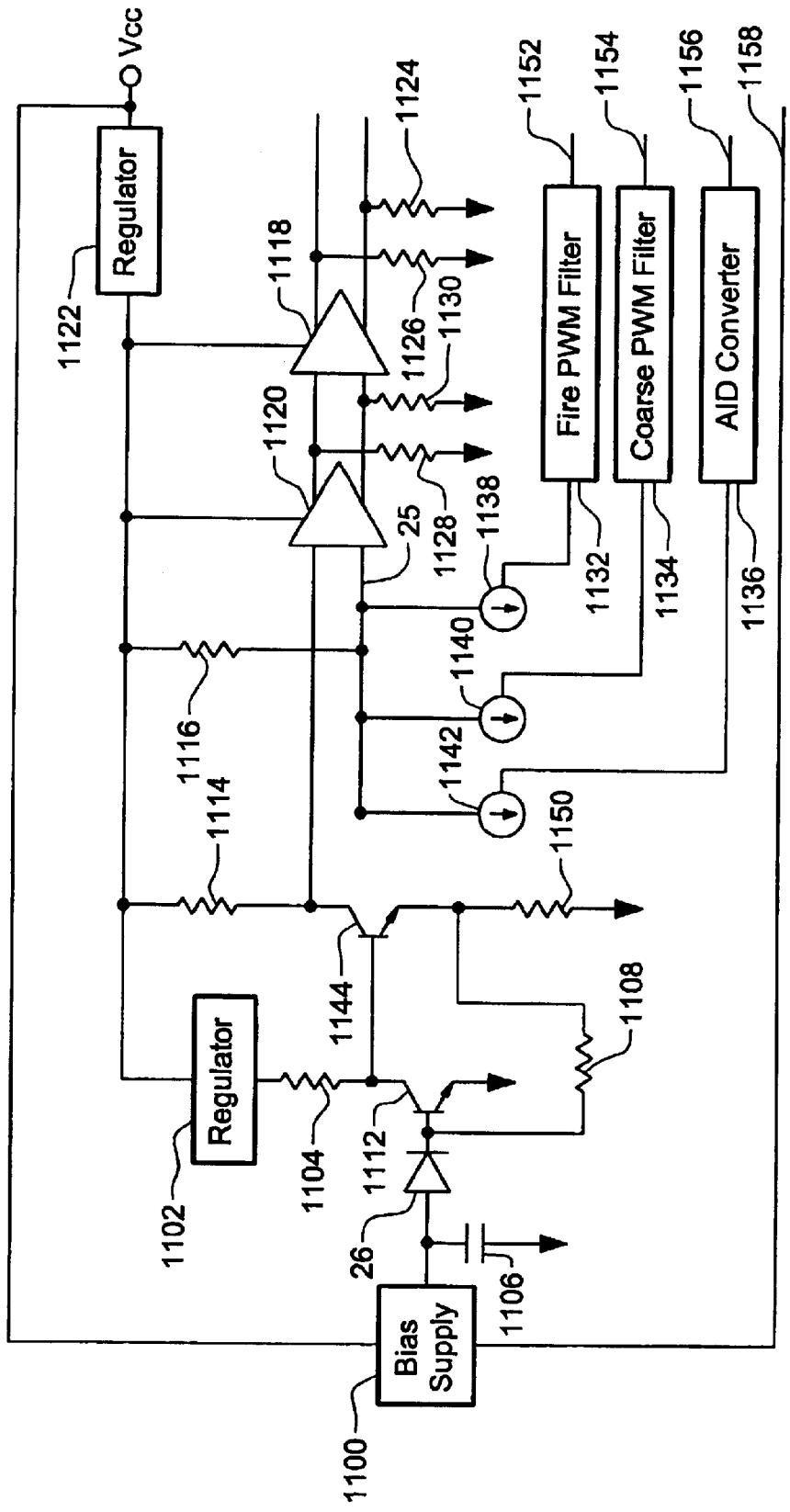
FIG. 48 shows one embodiment of circuitry for a preamplifier and comparator.

FIG. 48 shows one embodiment of circuitry employed to implement preamplifier 24 and comparator 22 in device 10. Input 25 to amplifier 1120 is the same as input 25 to comparator 22 in FIG. 2. Input 25 is coupled to control engine 20 through the current sources, filters, and converters shown in FIG. 48. These devices were omitted from FIG. 2 for the purposes of illustration simplicity. The circuitry shown in FIG. 48 is only one embodiment of circuitry that can be employed in device 10 to perform the operations of preamplifier 24 and comparator 22. In alternative embodiments, different circuitry can be employed.

Photodiode detector 26 has an anode coupled to ground through capacitor 1106. The anode of detector 26 is also coupled to photodiode bias supply 1100, which is coupled between Vcc and diode bias supply drive signal input 1158. In one implementation, bias supply 1100 provides a voltage of −60 volts on the anode of diode 26. In one embodiment, Vcc is 4.5 volts and input signal 1158 provides a logic input to control an internal charge pump circuit in bias supply 1100.

The cathode of diode 26 is coupled to the gate of transistor 1112 and resistor 1108. The source of transistor 1112 is coupled to ground, and the drain of transistor 1112 is coupled to the gate of transistor 1144. Transistor 1144 has a source coupled to ground through resistor 1150. The source of transistor 1144 is also coupled to the gate of transistor 1112 through resistor 1108. The gate of transistor 1144 and drain of transistor 1112 are coupled to the output of regulator 1102 through resistor 1104. The drain of transistor 1144 forms the output of preamplifier 24, which is coupled to an input of amplifier 1120.

Gain stage regulator 1122 is coupled to receive Vcc, which is 4.5 volts in one embodiment. In one implementation, gain stage regulator 1122 converts the 4.5 volt Vcc voltage into a 3.3 volt quantity. The output of gain stage regulator 1122 is coupled to the input of regulator 1102 and supply voltage inputs of amplifiers 1120 and 1118. The output of gain stage regulator 1122 is also coupled to the drain of transistor 1144 through resistor 1114.

The output of gain stage regulator 1122 is coupled to input 25 of amplifier 1120 through resistor 1116. Current sources 1138, 1140, and 1142 are coupled between ground and input 25 to amplifier 1120. Current from these sources flows through resistor 1116 to set the voltage of input 25. The differential outputs of amplifier 1120 are coupled to the differential inputs of amplifier 1118. The differential inputs to amplifier 1118 are coupled to ground through pull-down resistors 1128 and 1130.

The differential outputs of amplifier 1118 are coupled to ground through pull-down resistors 1126 and 1124. In operation, the differential outputs of amplifier 1118 provide a crossover when a logic 1 value is to be indicated. Control engine 20 includes a differential receiver that accepts the outputs of amplifier 1118 and recognizes when a crossover in the differential outputs occurs to indicate a logic 1 value. When a crossover does not occur, the output of amplifier 1118 is considered to be a logic 0 value.

Control engine 20 is coupled to input 1152 of fine pulse width modulation ("PWM") filter 1132, which has an output coupled to control the operation of current source 1138. Control engine 20 is coupled to input 1154 of coarse pulse width modulation filter 1134, which has an output coupled to control the operation of current source 1140. Control engine 20 is coupled to input 1156 of analog/digital ("A/D") converter 1136, which has an output coupled to control the operation of current source 1142.

Preamplifier 24 and comparator 22 are not isolated from DC voltage. Filters 1134 and 1132 control current sources 1140 and 1138, respectively, to set the DC voltage on input 25 of amplifier 1120. Current sources 1138 and 1140 establish a base current that holds the DC voltage at input 25 constant, so that fluctuations in DC voltage are not reflected at the output of comparator 22. During idle time, when feedback reference pulses and return pulses are not received at detector 26, current sources 1138 and 1140 combine to maintain a constant DC value on input 25. This allows any DC drift during the sampling of feedback reference pulses and return pulses to have a negligible effect.

Current source 1142 is programmed by control engine 20 through analog/digital converter 1136 to make adjustments in the threshold voltage on input 25 with respect to DC voltage. For example, when a threshold value is increased, control engine 20 decreases the current through current source 1142 by programming a value into analog/digital converter 1136. The decrease in current through current source 1142 causes the voltage at input 25 to rise.

Current sources 1138 and 1140 work in tandem to provide fine and coarse DC adjustments. Control engine 20 provides a control input to fine pulse width modulation filter 1132 to make fine adjustments in the DC level of input 25. When the fine adjustments are not adequate to maintain the desired DC level, control engine 20 provides control signals to coarse pulse width modulation filter 1134. Coarse pulse width modulation filter 1134 drives larger current changes in input 25 through current source 1140, resulting in greater adjustments of DC voltage on input 25.

Fine pulse width modulation filter 1132 receives a periodic signal with a duty cycle on input 1152. Fine pulse width modulation filter 1132 provides an output signal to drive current source 1138 in proportion to the duty cycle of the received signal. Coarse pulse width modulation filter 1134 receives a periodic signal with a duty cycle on input 1154. Coarse pulse width modulation filter 1134 provides an output signal to drive current source 1140 in proportion to the duty cycle of the incoming signal. Control engine 20 controls the duty cycle of inputs to filter 1132 and 1134 in order to control the current through sources 1138 and 1140, respectively.

Coarse pulse width modulation filter 1134 has a higher voltage-to-current ratio than fine pulse width modulation filter 1132. Filter 1134, however, is filtered at a lower frequency to provide a higher level of ripple suppression at input 25. Filter 1132 has a lower voltage-to-current gain with a higher cutoff frequency to allow faster response to input signals than coarse filter 1134. In one implementation, fine filter 1132 implements a low-pass 10 kilohertz ("KHz") filter, while coarse filter 1134 implements a low-pass 100 Hz filter. The gain in filter 1134 is much, much greater than the gain in filter 1132. In one implementation analog/digital converter 1136 has an output signal that is filtered with a gain approximately equal to the gain from filter 1134.

In one implementation, the components shown in FIG. 48 have the following values:

Capacitor 1106 is 0.1 mf.
Resistor 1108 is 15000Ω.
Resistor 1150 is 5Ω.
Resistor 1104 is 1000Ω.
Resistor 1114 is 300Ω.
Resistor 1116 is 300Ω.
Resistor 1128 is 100Ω.
Resistor 1130 is 100Ω.
Resistor 1126 is 100Ω.
Resistor 1124 is 100Ω.

In alternate embodiments, different components can be employed.

Figure 49:
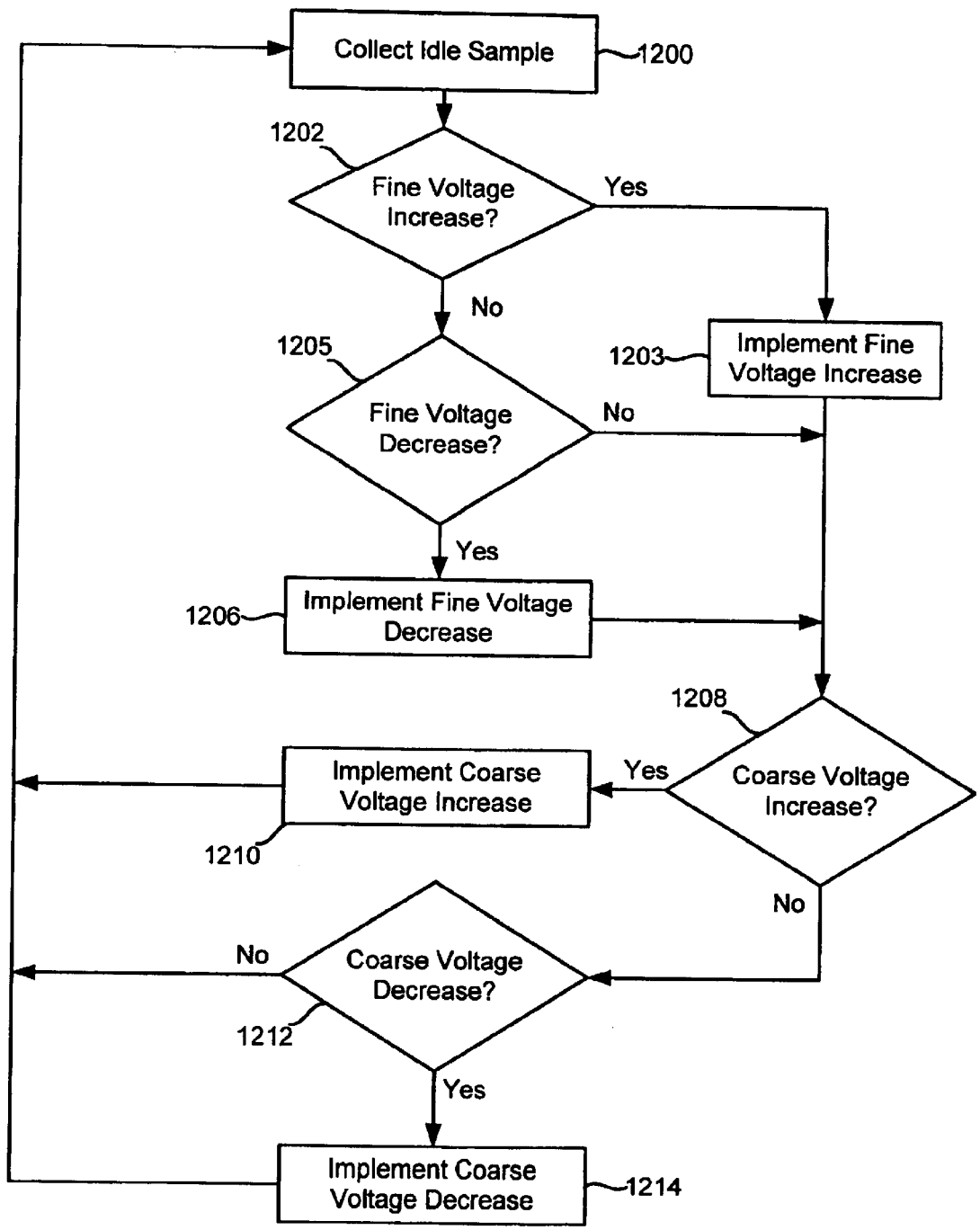
FIG. 49 is a flow chart describing one embodiment of a process for controlling DC offset.

FIG. 49 is a flow chart describing one embodiment of a process for controlling the inputs to fine pulse width modulation filter 1132 and coarse pulse width modulation filter 1134. Control engine 20 collects an idle sample (Step 1200). In one embodiment, an idle sample is 256 consecutive interval samples taken from the output of comparator 22, while feedback reference beam 40 and return beam 14 are not providing feedback reference pulses and return pulses. In one such embodiment, the threshold is set equal to 0 volts and the spacing between samples is 60° of the sample clock, as described above for sampling during the generation of a waveform histogram.

Once a sample is collected, control engine 20 determines whether to provide a fine increase in voltage at input 25 (Step 1202). In one implementation, control engine 20 makes this determination by assessing whether the collected idle sample is greater than a predetermined threshold value. In one implementation, control engine 20 collects an idle sample of 256 bits. If the sum of the bits is less than 128, control engine 20 recognizes that a fine increase of voltage is needed. Otherwise an increase is not needed. If the fine voltage increase is needed, control engine provides a signal on input 1152 to increase voltage at input 25 (Step 1203)—the signal has a duty cycle that causes fine pulse width modulation register 1132 to reduce the current through current source 1138.

If a fine voltage increase is not needed, control engine 120 determines whether to provide a fine decrease in voltage at input 25 (Step 1205). In one implementation, control engine 20 makes this determination by assessing whether the collected idle sample is less than a predetermined threshold value. In the 256 bit idle sample embodiment, control engine 20 determines whether the sum of the sample bits is greater than 128. If the fine voltage decrease is needed, control engine provides a signal on input 1152 to decrease voltage at input 25 (Step 1206)—the signal has a duty cycle that causes fine pulse width modulation register 1132 to increase the current through current source 1138.

Different threshold values can be employed in steps 1202 and 1205 in various embodiments. In another embodiment, a fine increase or decrease is always performed, allowing steps 1202 and 1205 to be combined into a signal determination. In further embodiments, the magnitude of voltage change that can be facilitated by fine pulse width modulation filter 1132 is restricted to some predetermined value. This value is less than the change that can be facilitated by coarse pulse width modulation filter 1134. In one implementation, no fine voltage increase or decrease is performed that would result in the aggregate of all fine voltage changes exceeding either an upper or lower limit.

After performing the above-described steps, control engine 20 determines whether a coarse voltage increase is needed at input 25 (Step 1208). In one implementation, control engine 20 determines whether the aggregate amount of prior fine voltage adjustments exceeds a predetermined threshold. If a coarse voltage increase is needed, control engine 20 provides a coarse increase in the voltage at input 25 (Step 1210). Control engine 20 provides a duty cycle on input 1154 that causes coarse pulse width modulation filter 1134 to decrease current through current source 1140.

If a coarse voltage increase is not necessary, control engine 20 determines whether a coarse voltage decrease is needed at input 25 (Step 1212). In one implementation, control engine 20 determines whether the aggregate amount of prior fine voltage adjustments falls below a predetermined threshold. If a coarse voltage decrease is needed, control engine 20 provides a coarse decrease in the voltage at input 25 (Step 1214). Control engine 20 provides a duty cycle on input 1154 that causes coarse pulse width modulation filter 1134 to increase current through current source 1140.

Control engine 20 repeatedly performs the above-described process during idles times at detector 26. Control engine 20 loops back to step 1200 after making a coarse voltage adjustment or determining that a coarse voltage adjustment is not needed. In a further embodiment, device 10 includes hardware that off loads control engine 20 from performing all or a portion of the above-described steps in FIG. 49.

In various embodiments, the above-described processes for constructing a composite waveform, based on waveform histograms, can be employed in applications other than distance measurement. These processes can be implemented in any application for reconstructing a captured waveform. Embodiments of the current invention can also be used in distance measurement devices that are integrated into other systems. Other systems include leveling devices, other construction related systems, automobiles, airplanes, boats, other means of transportation, robots, and other systems where distance measurement would be useful.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for generating a waveform, said method including the steps of:
   (a) generating a plurality of waveform histograms for a set of waveforms by determining an amplitude for an interval, wherein said interval is included in multiple waveform histograms in said plurality of waveform histograms, including:
      (i) determining an amplitude component for said interval, based on a waveform histogram in said multiple waveform histograms; and
      (ii) weighting said amplitude component to obtain a weighted amplitude component; and
   (b) constructing a composite waveform, based on said plurality of waveform histograms.

2. A method according to claim 1, wherein said method includes the step of:
   (c) setting at least one acquisition parameter for each waveform histogram in said plurality of histograms.

3. A method according to claim 2, wherein said at least one acquisition parameter includes a threshold voltage for waveform sampling.

4. A method according to claim 2, wherein said step (c) is performed prior to generating each waveform histogram in said plurality of waveform histograms.

5. A method according to claim 4, wherein said at least one acquisition parameter includes a number of waveforms to sample for a waveform histogram in said plurality of waveform histograms, and spacing between histogram intervals.

6. A method according to claim 1, wherein said step (a)(i) and said step (a)(ii) are performed for each waveform histogram in said multiple waveform histograms.

7. A method according to claim 6, wherein said step (a) includes the step of:
- (iii) accumulating all of said weighted amplitude components determined for said interval to obtain an accumulated weighted amplitude component.

8. A method according to claim 7, wherein said step (a)(i) includes the step of:
- (iv) dividing said accumulated weighted amplitude component by an accumulated weighting factor.

9. A method according to claim 1, wherein said step (a)(i) includes the step of:
- determining an additional amplitude.

10. A method according to claim 9, wherein said step (a)(i) includes the step of:
- adding said additional amplitude to a waveform sampling threshold associated with said waveform histogram.

11. A method according to claim 9, wherein:
said step (a) includes the step of:
- (v) determining an adjusted threshold for said waveform histogram; and said step (a)(i) includes the step of:
- adding said additional amplitude to said adjusted threshold.

12. A method according to claim 9, wherein:
said step (a) includes the step of:
- (v) determining an adjusted threshold for said waveform histogram; and said step (a)(i) includes the steps of:
- adding said additional amplitude to said adjusted threshold to obtain a sum; and
- applying a re-sampling function to said sum.

13. A method according to claim 12, wherein said re-sampling function corrects for shift in at least one sampling clock.

14. A method according to claim 9, wherein said step of determining an additional amplitude includes the steps of:
- determining a sample ratio for said interval in said waveform histogram; and
- identifying a value in an inverse error function that corresponds to said additional amplitude.

15. A method according to claim 1, wherein said step (a)(i) employs a weighting factor, wherein said step (a) includes the step of:
- (vi) determining said weighting factor, wherein said weighting factor reflects a level of reliability for said amplitude component.

16. A method according to claim 15, wherein said step (a)(vi) includes the steps of:
- determining a sample ratio for said interval in said waveform histogram; and
- selecting a value in a Gaussian distribution that corresponds to said sample ratio.

17. A method according to claim 1, wherein said step (a) is performed for multiple intervals in said multiple waveform histograms.

18. At least one processor readable storage device having processor readable code embodied on said at least one processor readable storage device, said processor readable code for programming one or more processors to perform a method comprising the steps of:
- (a) generating a plurality of waveform histograms for a set of waveforms by determining an amplitude for an interval, wherein said interval is included in multiple waveform histograms in said plurality of waveform histograms, including the sub-steps of:
  - (i) determining an amplitude component for said interval, based on a waveform histogram in said multiple waveform histograms; and
  - (ii) weighting said amplitude component to obtain a weighted amplitude component; and
- (b) constructing a composite waveform, based on said plurality of waveform histograms.

19. At least one processor readable storage device according to claim 18, wherein said method includes the step of:
- (c) setting at least one acquisition parameter for each waveform histogram in said plurality of histograms.

20. At least one processor readable storage device according to claim 19, wherein said at least one acquisition parameter includes a threshold voltage for waveform sampling.

21. At least one processor readable storage device according to claim 19, wherein said step (c) is performed prior to generating each waveform histogram in said plurality of waveform histograms.

22. At least one processor readable storage device according to claim 21, wherein said at least one acquisition parameter includes a number of waveforms to sample for a waveform histogram in said plurality of waveform histograms, and spacing between histogram intervals.

23. At least one processor readable storage device according to claim 18, wherein said step (a)(i) and said step (a)(ii) are performed for each waveform histogram in said multiple waveform histograms.

24. At least one processor readable storage device according to claim 23, wherein said step (a) includes the step of:
- (iii) accumulating all of said weighted amplitude components determined for said interval to obtain an accumulated weighted amplitude component.

25. At least one processor readable storage device according to wherein said step (a)(i) includes the step of:
- (iv) dividing said accumulated weighted amplitude component by an accumulated weighting factor.

26. At least one processor readable storage device according to claim 18, wherein said step (a)(i) includes the step of:
- determining an additional amplitude.

27. At least one processor readable storage device according to claim 26, wherein said step (a)(i) includes the step of:
- adding said additional amplitude to a waveform sampling threshold associated with said waveform histogram.

28. At least one processor readable storage device according to claim 26, wherein:
said step (a) includes the step of:
- (v) determining an adjusted threshold for said waveform histogram; and said step (a)(i) includes the step of:
- adding said additional amplitude to said adjusted threshold.

29. At least one processor readable storage device according to claim 26, wherein:
said step (a) includes the step of:
- (v) determining an adjusted threshold for said waveform histogram; and said step (a) includes the steps of:
  adding said additional amplitude to said adjusted threshold to obtain a sum; and
  applying a re-sampling function to said sum.

30. At least one processor readable storage device according to claim 29, wherein said re-sampling function corrects for shift in at least one sampling clock.

31. At least one processor readable storage device according to claim 26, wherein said step of determining an additional amplitude includes the steps of:
  determining a sample ratio for said interval in said waveform histogram; and
  identifying a value in an inverse error function that corresponds to said additional amplitude.

32. At least one processor readable storage device according to claim 18, wherein said step (a)(i) employs a weighting factor, wherein said step (a) includes the step of:
  (vi) determining said weighting factor, wherein said weighting factor reflects a level of reliability for said amplitude component.

33. At least one processor readable storage device according to claim 32, wherein said step (a)(vi) includes the steps of:
  determining a sample ratio for said interval in said waveform histogram; and
  selecting a value in a Gaussian distribution that corresponds to said sample ratio.

34. At least one processor readable storage device according to claim 18, wherein said step (a) is performed for multiple intervals in said multiple waveform histograms.

35. An apparatus, comprising:
  at least one storage device; and
  at least one processor in communication with said at least one storage device, said at least one processor performs a method comprising the steps of:
  (a) generating a plurality of waveform histograms for a set of waveforms by determining an amplitude for an interval, wherein said interval is included in multiple waveform histograms in said plurality of waveform histograms, including the sub-steps of:
    (i) determining an amplitude component for said interval, based on a waveform histogram in said multiple waveform histograms; and
    (ii) weighting said amplitude component to obtain a weighted amplitude component; and
  (b) constructing a composite waveform, based on said plurality of waveform histograms.

36. An apparatus according to claim 35, wherein said method includes the step of:
  (c) setting at least one acquisition parameter for each waveform histogram in said plurality of histograms.

37. An apparatus according to claim 36, wherein said at least one acquisition parameter includes a threshold voltage for waveform sampling.

38. An apparatus according to claim 36, wherein said step (c) is performed prior to generating each waveform histogram in said plurality of waveform histograms.

39. An apparatus according to claim 38, wherein said at least one acquisition parameter includes a number of waveforms to sample for a waveform histogram in said plurality of waveform histograms, and spacing between histogram intervals.

40. An apparatus according to claim 35, wherein said step (a)(i) and said step (a)(ii) are performed for each waveform histogram in said multiple waveform histograms.

41. An apparatus according to claim 6, wherein said step (a) includes the step of:
  (iii) accumulating all of said weighted amplitude components determined for said interval to obtain an accumulated weighted amplitude component.

42. An apparatus according to claim 41, wherein said step (a)(i) includes the step of:
  (iv) dividing said accumulated weighted amplitude component by an accumulated weighting factor.

43. An apparatus according to claim 35, wherein said step (a)(i) includes the step of:
  determining an additional amplitude.

44. An apparatus according to claim 43, wherein said step (a)(i) includes the step of:
  adding said additional amplitude to a waveform sampling threshold associated with said waveform histogram.

45. An apparatus according to claim 43, wherein:
  said step (a) includes the step of:
    (v) determining an adjusted threshold for said waveform histogram; and
  said step (a)(i) includes the step of:
    adding said additional amplitude to said adjusted threshold.

46. An apparatus according to claim 43, wherein:
  said step (a) includes the step of:
    (v) determining an adjusted threshold for said waveform histogram; and
  said step (a)(i) includes the steps of:
    adding said additional amplitude to said adjusted threshold to obtain a sum; and
    applying a re-sampling function to said sum.

47. An apparatus according to claim 46, wherein said re-sampling function corrects for shift in at least one sampling clock.

48. An apparatus according to claim 43, wherein said step of determining an additional amplitude includes the steps of:
  determining a sample ratio for said interval in said waveform histogram; and
  identifying a value in an inverse error function that corresponds to said additional amplitude.

49. An apparatus according to claim 35, wherein said step (a)(i) employs a weighting factor, wherein said step (a) includes the step of:
  (vi) determining said weighting factor, wherein said weighting factor reflects a level of reliability for said amplitude component.

50. An apparatus according to claim 49, wherein said step (a)(vi) includes the steps of:
  determining a sample ratio for said interval in said waveform histogram; and
  selecting a value in a Gaussian distribution that corresponds to said sample ratio.

51. An apparatus according to claim 35, wherein said step (a) is performed for multiple intervals in said multiple waveform histograms.

52. An apparatus according to claim 35, wherein said apparatus is a distance measurement device.

* * * * *

UNITED STATES PATENT AND TRADEMARK OFFICE
CERTIFICATE OF CORRECTION

PATENT NO. : 6,950,177 B2  Page 1 of 1
APPLICATION NO. : 10/414450
DATED : September 27, 2005
INVENTOR(S) : Lewis It is certified that error appears in the above-identified patent and that said Letters Patent is hereby corrected as shown below:

Col. 42, line 44: after "to" and before "wherein" insert --claim 24,--

Col. 43, line 1: after "(a)" and before "includes" insert --(i)--

Col. 44, line 4, delete: "6" and insert --40--

Signed and Sealed this

Twelfth Day of December, 2006

JON W. DUDAS
*Director of the United States Patent and Trademark Office*